United States Patent [19]

Vaidyanathan

[11] Patent Number: 5,371,810
[45] Date of Patent: Dec. 6, 1994

[54] METHOD OF DETERMINING THE INTERIOR POINTS OF AN OBJECT IN A BACKGROUND

[75] Inventor: Akhileswar G. Vaidyanathan, Hockessin, Del.

[73] Assignee: E. I. Du Pont de Nemours and Company, Wilmington, Del.

[21] Appl. No.: 999,702

[22] Filed: Dec. 31, 1992

Related U.S. Application Data

[63] Continuation-in-part of Ser. No. 767,339, Sep. 27, 1991.

[51] Int. Cl.$^5$ .......................... G06K 9/20; G06K 9/46
[52] U.S. Cl. .......................................... 382/48; 382/26
[58] Field of Search .................... 382/48, 21, 22, 26, 382/25; 340/747, 723; 395/141

[56] References Cited

U.S. PATENT DOCUMENTS

| | | | |
|---|---|---|---|
| 4,183,013 | 1/1980 | Agrawala et al. | 382/22 |
| 4,334,274 | 6/1982 | Agui et al. | 382/22 |
| 4,453,266 | 6/1984 | Bacus | 382/6 |
| 4,493,105 | 1/1985 | Beall et al. | 382/25 |
| 4,763,119 | 8/1988 | Matsubara et al. | 340/747 |
| 4,998,211 | 3/1991 | Hamada et al. | 340/747 |
| 5,029,106 | 7/1991 | Kai et al. | 340/747 |
| 5,038,385 | 8/1991 | Kasahara | 382/22 |
| 5,073,960 | 12/1991 | Nakai et al. | 382/22 |

FOREIGN PATENT DOCUMENTS 62-60069 12/1987 Japan.

OTHER PUBLICATIONS

Barba et al., Automatic Region Construction by Edge Detection and Contour Following in Image Segmentation, *Proceedings of the Eight International Conference on Pattern Recognition, Paris, France, IEEE Press; New York,* 681–683, Oct. 27–31, 1986.

Iwata et al., A Discrimination Method of the Interior and Exterior of a Closed Curve, *System, Computers, Controls,* vol. 11, No. 6, 11–20, Nov. 1980.

Ali et al., A New Algorithm for Extracting the Interior of Bounded Regions Based on Chain Coding, *Computer Vision Graphics and Image Processing,* vol. 43, No. 2, 256–264, Aug. 1988.

Computer Vision, Graphics, and Image Processing 50, 296–307 (1990), "A Fast Algorithm for the Restoration of Images Based on Chain Codes Description and its Applications", Chang and Leu.

Computing Surveys, vol. 6, No. 1 (Mar. 1974), "Computer Processing of Line–Drawing Images", Herbert Freeman.

Sahoo et al "Survey of Thresholding Techniques" Computer Vision Graphics and Image Processing 1988 pp. 233–260.

*Primary Examiner*—Joseph Mancuso
*Assistant Examiner*—David Fox
*Attorney, Agent, or Firm*—Jane E. Obee

[57] ABSTRACT

The present invention relates to an image analysis method for determining the interior points of an object in a background when the contour, or perimeter points, of the object are known. By accessing the interior points of an object, textural and color information can be derived, thereby allowing for object recognition. Further, the ability to determine interior points of an object allows for complete identification of all objects in an image. By determining the interior points, one may "blacken out", or effectively remove previously identified objects from an image, creating a remainder image for further searching.

83 Claims, 38 Drawing Sheets

Microfiche Appendix Included
(86 Microfiche, 2 Pages)

| POINT | ROW (X) | COLUMN (Y) | NEXT | PREV. |
|---|---|---|---|---|
| 1 | 1 | 2 | 3 | 1 |
| 2 | 2 | 3 | 3 | 3 |
| 3 | 3 | 4 | 1 | 3 |
| 4 | 2 | 5 | 1 | 1 |
| 5 | 1 | 6 | 3 | 1 |
| 6 | 2 | 7 | 4 | 3 |
| 7 | 3 | 7 | 5 | 4 |
| 8 | 4 | 6 | 5 | 5 |
| 9 | 5 | 5 | 6 | 5 |
| 10 | 5 | 4 | 7 | 6 |
| 11 | 4 | 3 | 7 | 7 |
| 12 | 3 | 2 | 7 | 7 |
| 13 | 2 | 1 | 1 | 7 |

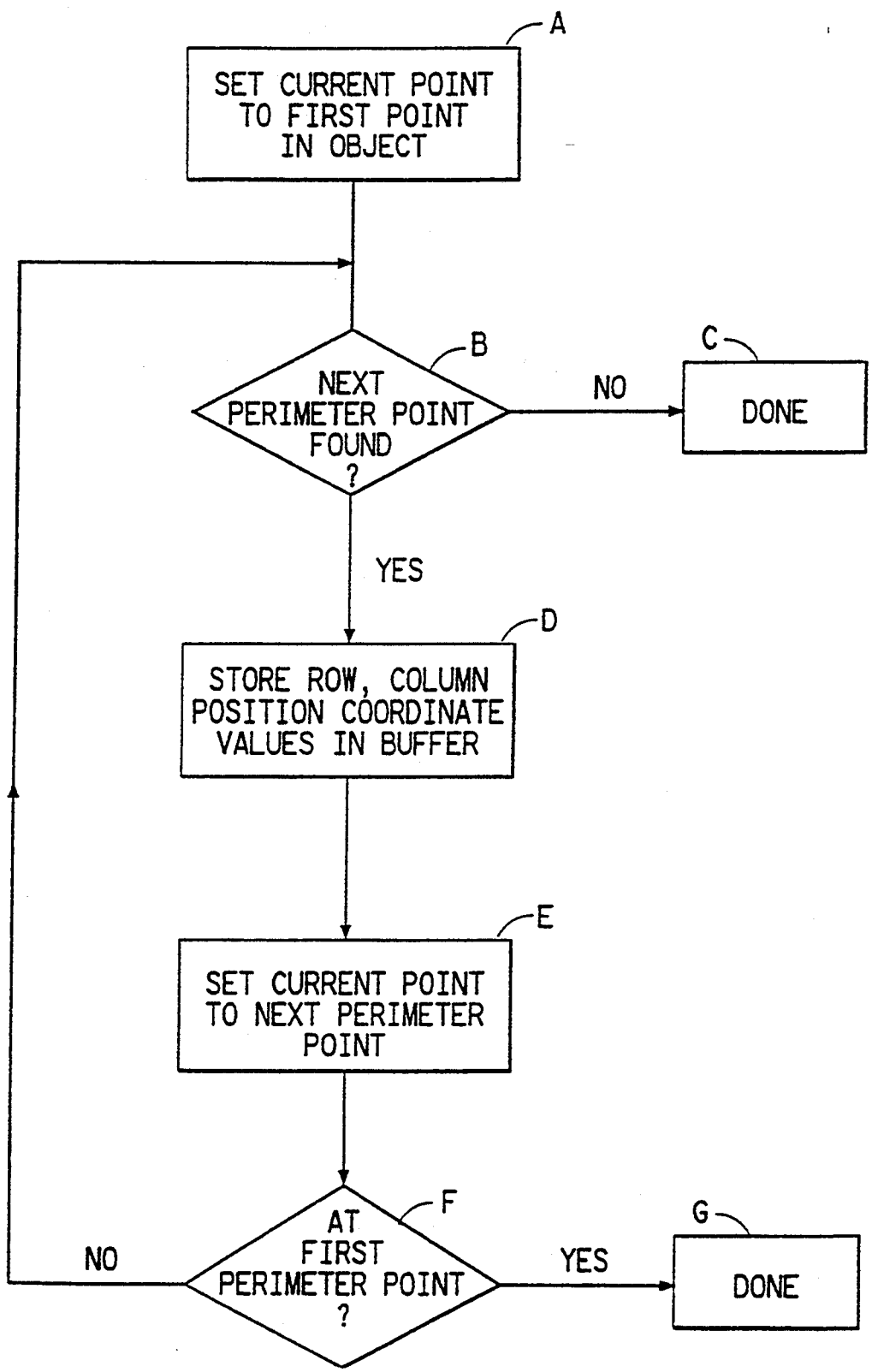

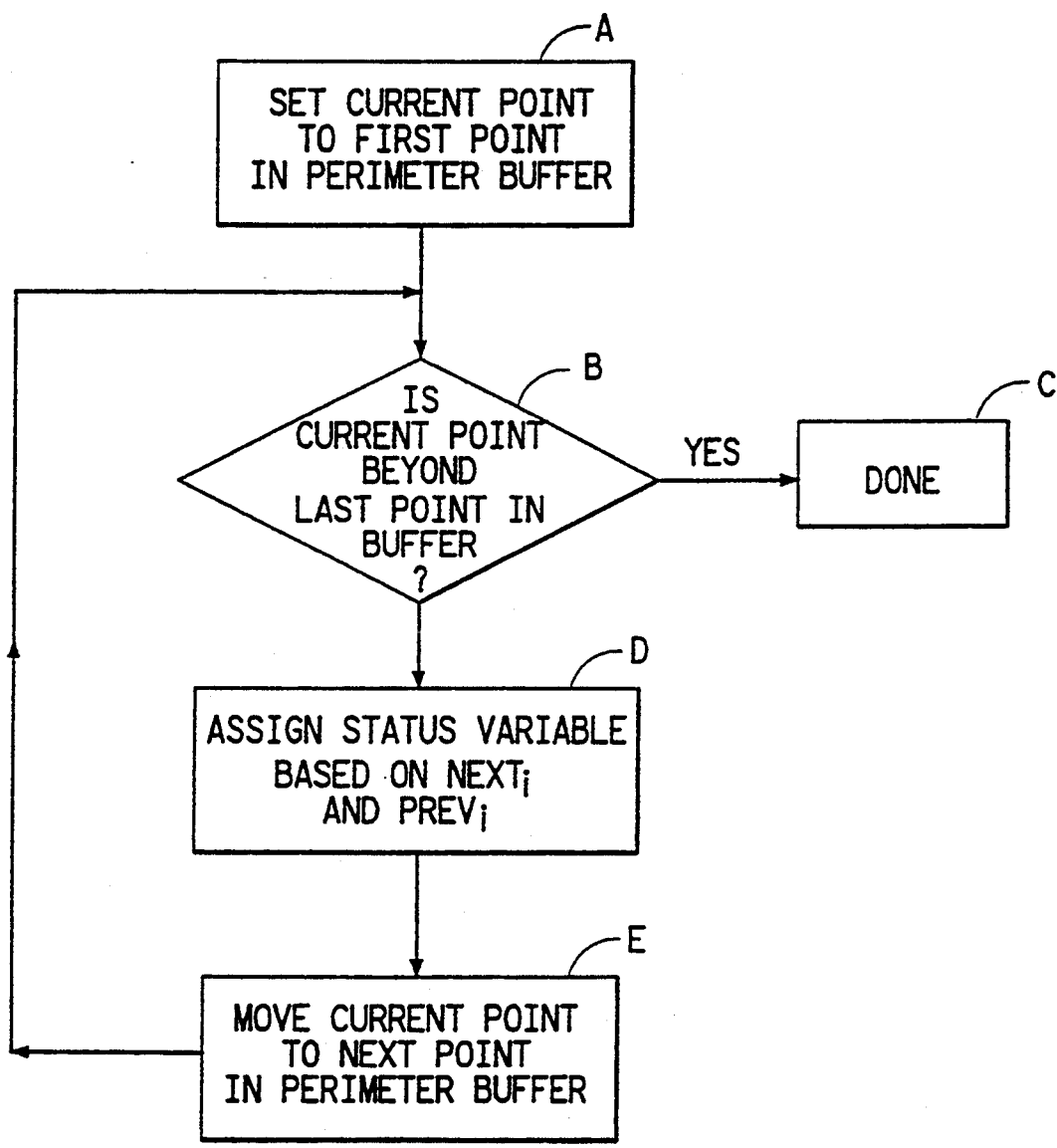

FIG.8

DIRECTION CODE

| | NEXT | 0 | 1 | 2 | 3 | 4 | 5 | 6 | 7 |
|---|---|---|---|---|---|---|---|---|---|
| PREVIOUS 0 | | F | F | F | NF | NF | F | F | F |
| 1 | | F | F | F | NF | NF | NF | F | F |
| 2 | | F | F | F | NF | NF | NF | NF | F |
| 3 | | F | F | F | NF | NF | NF | NF | NF |
| 4 | | NF | F | F | NF | NF | NF | NF | NF |
| 5 | | NF | NF | F | NF | NF | NF | NF | NF |
| 6 | | F | F | F | F | F | F | F | F |
| 7 | | F | F | F | NF | F | F | F | F |

DIRECTION CODE

FIG.9

DIRECTION CODE

| | NEXT | 0 | 1 | 2 | 3 | 4 | 5 | 6 | 7 |
|---|---|---|---|---|---|---|---|---|---|
| PREVIOUS | | | | | | | | | |
| | 0 | NF | NF | F | F | F | NF | NF | NF |
| | 1 | NF | NF | F | F | F | F | NF | NF |
| DIRECTION CODE 2 | | NF | NF | F | F | F | F | NF | NF |
| | 3 | NF | NF | F | F | F | F | F | NF |
| | 4 | NF | NF | F | F | F | F | F | F |
| | 5 | NF | NF | F | F | F | F | F | F |
| | 6 | F | F | F | F | F | F | F | F |
| | 7 | NF | NF | F | F | NF | NF | NF | NF |

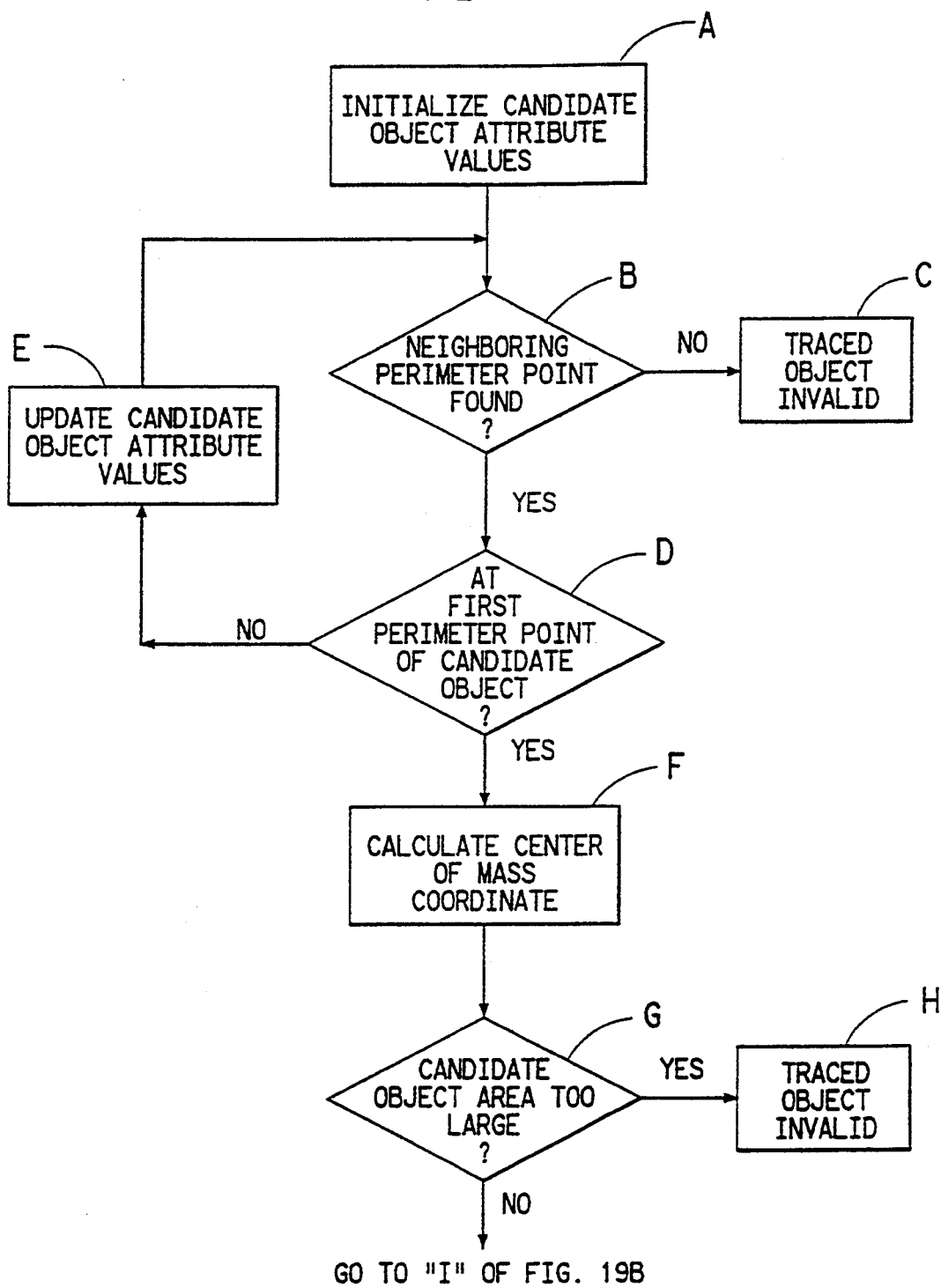

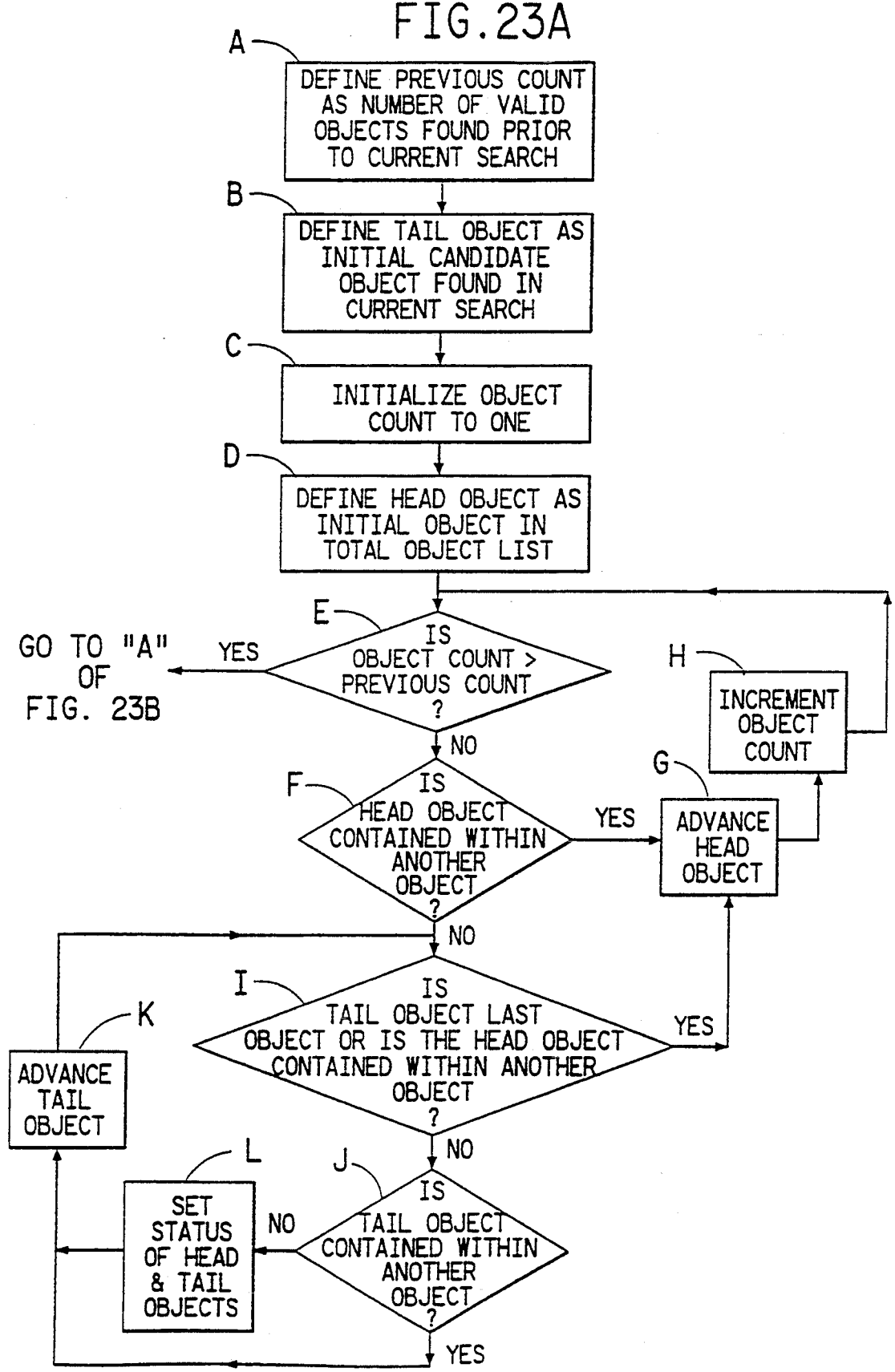

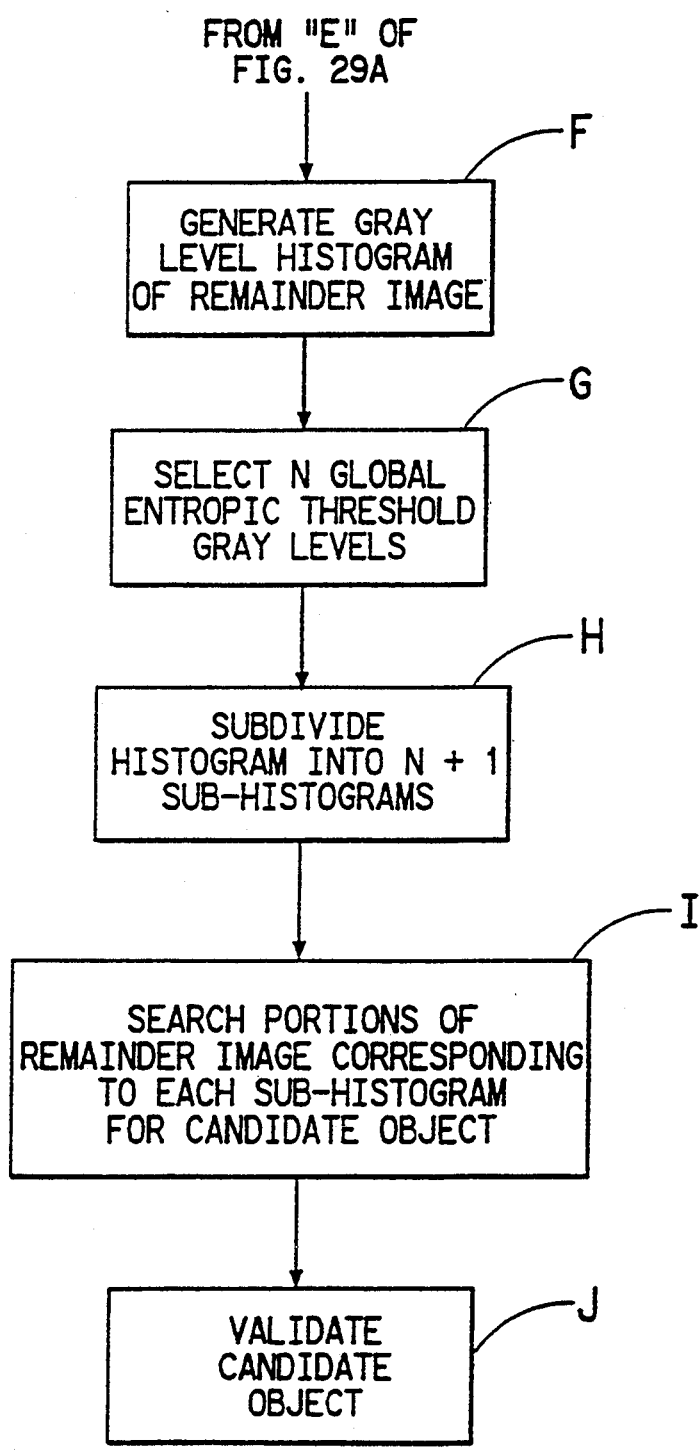

METHOD OF DETERMINING THE INTERIOR POINTS OF AN OBJECT IN A BACKGROUND

This application is a continuation-in-part of application Ser. No. 07/767,339, filed Sep. 27, 1991.

MICROFICHE APPENDIX

Attached hereto are microfiche containing 86 frames of modules which can be employed in the described embodiments and in other embodiments. These microfiche are included as a portion of the disclosure of this patent document.

COPYRIGHT NOTICE

A portion of the disclosure of this patent document contains material which is subject to copyright protection. The copyright owner has no objection to the reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to an image analysis method for determining the interior points of an object in a background. The present invention also relates to a method of identifying at least one valid object having at least one predetermined attribute value in a background. By determining the interior points of the object, one may "blacken out" or effectively remove previously identified objects from an image of the object and the background, thus creating a remainder image for further searching.

2. Description of the Related Art

The ability to access interior points of a region when its contour is given is a classic problem in image processing. Previous solutions to this problem have been described by L. W. Chang and K. L. Leu in an article entitled "A Fast Algorithm for the Restoration of Images Based on Chain Codes Description and Its Applications", Computer Vision, Graphics, and Image Processing 50, 296– 307 (1990). One algorithm described, connectivity filling, requires that every pixel in the object be interrogated. Since the number of pixels within an object is greater than the number of pixels which comprise the perimeter of the object, such a technique is relatively slow. Another method described is parity checking which is based on the fact that the intersection of a straight line with the contour regions of an object delineates an even number of points on the perimeter of the object. Designation of the interior points is determined by an arbitrary filling rule where all points between each odd point and the next even point on the contour in each line of the image are designated as interior points. Such a parity checking algorithm will not work with objects of complex shape.

In the same article cited above, Chang and Leu propose an enhanced parity checking algorithm which relies on characterizing the perimeter points into one of four categories based on direction code values. Characterizing the points leads to the creation of a new buffer of perimeter points wherein some points have been duplicated and others eliminated. By applying the parity checking algorithm to the newly created buffer, interior points of objects with complex shapes may be identified. However, the enhanced algorithm presented by Chang and Leu is an indirect method for solving the problem of interior point determination, requiring an excessive number of steps.

Japanese Patent Publication Number 62-60069 to Hitachi Electronic Engineering Co. Ltd., published Dec. 14, 1987, discloses a colony screening device which distinguishes colonies based on color. Colonies are identified by pattern recognition using a predetermined threshold and a small number of points in the center of a colony are arbitrarily selected. This publication does not disclose a method for determining all the interior points of an object. Limiting the area of determination introduces possibilities of error into any attempt at object identification and makes a search of the remainder portion of the image less effective.

U.S. Pat. No. 4,453,266 to Bacus discloses a method for measuring the optical density of a cell using the sum of gray level values within the closed boundaries of the cell. Bacus does not contemplate determining all of the interior points of an object of an unknown or arbitrary shape using an automatic thresholding technique.

None of these references discloses a method for determining all the interior points of the object identified. Furthermore, none of these references discloses a method of identifying at least one valid object having at least one valid object predetermined attribute value in a background using automatically calculated thresholds by determining the interior points of the object. Moreover, none of these references discloses a method for effectively removing previously identified object from an image, thereby creating a remainder image for further searching.

SUMMARY OF THE INVENTION

Accordingly, the present invention solves the problems of the prior art by providing a method for determining the interior points of the object identified.

The present invention also solves the problems of the prior art by providing a method of identifying objects having at least one predetermined attribute value in a background using automatically calculated thresholds by determining the interior points of the objects identified. Particularly, the method of the present invention is able to identify objects in a varying background.

The present invention further solves the problems of the prior art by providing a method for effectively removing previously identified object from an image, thereby creating a remainder image for further searching.

The method of the present invention also solves the problems of the prior art by using filling rules, which are specific to each perimeter point of an object, to provide a direct method for determining the interior points of the object.

To achieve the foregoing solutions, and in accordance the purposes of a first embodiment of the invention as embodied and broadly described herein, there is provided a method for determining the interior points of an object in a background. The method comprises the steps of generating an image of the object and the background, searching the image for the object and determining the perimeter points of the object. The method also comprises the step of creating a perimeter buffer. The perimeter buffer comprises the perimeter points, where each perimeter point has a row-position coordinate value, a column-position coordinate value and a direction code vector. The direction code vector comprises a first and a second direction code value for each perimeter point. The first direction code value describes the relationship of each respective perimeter point to the next perimeter point and the second direction code value describes the relationship of each respective perimeter point to the previous perimeter point. The method also comprises the step of sorting the perimeter points in the perimeter buffer in a predetermined order to create a sorted perimeter buffer, and assigning to each perimeter point in the sorted perimeter buffer a status variable having one of a first and a second value, where the value of the status variable is determined by the first and second direction code values. The method also comprises the step of designating as the interior points of the object each point on the same line segment as the perimeter point being examined and lying between the examined perimeter point and the next perimeter point in the sorted perimeter buffer, where the examined perimeter point is assigned the first value of the status variable.

Further in accordance with the purposes of a second embodiment of the invention as embodied and broadly described herein, there is provided a method of identifying at least one valid object having at least one predetermined attribute value in a background. The method comprises the steps of generating an image of the object and the background, searching the image for at least one candidate object using at least one automatically calculated threshold and determining the perimeter points of the candidate object. The method also comprises the step of creating a perimeter buffer. The perimeter buffer comprises the perimeter points, where each perimeter point has a row-position coordinate value, a column-position coordinate value and a direction code vector. The direction code vector comprises a first and a second direction code value for each perimeter point. The first direction code value describes the relationship of each respective perimeter point to the next perimeter point and the second direction code value describes the relationship of each respective perimeter point to the previous perimeter point. The method also comprises the step of sorting the perimeter points in the perimeter buffer in a predetermined order to create a sorted perimeter buffer, and assigning to each perimeter point in the sorted perimeter buffer a status variable having one of a first and a second value, where the value of the status variable is determined by the first and second direction code values. The method also comprises the step of designating as the interior points of the object each point on the same line segment as the perimeter point being examined and lying between the examined perimeter point and the next perimeter point in the sorted perimeter buffer, where the examined perimeter point is assigned the first value of the status variable. The method also comprises the steps characterizing the candidate object by the candidate object attribute value and validating the candidate object having the valid object predetermined attribute value to identify the valid object.

In order to remove a previously identified object from an image, there is provided a method for creating a remainder image for further searching. The method comprises the steps of the second embodiment, and in addition, comprises the steps of selecting a predetermined gray level value and scanning the image to determine all points having the predetermined gray level value, re-assigning the gray level value of each point having the predetermined gray level value a new predetermined gray level value and assigning the predetermined gray level value to all interior points of all valid objects. The method also comprises the steps of generating a gray level histogram of a remainder image, where the remainder image comprises all the points having a gray level value other than the predetermined gray level value, selecting N global entropic threshold levels, subdividing the gray level histogram into N+1 sub-histograms using each of the entropically selected threshold gray level values, searching portions of the image corresponding to each sub-histogram using each global entropically selected threshold gray level value for at least one new candidate object, wherein the new candidate object has at least one candidate object attribute value and validating the new candidate objects having the valid object predetermined attribute values for each of the sub-histograms to identify the valid object.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred embodiments given below, serve to explaining the principles of the invention.

FIG. 3 is a flow chart showing the steps of a module, GET PERIM, for determining the coordinates of each perimeter point of an object.

FIG. 7 is a flow chart showing the steps of part of a module, READ COLOR, which assigns a status variable to each perimeter point.

FIG. 8 is a FILL look-up table for objects traced in the clockwise direction.

FIG. 9 is a FILL look-up table for objects traced in the counterclockwise direction.

FIGS. 19A-19B are a flow chart showing the steps of a module, TRACE OBJECT, which is used to trace objects.

FIGS. 23A-23D are a flow chart showing the steps of a module, CHK LIST, which is used to resolve redundancies in inhomogeneous objects.

FIGS. 29A-29B are a block diagram showing the steps of the overall method of a second, specific implementation of the second embodiment of the present invention.

DETAILED DESCRIPTION OF THE PREFERRED EMBODIMENTS

Reference will now be made in detail to the present preferred embodiments of the invention as illustrated in the accompanying drawings.

Figure 1:
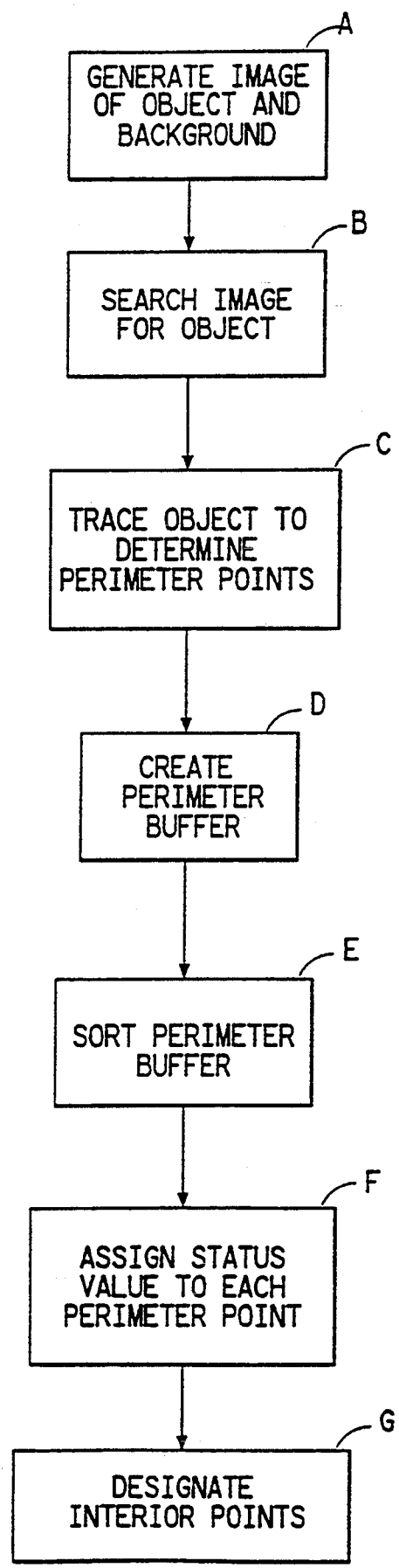
FIG. 1 is a block diagram showing the steps of the overall method according to a first embodiment of the present invention.

In accordance with a first embodiment of the present invention, there is provided a method for determining the interior points of an object in a background. FIG. 1 is a block diagram showing the overall method of the present invention. The method comprises the step of generating an image of the object and the background as shown in block A of FIG. 1. The hardware used to implement the method of the present invention must first be initialized when the image is generated. The image of the object and the background may be generated by a camera. Although a CCD camera is generally used with the present invention, any type of camera may be used without departing from the general principles of the present invention. The image is then digitized and stored by a frame grabber or a video digitizer.

The method of the present invention also comprises the step of searching the image for the object as shown in block B of FIG. 1. The searching step may comprise searching the entire object. In instances where it is known that an identifying feature of an object in question lies in a particular portion of an object, the searching step may comprise searching only that portion of the object. The searching step may be done in any manner, for instance, using an automatically calculated threshold or a user selected threshold.

The method of the present invention further includes the step of determining the perimeter points of the object, which is done by tracing the object. This step is shown in block C of FIG. 1. The coordinates of each perimeter point are determined by a module GET PERIM. The steps of GET PERIM are illustrated in FIG. 3. The basic principles of the GET PERIM module are similar to those described in "Digital Image Processing" by Rafael C. Gonzalez and Paul Wintz, Second Ed., Addison-Wesley Publishing Company, Reading, Mass. (1987). In one instance, the step of determining the perimeter points of the object comprises tracing the object sequentially in a clockwise direction. In another instance, the step of determining the perimeter points of the object comprises tracing the object sequentially in a counterclockwise direction.

The method of the present invention also comprises the step of creating a perimeter buffer. This step is shown generally by block D of FIG. 1 and is performed by a module, LOAD BUFFER, as shown specifically in FIG. 6 as described below. The perimeter buffer comprises the perimeter points as determined by the module GET PERIM.

Figures 2A, 2B:
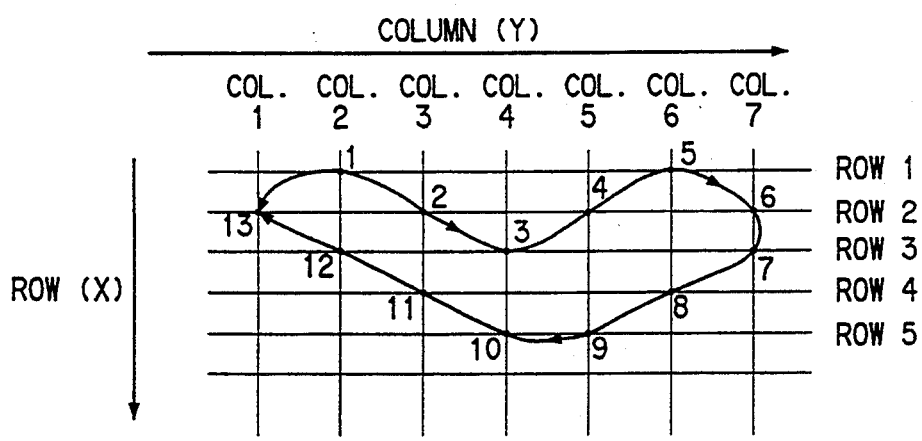
FIG. 2A is a schematic view, with rows and columns designated, which represent the row and column position coordinate values, of a simple object traced in a clockwise direction.
FIG. 2B is a chart showing the row-position coordinate value, the column-position coordinate value and the direction code values for the thirteen points illustrated in FIG. 2A.

FIG. 2A shows a schematic for a simple object traced in a clockwise direction. For purposes of illustration, thirteen perimeter points are shown. Each perimeter point has a row position coordinate value, a column position coordinate value and a direction code vector. The direction code vector comprises a first and a second direction code value for each perimeter point. The first direction code value describes the relationship of each respective perimeter point to the next perimeter point as determined by the GET PERIM module, and the second direction code value describes the relationship of each respective perimeter point to the previous perimeter point, as determined by the GET PERIM module. The definition of "next or previous point", as discussed below, depends on the direction in which the object is traced. The i'th member of the perimeter buffer is denoted by the direction code descriptor $(x_i, y_i, vector_i)$, where $x_i$ is the row position coordinate value, $Y_i$ is the column position coordinate value and $vector_i$ is the direction code vector which contains the following information:

(i) $next_i$ is the direction code value to the next perimeter point; and (ii) $prev_i$ is the direction code value from the previous point to the current point.

FIG. 2B is a chart showing the row-position coordinate value, the column-position coordinate value, and the first and second direction code values for the thirteen points illustrated in FIG. 2A. For example, point 13 is denoted as having a row-position coordinate value of 2, a column-position coordinate value of 1, a first direction code value of 1 and a second direction code value of 7.

Figure 4:
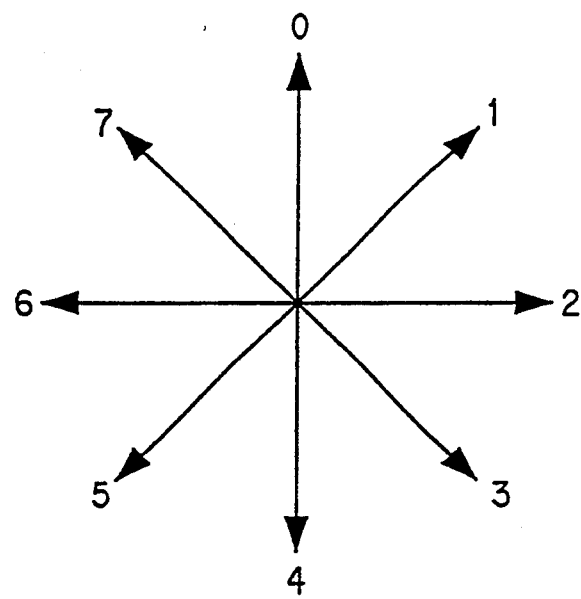
FIG. 4 is a schematic view illustrating the direction code values for an object which is traced in the clockwise direction.
Figure 5:
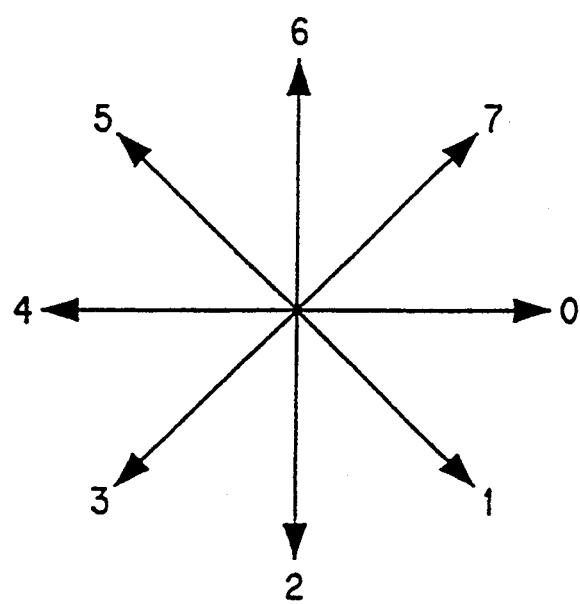
FIG. 5 is a schematic view illustrating the direction code values for an object which is traced in the counterclockwise direction.

In the present invention, the direction code values can range from 0–7, depending on the direction of one perimeter point to an adjacent perimeter point (either the next perimeter point or the previous perimeter point). The direction code values for the present invention are shown in FIGS. 4 and 5. FIG. 5 direction code values are derived by rotating the values illustrated in FIG. 4 by 90°. The application of the set of direction code values as illustrated in FIG. 4 as opposed to the direction code values as illustrated in FIG. 5 is dependent upon the method of sorting the perimeter buffer to be discussed below. As can be seen from FIG. 4, if $next_i$ is equal to zero, the next perimeter point would be vertically above the current perimeter point and in the same column. It is important to realize that the value of a direction code from one perimeter point to the next depends on the sense in which the object is traced by the module GET PERIM. If the object is traced in the clockwise direction, the direction codes associated with the perimeter points are different than if the object is traced in the counterclockwise direction.

The steps of the module GET PERIM are shown in FIG. 3. As illustrated in FIG. 3, block A sets the current point to the first point in the object. Decision diamond B then asks whether the next perimeter point has been found. If not, then the traced object is invalid, and the module is done as shown in block C. If the next perimeter point has been found, then the row and column position coordinate values are stored in the perimeter buffer as illustrated in block D of FIG. 3. The current point is set to the next perimeter point as shown in block E of FIG. 3. Decision diamond F then asks whether the current point is at the first perimeter point. If not, then the loop through decision diamond B, blocks C–E and decision diamond F is repeated until the current point is at the first perimeter point. If the answer to decision diamond F is yes, the module GET PERIM is done.

Figure 6A:
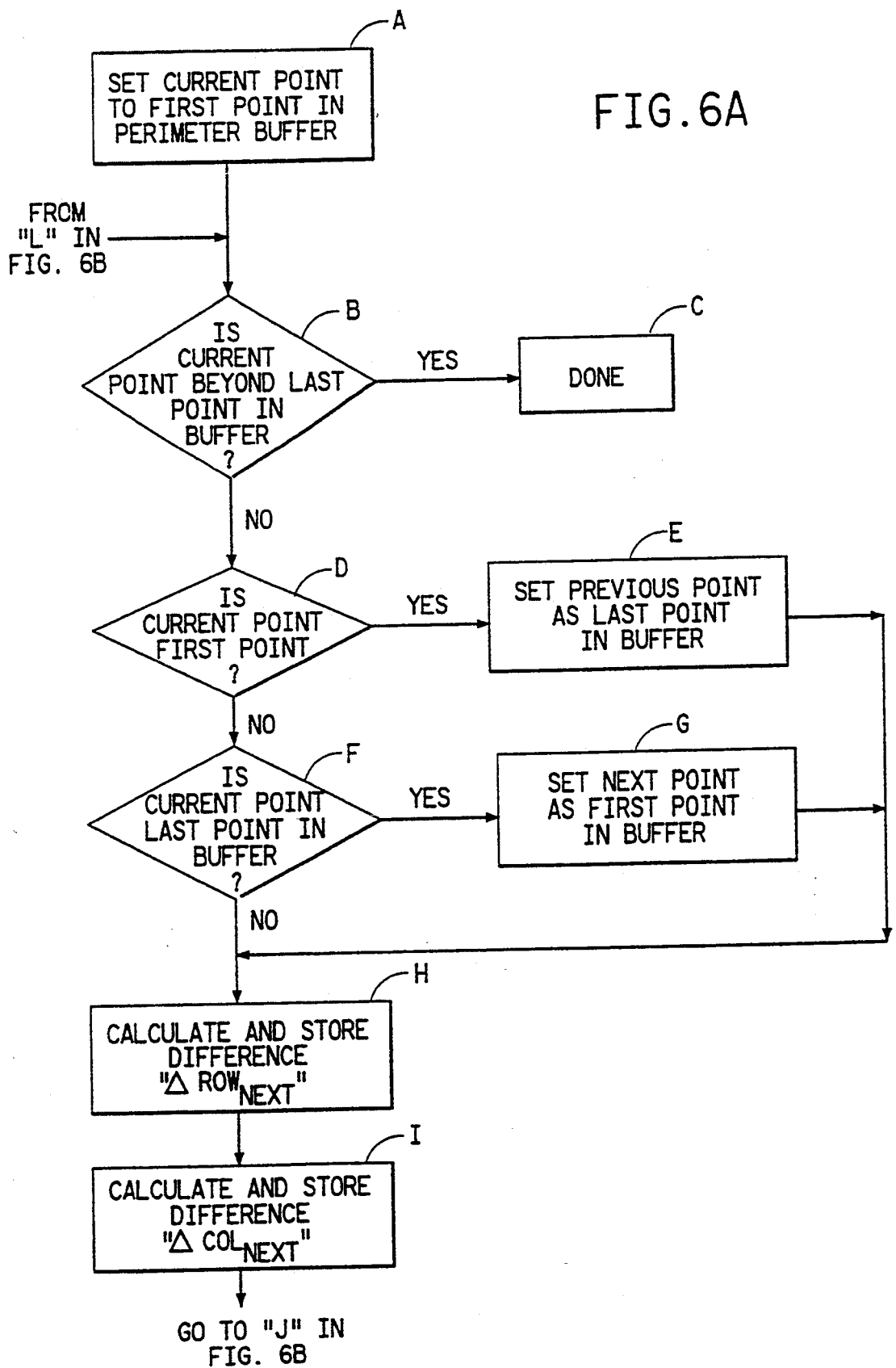
FIGS. 6A and 6B are a flow chart showing the steps of a module, LOAD BUFFER, which creates a perimeter buffer comprising the perimeter points of an object.
Figure 6B:
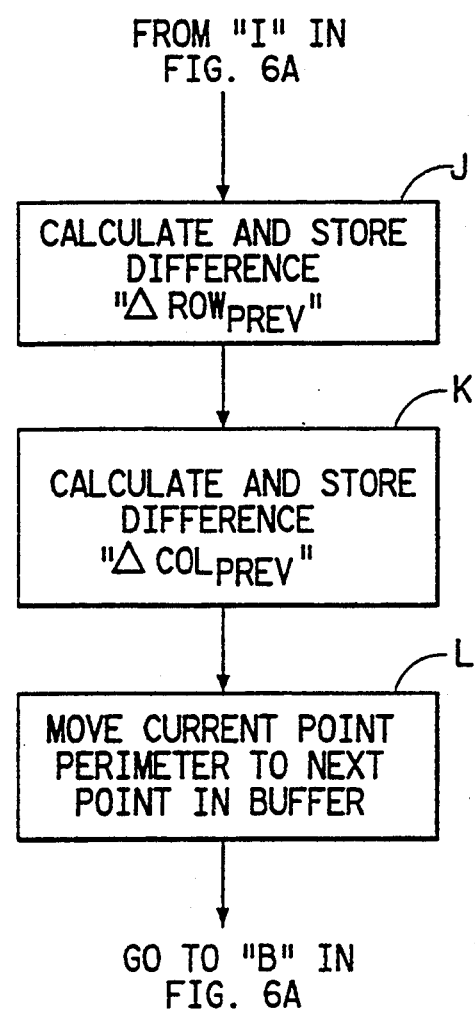

The steps of the module LOAD BUFFER, which creates a perimeter buffer, are illustrated in FIGS. 6A and 6B. In the first step as shown in block A, the current point is set to the first point in the perimeter buffer. Decision diamond B then asks whether the current point is beyond the last point in the buffer. If it is, then the LOAD BUFFER module is done as illustrated in block C of FIG. 6A. If the current point is not beyond the last point in the buffer, then decision diamond D asks if the current point is the first point in the buffer. If it is, then block E sets the previous point as the last point in the buffer. If the current point is not the first point in the buffer, then decision diamond F asks if the current point is the last point in the buffer. If it is, then block G sets the next point as the first point in the buffer. After the previous point is set as the last point in the perimeter buffer, or the next point is set as the first point in the perimeter buffer, the difference in the row coordinate value between the next point and the current point is calculated and stored in the buffer as shown in block H in FIG. 6A. This difference is designated as $\Delta ROW_{NEXT}$. The difference in the column coordinate value between the next point and the current point is then calculated and stored in the buffer as shown in block I in FIG. 6A. This difference is designated as $\Delta COL_{NEXT}$. The difference in the row coordinate value between the current point and the previous point is then calculated and stored in the buffer as shown in block J in FIG. 6B. This difference is designated as $\Delta ROW_{PREV}$. the difference in the column coordinate value between the current point and the previous point is calculated and stored in the buffer as shown in block K. This difference is designated as $\Delta COL_{PREV}$. The current point is then moved to the next perimeter point in the buffer as shown in block L, and the module returns to decision diamond B of FIG. 6A. The loop through B and D–L continues until the current point is beyond the last point in the buffer, at which point the LOAD BUFFER module is done as shown in block C.

The method of the present invention also comprises the step of sorting the perimeter points in the perimeter buffer in a predetermined order to create a sorted perimeter buffer. This step is shown in block E in FIG. 1. This sorting step is performed for tracing the object in either the clockwise or the counterclockwise direction. This sorting step is performed by the standard "Shell Sort" technique described by Robert Sedgewick in his textbook *Algorithms in C*, Addison Wesley, 1990. It should be noted that the "$vector_i$" information associated with each perimeter point moves with the point during the sort.

In a first implementation of the first embodiment of the present invention, the object is traced in the clockwise direction, and the sorting step comprises the sub-step of sorting the perimeter points in the perimeter buffer by row in a predetermined order to create a row-sorted perimeter buffer comprising at least one row-sorted perimeter point. The sub-step of sorting the perimeter points by row comprises sorting the perimeter points in ascending order such that the points with the lowest row-position coordinate values are placed at the start (meaning the first element of the sequence of the buffer) of the buffer. Alternatively, the sub-step of sorting the perimeter points by row comprises sorting the perimeter points in descending order such that the points with the highest row-position coordinate values are placed at the start of the buffer.

In this implementation of the first embodiment, the sorting step also comprises the additional sub-step of sorting the perimeter points in the row-sorted perimeter buffer by column in a further predetermined order to create a row-column sorted perimeter buffer comprising at least one row-column sorted perimeter point. The sub-step of sorting the perimeter points by column comprises sorting the perimeter points in ascending order. In the case where the buffer has been sorted by row in ascending order and subsequently by column, the point with the lowest column-position coordinate value and the lowest row-position coordinate value is placed at the start of the buffer. In the case where the buffer has been sorted by row in descending order and subsequently by column, the point with the lowest column-position coordinate value and the highest row-position coordinate value is placed at the start of the buffer.

In a second implementation of the first embodiment, the object is traced in the clockwise direction, and the sorting step comprises the sub-step of sorting the perimeter points in the perimeter buffer by column in a predetermined order to create a column-sorted perimeter buffer comprising at least one column-sorted perimeter point. In this implementation, the sorting step comprises the sub-step of sorting the perimeter points in the column-sorted perimeter buffer by row in a predetermined order to create a column-row sorted perimeter buffer comprising at least one column-row sorted perimeter point. The sub-step of sorting the perimeter points by column comprises sorting the perimeter points in ascending order such that the points with the lowest column-position coordinate values are placed at the start of the buffer. Alternatively, the sub-step of sorting the perimeter points by column comprises sorting the perimeter points in descending order such that the points with the highest column-position coordinate values are placed at the start of the buffer.

In this second implementation, the sorting step also comprises the additional sub-step of sorting the perimeter points in the column-sorted buffer by row in a further predetermined order to create a column-row sorted perimeter buffer comprising at least one column-row sorted perimeter point. The sub-step of sorting the perimeter points by row comprises sorting the column-sorted perimeter points in descending order. In the case where the buffer has been sorted by column in ascending order and subsequently by row, the point with the highest row-position coordinate and lowest column-position coordinate is placed at the start of the buffer. In the case where the buffer has been sorted by column in descending order and then by row, the point with the highest row coordinate value and highest column coordinate value is placed at the start of the buffer.

In a third implementation of the first embodiment of the present invention, the object is traced in the counterclockwise direction, and the sorting step comprises the sub-step of sorting the perimeter points in the perimeter buffer by row in a predetermined order to create a row-sorted perimeter buffer comprising at least one row-sorted perimeter point. The sub-step of sorting the perimeter points by row comprises sorting the perimeter points in ascending order such that the points with the lowest row-position coordinate values are placed at the start of the buffer. Alternatively, the sub-step of sorting the perimeter points by row comprises sorting the perimeter points in descending order such that the points with the highest row-position coordinate values are placed at the start of the buffer.

In this third implementation, the sorting step also comprises the additional sub-step of sorting the perimeter points in the row-sorted perimeter buffer by column in a further predetermined order to create a row-column sorted perimeter buffer comprising at least one row-column sorted perimeter point. The sub-step of sorting the row-sorted perimeter points by column comprises sorting the perimeter points in descending order. In the case where the buffer has been sorted first by row in ascending order and subsequently by column, the point with the highest column-position coordinate and lowest row-position coordinate is placed at the start of the buffer. In the case where the buffer has been sorted first by row in descending order and then by column, the point with the highest column-position coordinate and highest row-position coordinate is placed at the start of the buffer.

In a fourth implementation of the first embodiment of the present invention, the object is traced in the counterclockwise direction, and the sorting step comprises the sub-step of sorting the perimeter points in the perimeter buffer by column in a predetermined order to create a column-sorted perimeter buffer comprising at least one column-sorted perimeter point. The sub-step of sorting the perimeter points by column comprises sorting the perimeter points in ascending order such that the points with the lowest column-position coordinate values are placed at the start of the buffer. Alternatively, the sub-step of sorting the perimeter points by column comprises sorting the perimeter points in descending order such that the points with the highest column-position coordinate values are placed at the start of the buffer.

In this fourth implementation, the sorting step also comprises the additional sub-step of the sorting of the perimeter points in a column-sorted perimeter buffer by row in a further predetermined order to create a column-row sorted perimeter buffer comprising at least one column-row sorted perimeter point. The sub-step of sorting the perimeter points by row in the column-sorted buffer comprises sorting the perimeter points in ascending order. In the case where the buffer has been sorted first by column in ascending order and subsequently by row, the point with the lowest row-position coordinate value and lowest column-position coordinate value is placed at the start of the buffer. In the case where the buffer has been sorted first by column in descending order and subsequently by row, the point with the lowest row-position coordinate value and highest-column position coordinate value is placed at the start of the buffer.

The method of the present invention also comprises the step of assigning to each perimeter point a status variable having one of a first and a second value. This step is shown generally in block F of FIG. 1 and is performed in a module, READ COLOR, as shown in the flow chart of FIG. 7. The first value of the status variable is "FILL", and the second value of the status variable is "NO FILL". The value of the status variable is determined by the first and second direction code values $next_i$ and $prev_i$. Direction code values are determined in accordance with FIGS. 4 and 5, depending on the method of sorting the perimeter buffer which is employed. If the points in the perimeter buffer are sorted first by row and then by column, such as in the first and third implementations of the first embodiment, the direction code values in FIG. 4 are employed. If the points in the perimeter buffer are sorted first by column and then by row, such as in the second and fourth implementations of the first embodiment, then the direction code values illustrated in FIG. 5 are used. The rules for mapping $next_i$ and $prev_i$ to FILL or NO FILL are summarized for objects traced in a clockwise direction in a FILL look-up table (LUT) as shown in FIG. 8. The rules for mapping $next_i$ and $prev_i$ to FILL or NO FILL are summarized for objects traced in a counterclockwise direction in a FILL look-up table (LUT) as shown in FIG. 9. In the look-up tables of FIGS. 8 and 9, F stands for FILL and NF stands for NO FILL. The look-up tables of FIGS. 8 and 9 are empirically derived, based on the local concavity or convexity of the object.

As shown in block A of FIG. 7, the current point is set to the first point in the perimeter buffer. Decision diamond B then asks if the current point is beyond the last point in the buffer. If so, then the module is done as shown in block C. Using the look-up-table as shown in FIG. 8, the value of the status variable is assigned based on the first and second direction code values, $next_i$ and $prev_i$ as shown in block D of FIG. 7. The current point is then moved to the next point in the perimeter buffer as shown in block E of FIG. 7. The loop through decision diamond B and blocks D and E is repeated until the current point is beyond the last point in the buffer, at which point the part of READ COLOR as shown in FIG. 7 is done as shown in block C.

Figure 10A:
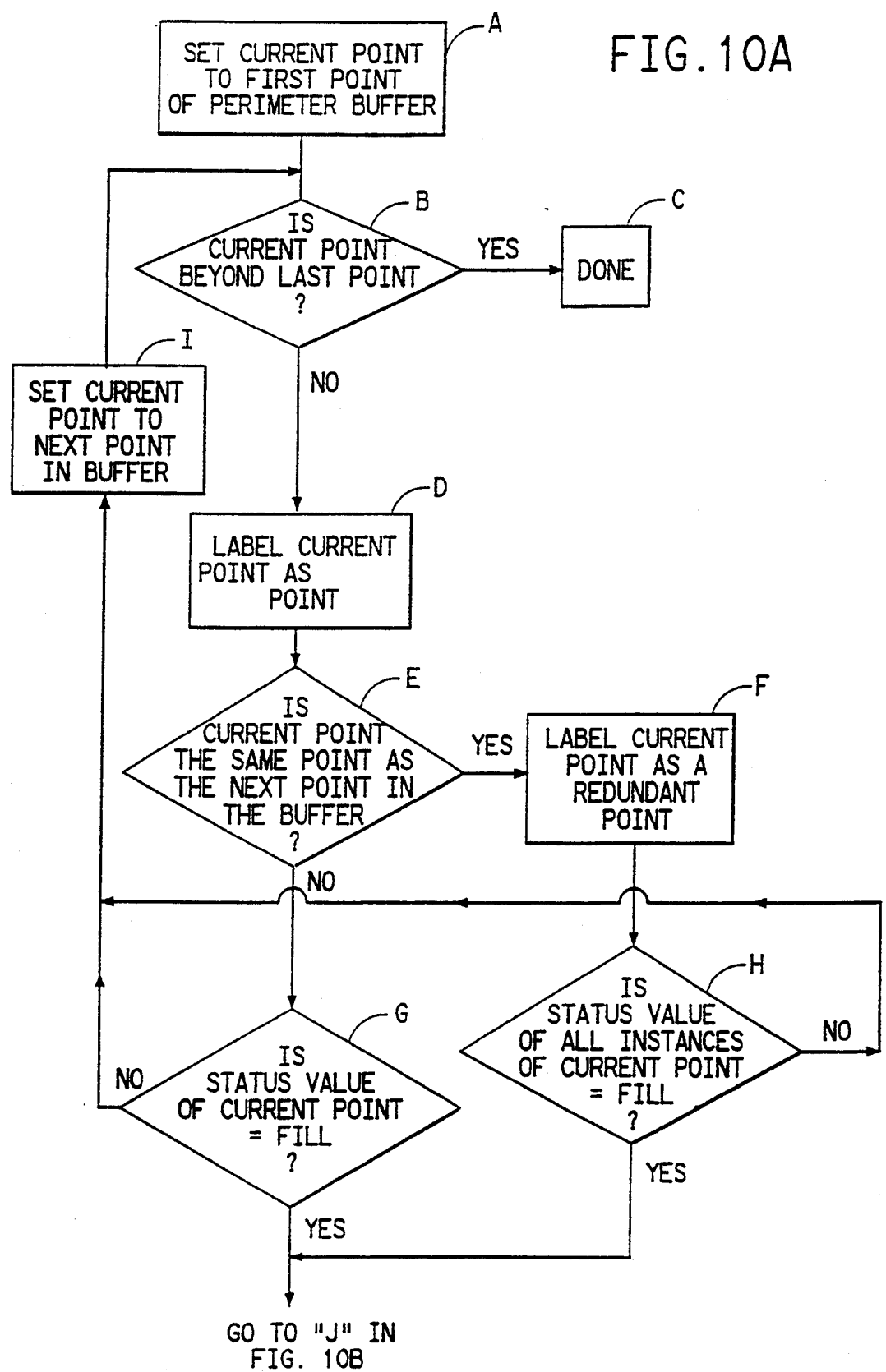
FIGS. 10A and 10B are a flow chart showing the steps of part of the module READ COLOR for the implementation of the first embodiment of the present invention where the perimeter points in the perimeter buffer are first sorted by row, then by column.
Figure 10B:
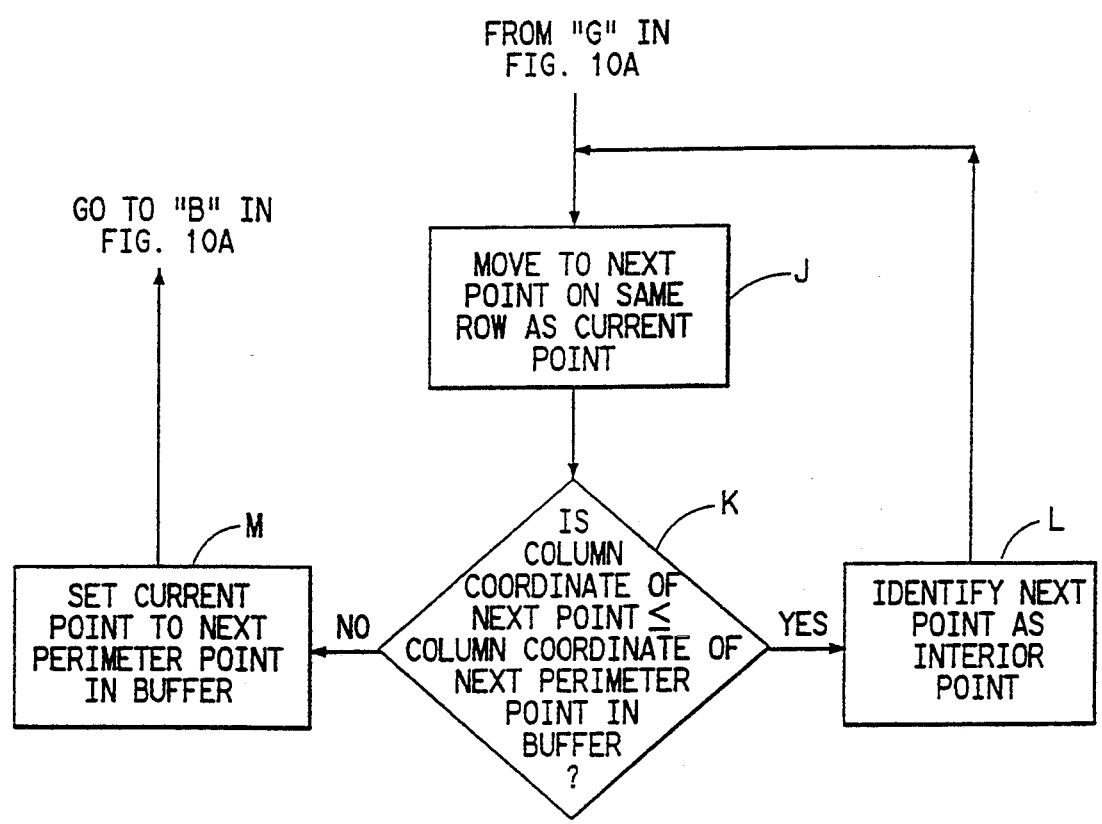

The method of the first embodiment of the present invention further comprises the step of designating as the interior points of the object each point on the same line segment as the perimeter point being examined and lying between the examined perimeter point and the next perimeter point in the sorted perimeter buffer, where the examined perimeter point is assigned the first value, FILL, of the status variable. This step is shown generally in block G of FIG. 1 and is performed in the module READ COLOR. The flow chart for the first implementation of the first embodiment of the present invention is illustrated in FIGS. 10A and 10B, it being understood that analogous flow charts exist for the second, third and fourth implementations. In the first and third implementations, where the perimeter points in the perimeter buffer are first sorted by row, then by column, the designating step comprises the sub-step of designating as the interior points of the object each point on the same row as the perimeter point being examined and lying between the examined perimeter point and the next perimeter point in the row-column sorted perimeter buffer. In the second and fourth implementations, where the perimeter points in the perimeter buffer are first sorted by column, then by row, the designating step comprises the sub-step of designating as the interior point of the object each point on the same column as the perimeter point being examined and lying between the examined perimeter point and the next perimeter point in the column-row sorted perimeter buffer.

The method of the first embodiment of the present invention further comprises the step of checking for redundant perimeter points. This step is performed in the module, READ COLOR, as illustrated in FIGS. 10A and 10B by decision diamond E and block F. A redundant perimeter point is one which has been accessed or traversed more than once during the sequential tracing of the object. For example, this could occur at a cross-over point, which is a point which has been crossed over more than once during the tracing step. When this redundant perimeter point checking is performed, the step of designating all points lying between each redundant perimeter point and the next perimeter point on the same line segment as the interior points of the object occurs only when all instances of each redundant perimeter point are assigned the first value of the status variable (FILL).

As shown in block A of FIG. 10A, the first step of READ COLOR which is run for the first implementation of the first embodiment is to set the current point to the first point of the perimeter buffer. Decision diamond B then asks whether the current point is beyond the last point of the perimeter buffer. If so, the module is done as shown in block C. If the current point is not beyond the last point, then the current point is labeled as an interior point as shown in block D. Then decision diamond E asks whether the current point is the same point as the next point in the buffer. If it is, then the current point is labeled as redundant as shown in block F. Then decision diamond H asks if the status variable of all instances of the current point is equal to FILL. If the answer is yes, then READ COLOR moves to the next point on the same row as the current point as shown in block J. If the answer is no, the current point is set to the next point in the buffer as shown in block I and the module returns to decision diamond B. Returning to decision diamond E, if the current point is not the same point as the next point in the buffer, then decision diamond G asks if the status value of the current point is equal to FILL. If it is not, the module returns to decision diamond B. The loop through B and D-I continues until the current point is beyond the last point, at which time the part of READ COLOR as illustrated in FIGS. 10A and 10B is done as shown in block C of FIG. 10A. Returning to decision diamond G, if the status value of the current point is equal to FILL, then the module READ COLOR moves to the next point on the same row as the current point, as shown in block J. Decision diamond K then asks if the column coordinate of the next point is less than or equal to the column coordinate of the next perimeter point in the perimeter buffer. If it is, then the next point is identified as an interior point as shown in block L. After identifying the interior points of an object as shown in block L of FIG. 10B, the gray level value of each interior point may be determined, and the object may be characterized by using the gray level values as described below. In addition, a predetermined gray level may be assigned to each interior point to label the object. After the next point is identified as the interior point as shown in block L, the loop through block J and diamond K continues until the column coordinate of the next point is greater than the column coordinate of the next perimeter point in the perimeter buffer. Then the current point is set to the next perimeter point in the buffer as shown in block M. The loop through B-M until the current point is beyond the last point in the buffer, at which point the part of READ COLOR as illustrated in FIGS. 10A and 10B is done, as shown in block C of FIG. 10A.

As noted above, the method of the first embodiment of the present invention further includes the steps of determining the gray level value of each interior point and characterizing the object by using the gray level values of the interior points. The characterizing step may comprise determining the texture of the object. Alternatively, or in addition, the characterizing step may comprise determining the color of the object. Alternatively, or in addition, the characterizing step may comprise determining any patterns which are present in the object.

When color is used to characterize the object, or as a predetermined attribute value to validate the object, as will be described below, the method of the present invention includes the sub-step of calculating at least one color parameter for at least one interior point of the candidate object. By color parameter, it is meant any parameter which is related to the color content of the object. More specifically, three common parameters used in color theory are hue, saturation and lightness as defined in "Color Science, Concepts and Methods, Quantitative Data and Formulae", by G. Wyszecki and W. S. Stile, John Wiley & Sons (1967). In a preferred application of the first embodiment, only the color parameter, hue, is calculated. However, it is obvious that any color parameter or combination of color parameters could be used to identify or characterize a candidate object by its color content.

Figure 11A:
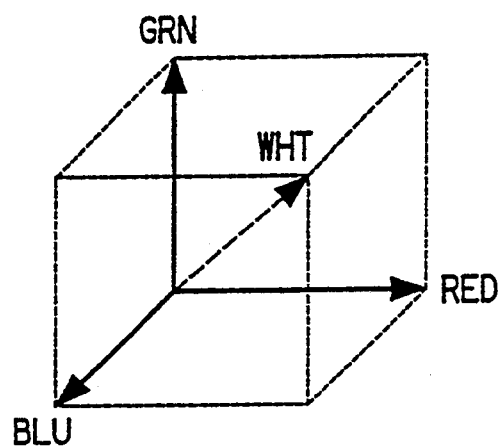
FIG. 11A is a schematic diagram showing a Red-Green-Blue color space.
Figure 11B:
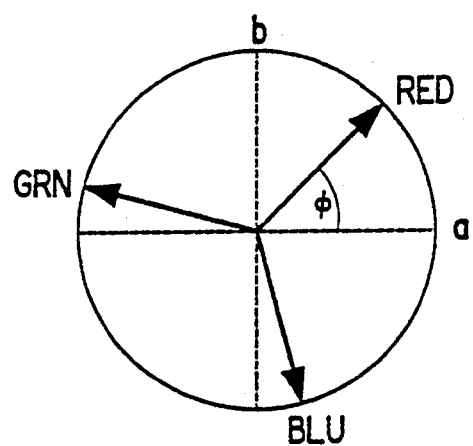
FIG. 11B is a schematic diagram showing a Red-Green-Blue hue circle.

The gray level of an interior point may be described using "RGB" information of standard color theory, with R designating red content, G designating green content, and B designating blue content. Shown in FIG. 11A is a description of RGB color space, and shown in FIG. 11B is a simplification of that space, known as the RGB hue circle. A simple way to calculate a relative hue parameter, known as hue angle, is illustrated with reference to FIGS. 11A and 11B. The value of the hue angle of an object can range from 0°–360°, as it is an angle $\theta$ in the RGB hue circle which is a measure of the relative admixture of red, green and blue colors. The angle, $\phi$ is a selected "offset angle" and is an adjustable parameter which can be optimized for a specific application. The angle $\phi$ is chosen such that for the problem of interest, none of the hue angles of the valid object come too close to 0° to 360°. The reason for avoiding the 0° (or 360°) angle is due to the discontinuity in the value of the hue angle for this angle.

The hue angle of each interior point in an object can be calculated. The hue angle $\theta$ calculated from the RGB hue circle using the following equations:

$$a = R \cos(\phi) + G \cos(120+\phi) + B \cos(240+\phi) \quad (1)$$

$$b = R \sin(\phi) + G \sin(120+\phi) + B \sin(240+\phi) \text{ hue angle} = \tan^{-1}(b/a) \quad (2)$$

Where:
$\phi$ = adjustable offset angle
R = gray level of a point in the image when the image is viewed through a red filter.
B = gray level of a point in the image when the image is viewed through a blue filter.
G = gray level of a point in the image when the image is viewed through a green filter.
a, b = projections of the R,G,B vector onto the hue circle.

The mean hue is derived by averaging the hue angle for each interior point over the object.

The hue magnitude, which is the length of the hue angle vector in the RGB hue circle, is a measure of how much color an object has and is calculated as:

$$\text{Hue magnitude} = a^2 + b^2 \quad (3)$$

The mean hue angle and the hue magnitude can be used to determine the hue content of an object. These parameters used to characterize an object can be compared with predetermined attribute values in order to identify an object, as will be fully explained below with respect to the second embodiment.

In a specific application of the first embodiment of the present invention, the concept of entropic thresholding is employed. The concept of entropy in information theory for signal processing was first proposed by Shannon in an article entitled "A Mathematical Theory of Communication", Bell System Technology J., Vol. 27, July 1948, pp. 379-423. Shannon showed that the entropy function:

$$H(p_1, p_2, \ldots, p_n) = -\lambda \sum_{k=1}^{n} p_k \ln p_k \quad (4)$$

uniquely satisfies the following three properties:
(a) $H(p_1, p_2, \ldots p_n)$ is a maximum for:
$p_k = 1/n$ for $k = 1, \ldots n$;
(b) $H(AB) = H(A) + H_A(B)$, where A and B are two finite partitions and $H_A(B)$ is the conditional entropy of partition B given partition A;

$$H(p_1, p_2, \ldots p_n, 0) = H(p_1, p_2, \ldots p_n) \quad (5)$$

In addition, $H_{max}(1/n, \ldots 1/n) = \ln n$. \quad (6)

The idea of using entropy to analyze a gray level histogram of an image was originally proposed by Pun in an article entitled "Entropic Thresholding, a New Approach", Comp. Graphics and Image Proc., Vol. 16, 1981, pp. 210–239. The entropy analysis of Pun was further refined by Kapur et al. in an article entitled "A New Method for Grey-Level Picture Thresholding Using the Entropy of the Histogram", Comp. Graphics and Image. Proc. 29, 1985, pp. 273–285. As shown by Pun and refined by Kapur, the concept of entropy can be extended to two dimensions if the gray level histogram of the image is used to define a probability distribution:

$$p_s = f_s/N \text{ for } s = 1, \ldots N_{gray} \quad (7)$$

where
$f_s$ = frequency of gray level s
N = # pixels in image
$N_{gray}$ = # gray levels It follows that the entropy function of a histogram describing an image with a uniform gray level distribution is at a maximum. The more peaks in the distribution, the lower the entropy.

Figure 12:
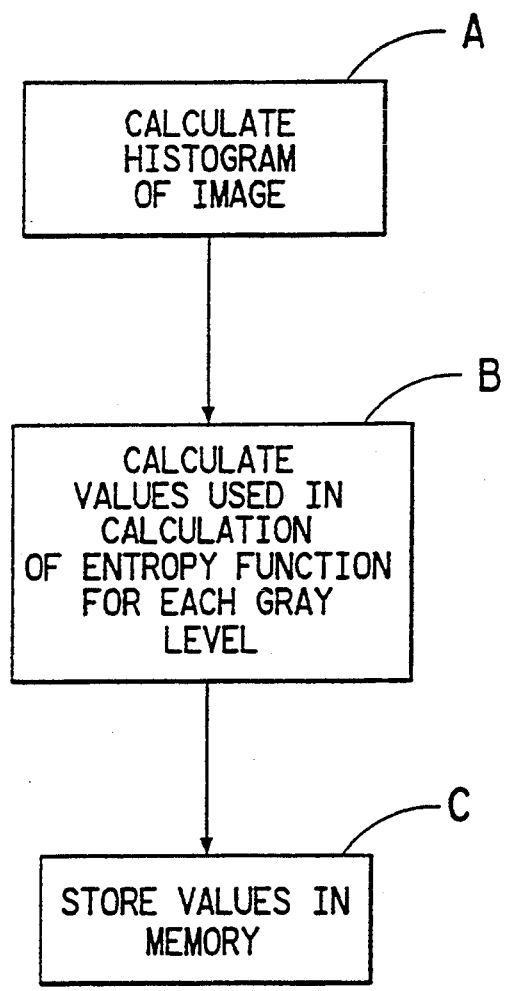
FIG. 12 is a flow chart showing the steps of a module, HISTOGRAM, which is used to generate a gray level histogram of an image.

In this specific application of the first embodiment, where entropic thresholding is employed, the searching step includes the sub-steps of generating a gray level histogram of the image, where the gray level histogram has an entropy function and entropically selecting a threshold gray level such that the entropy function of the histogram is maximized. A module, HISTOGRAM, is used to generate the gray level histogram of the region of interest of the image. The steps for generating the gray level histogram are shown in the flow chart of FIG. 12. As shown in block A of FIG. 12, HISTOGRAM first calculates a histogram of the region of interest of the image. It then calculates the values to be used subsequently in the calculation of the entropy function, $H_s$, for each gray level, s, as shown in block B of FIG. 12. The results of this calculation are stored in memory as shown in block C. This ensures that for subsequent calculations of the entropic threshold gray level, only a simple look-up operation is required.

Figure 13:
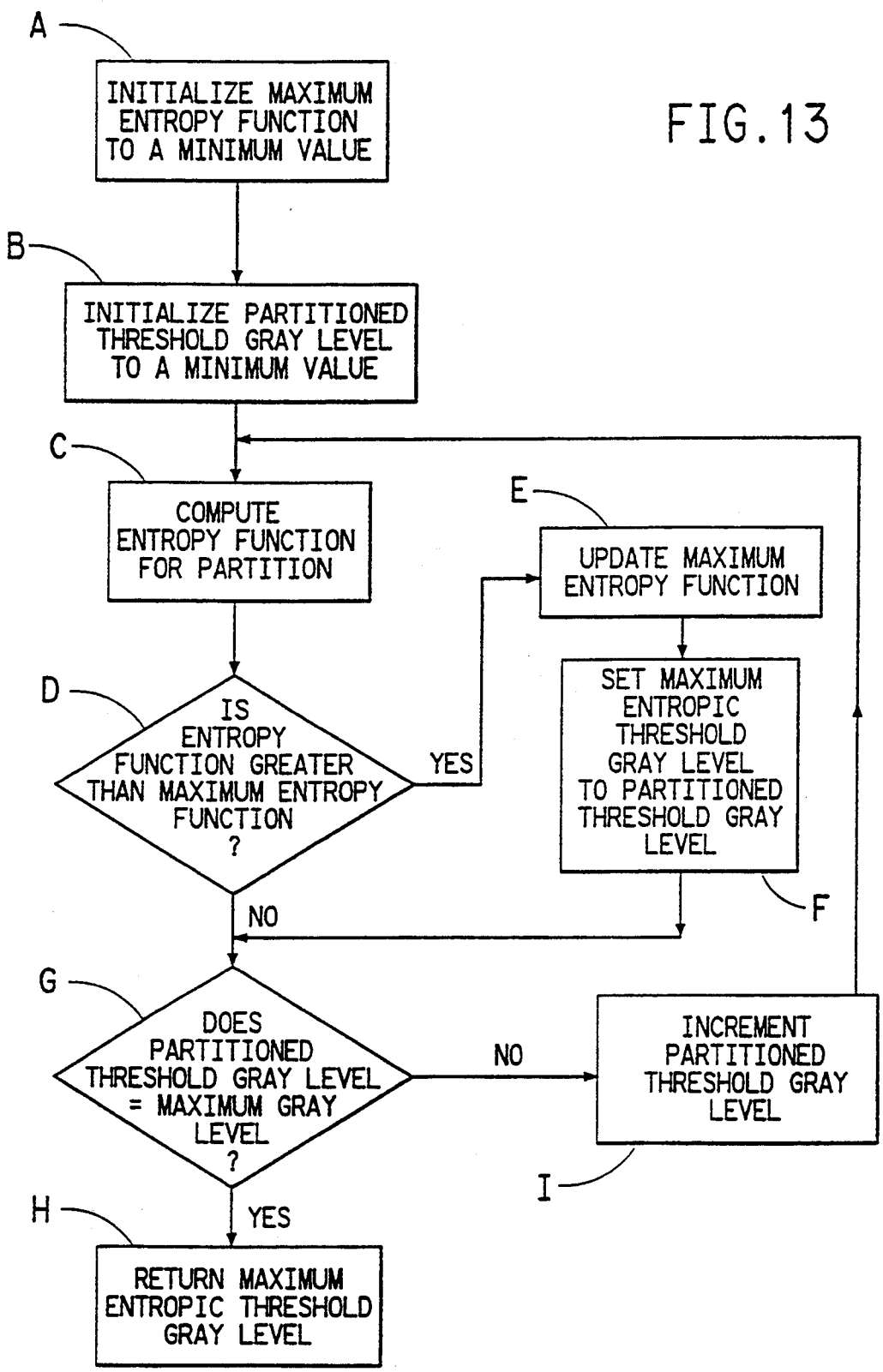
FIG. 13 is a flow chart showing the steps of a module, ENTROPY, which is used to entropically select a threshold gray level such that the entropy function of the histogram is maximized according to a specific application of the first embodiment.

The entropic thresholding application of the method according to first embodiment of the present invention also includes the step of entropically selecting a threshold gray level value such that the entropy function of the histogram is maximized. This step is performed by the ENTROPY module as shown in FIG. 13. As shown in block A of FIG. 13, the first step in maximizing the entropy function of the histogram is to initialize the maximum entropy function to a minimum value.

Figure 14:
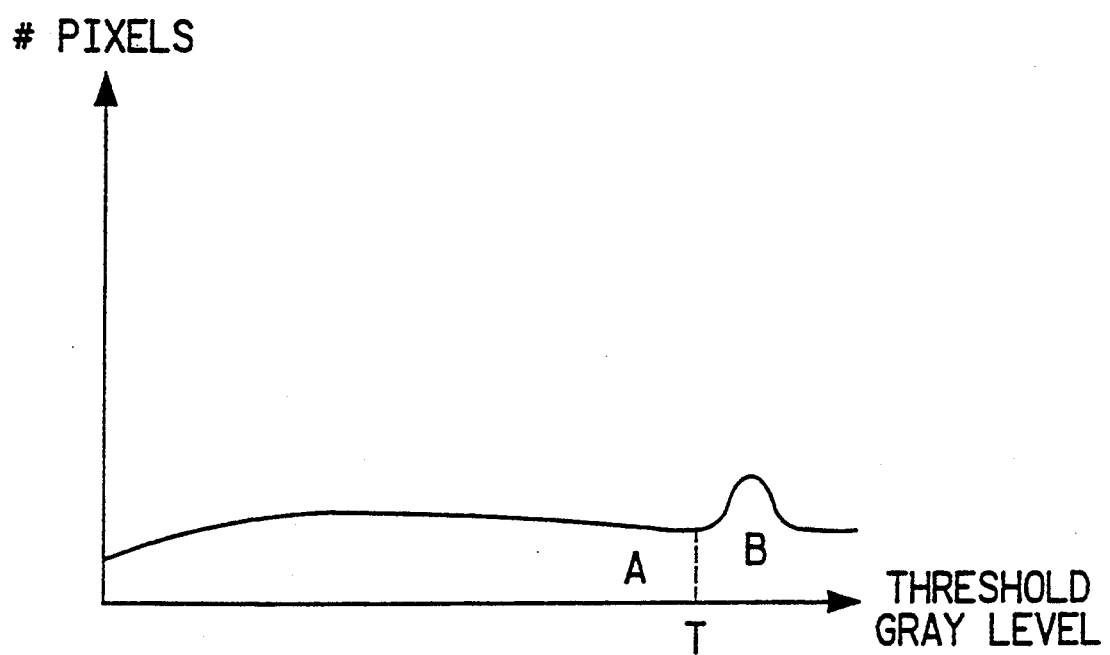
FIG. 14 is a gray level histogram of an image of a single, simple object in a varying background.

The step of entropically selecting a threshold gray level includes the sub-step of sequentially partitioning the gray level histogram at each gray level value into a first partition and a second partition. To illustrate the simple case where a single, simple object in a varying background is identified, a gray level histogram of an image is shown in FIG. 14. The first and second partitions are shown in the histogram of FIG. 14, where the gray level values of the background are represented by a first partition A, and the gray levels of the valid object are represented by a second partition B. In the ENTROPY module, the partitioned threshold gray level value is initialized to a minimum value as shown in block B of FIG. 13.

The step of entropically selecting a threshold gray level also includes the sub-step of computing the entropy function for each partition, where the total entropy function of the histogram is defined as the sum of the entropy function $H_s(A)$ of first partition, A, and the entropy function $H_s(B)$ of second partition, B. This step is shown in block C of FIG. 13 and is mathematically expressed as follows:

For a given threshold gray level value, s,:

$$H_s(A) = - \sum_{i=1}^{s} \frac{p_i}{P_s} \ln\left(\frac{p_i}{P_s}\right) \tag{8}$$

with $$p_i = \frac{f_i}{N}, \quad P_s = \frac{1}{N} \sum_{i=1}^{s} f_i \tag{9}$$

Thus, $$\frac{p_i}{P_s} = \frac{f_i}{\sum_{i=1}^{s} f_i} = \frac{f_i}{N_s} \quad \text{with } N_s = \sum_{i=1}^{s} f_i \tag{10}$$

So, $$H_s(A) = - \sum_{i=1}^{s} \frac{f_i}{N_s} \ln\left(\frac{f_i}{N_s}\right) = \frac{-1}{N_s} \sum_{i=1}^{s} f_i \ln f_i + \ln N_s \tag{11}$$

Similarly, $$H_s(B) = \frac{-1}{N_s'} \sum_{i=s+1}^{N_{gray}} f_i \ln f_i + \ln N_s' \tag{12}$$

where
$N_s' = N - N_s$
and $$H_s(A) + H_s(B) = \ln N_s + \ln N_s' - \frac{1}{N_s} \sum_{i=1}^{s} f_i \ln f_i - \tag{13}$$

$$\frac{1}{N_s'} \sum_{i=s+1}^{N_{gray}} f_i \ln f_i$$

The sum $H_s(A)+H_s(B)$ represents the total entropy function of the gray level histogram of the image. The maximum entropic threshold gray level value is the value of s which maximizes the total entropy function.

Decision diamond D of FIG. 13 asks whether the entropy function of the histogram is greater than the maximum entropy function as initialized in block A. If it is, then the maximum entropy function is updated using the partitioned threshold gray level as shown in block E of FIG. 13. The maximum entropic threshold gray level value is then set to the partitioned threshold gray level value as shown in block F. After the maximum entropic threshold gray level value has been set, or if the entropic function of the histogram is not greater than the maximum entropy function, then decision diamond G of the ENTROPY module as illustrated in FIG. 13 asks whether the partitioned threshold gray level value equals the maximum threshold gray level value. If so, the maximum entropic threshold gray level value is returned as shown in block H of FIG. 13. If not, then the partitioned threshold gray level value is incremented as illustrated in block I of FIG. 13, and the incremented partitioned threshold gray level value is returned to block C, where the entropy function of the incremented, partitioned threshold gray level value is computed. The loop through C–G is repeated until the partitioned threshold gray level value equals the maximum threshold gray level value, at which point the maximum entropic threshold gray level value is returned as shown in block H.

The probability distributions are renormalized in $H_s(A)$ and $H_s(B)$ to include only the gray level values within each of the partitions. With this renormalization, the maximum entropy function occurs right at the edge of the object peak in the gray level histogram as shown at T in FIG. 14. Thus, a new threshold gray level value is selected such that the entropy function of the histogram is maximized. With this maximum choice of threshold for the simple case as illustrated in FIG. 14, the renormalized distribution of the background becomes the least peaky and the most uniform. The total entropy function of the histogram is dominated by the entropy function of the background, since the number of gray level values in the background partition is much larger than the number of gray level values in the object partition.

In the application of the first embodiment where the entropic threshold gray level is maximized, the searching step further includes the sub-step of scanning the image for at least one object using the entropically selected threshold gray level value. More specifically, the portion of the image scanned may comprise a plurality of pixels, and each pixel has a gray level value less than the upper delimiter plus an increment. The upper delimiter also has the notation MAX. The increment is equal to the difference between MAX, the maximum gray level value of the region being searched, and MIN, the minimum gray level value of the region being searched, resulting in a new maximum gray level value, Gray level$_{max}$:

$$\text{Gray level}_{max} = 2 \times \text{MAX} - \text{MIN} \tag{14}$$

Regions in the image where the gray level value exceeds gray level$_{max}$ are ignored in the search.

The searching step further includes the sub-step of tracing the candidate object having boundary gray level values determined by the entropically selected threshold gray level value. In this application, the searching step is performed by a module SEARCH IMAGE as shown in FIG. 15, a module FIND OBJECT as shown in FIG. 16, and the module GET PERIM as shown in FIG. 3.

Figure 15:
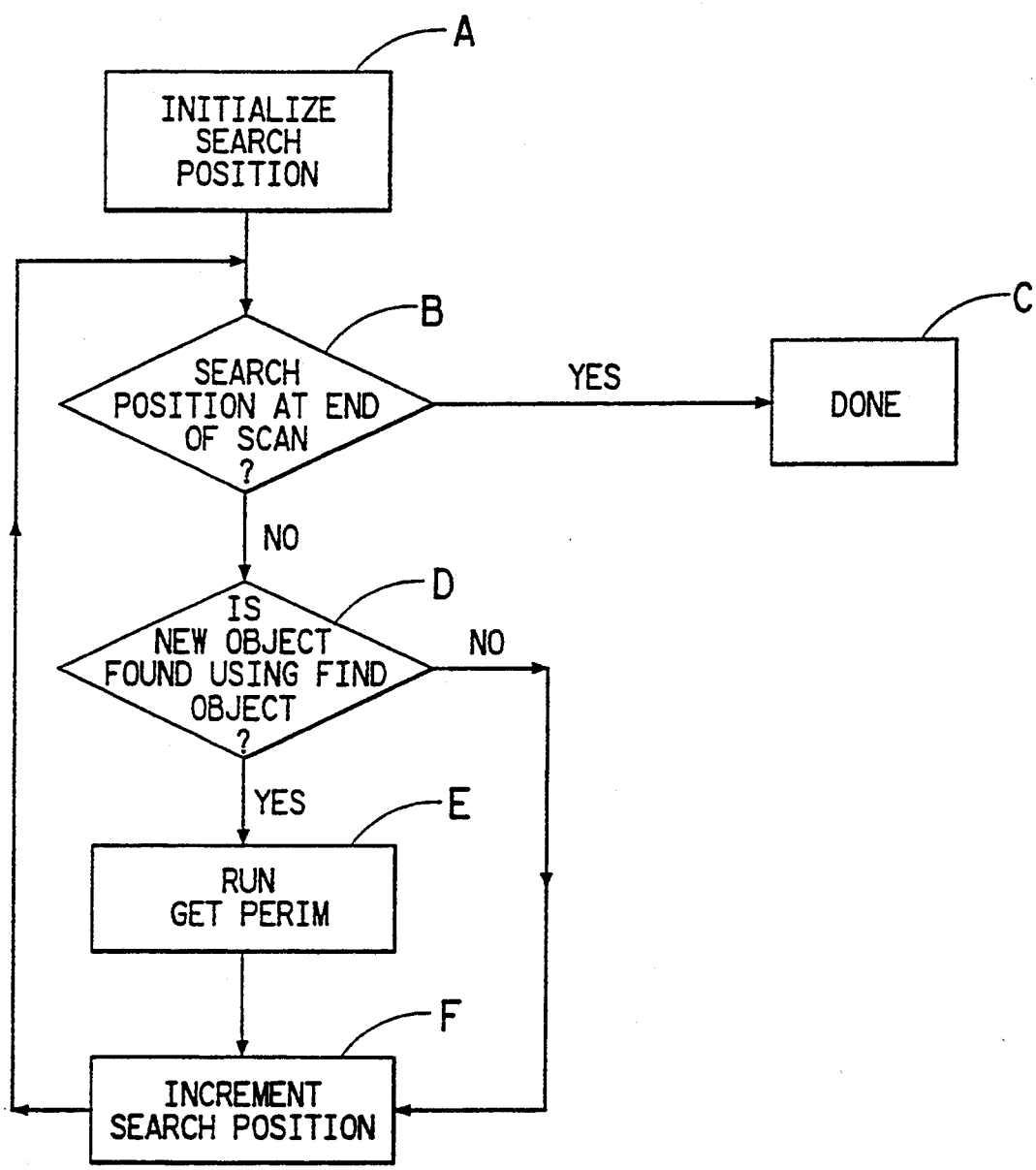
FIG. 15 is flow chart showing the steps of a module, SEARCH IMAGE, which is used to search an image for at least one candidate object.

As illustrated by block A of FIG. 15, the first step is to initialize the search position. The module SEARCH IMAGE searches the region of interest with the current entropically selected threshold gray level value. Decision diamond B of FIG. 15 then asks whether the search position is at the end of the scan. If so, SEARCH IMAGE is done.

If the search position is not at the end of the scan, then the module SEARCH IMAGE searches the region of interest with the current entropically selected threshold gray level value until it finds a point which has a gray level value exceeding the entropically selected threshold gray level value using a module FIND OBJECT. To identify objects darker than the background, the image is inverted immediately after it has been generated. Such a point might be the first point of a new object. Decision diamond D of FIG. 14 asks whether a new object has been found using the module FIND OBJECT. If the object has not already been traced in the current search, the module SEARCH IMAGE proceeds to trace the object by running the module GET PERIM, as shown by block E of FIG. 15. The module GET PERIM is described in detail above with respect to FIG. 3. After the object has been traced, the search position is incremented as illustrated in block F of FIG. 15. The loop through B–F is continued until the module SEARCH IMAGE is at the end of the search as indicated by decision diamond B. Alternatively, if a new object has not been found as indicated by decision diamond D, then the search position is incremented as illustrated in block F, thus bypassing the tracing step, and the loop through B–I is continued until SEARCH IMAGE is at the end of the search.

Figure 16:
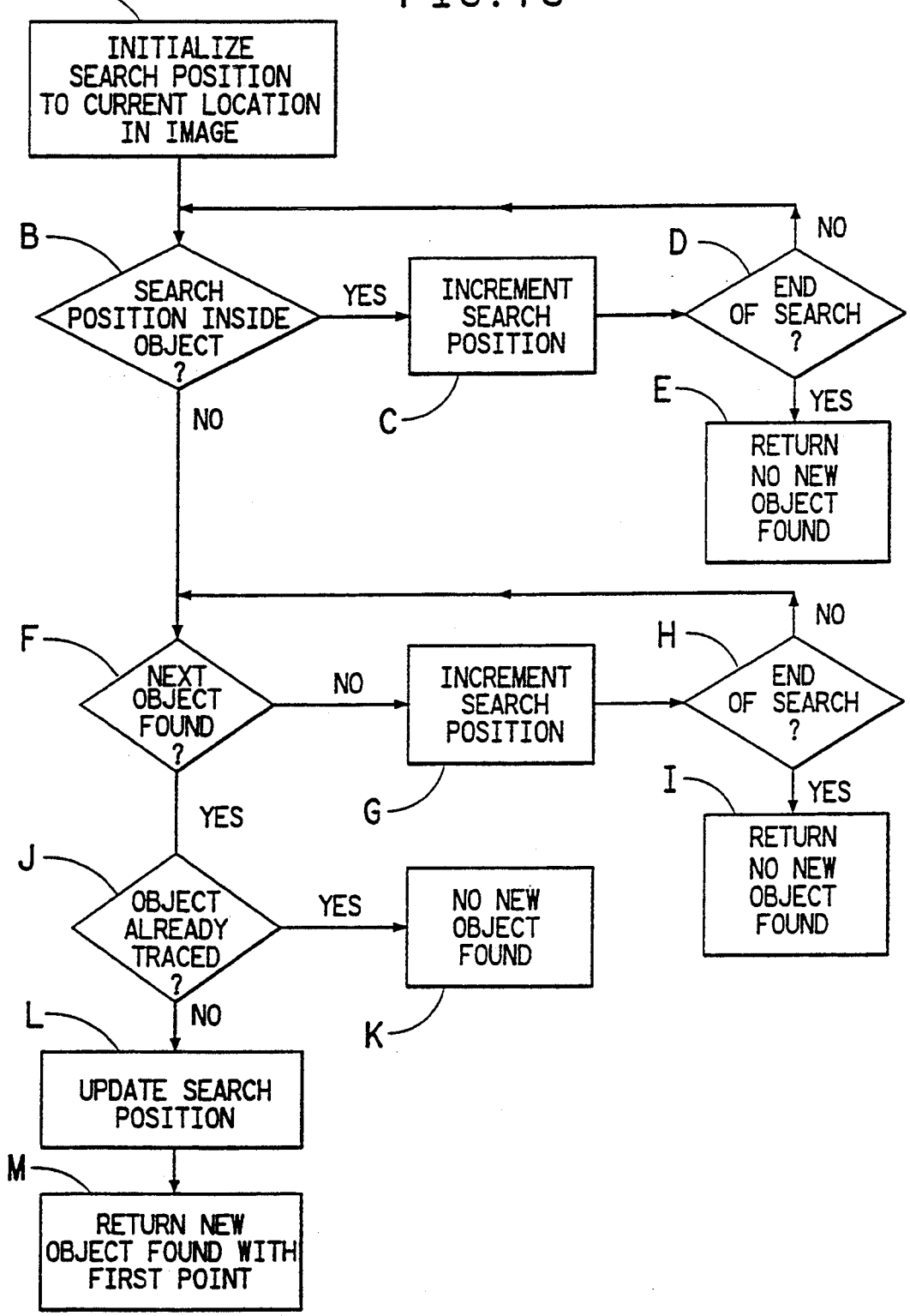
FIG. 16 is a flow chart illustrating the steps of a module, FIND OBJECT, which is also used to search the image.

The steps of the module FIND OBJECT are illustrated in FIG. 16. The first step in FIND OBJECT is to initialize the search position to the current location of the image being searched as shown in block A. Decision diamond B then asks whether the search position is inside the object. If so, then the search position is incremented as illustrated by block C, and decision diamond D asks whether the FIND OBJECT is at the end of its search. If so, then no new object is found as indicated in block E. If not, then decision diamond B asks whether the incremented search position is inside the object. This process of looping through B–E continues until the search position is not inside the object. At this point, decision diamond F asks whether a next object has been found. If not, then the search position is incremented as illustrated in block G of FIG. 15, and decision diamond H asks whether SEARCH IMAGE module is at the end of its search. If so, then no new object found is returned as indicated by block I. If not, then decision diamond F again asks whether a next object has been found using the incremented search position. This process of looping through F–I continues until a next object has been found. Decision diamond J asks whether the object which has been found has already been traced. If so, the new object found is returned as indicated by block K. If the object which has been found has not already been traced, then the search position is updated as illustrated by block L, and a new object found is returned as indicated by block M of FIG. 16. By running SEARCH IMAGE, FIND OBJECT and GET PERIM as described above, the object returned in block M of FIG. 16 is then traced to determine the interior points thereof as shown in block C of FIG. 1.

Figure 17:
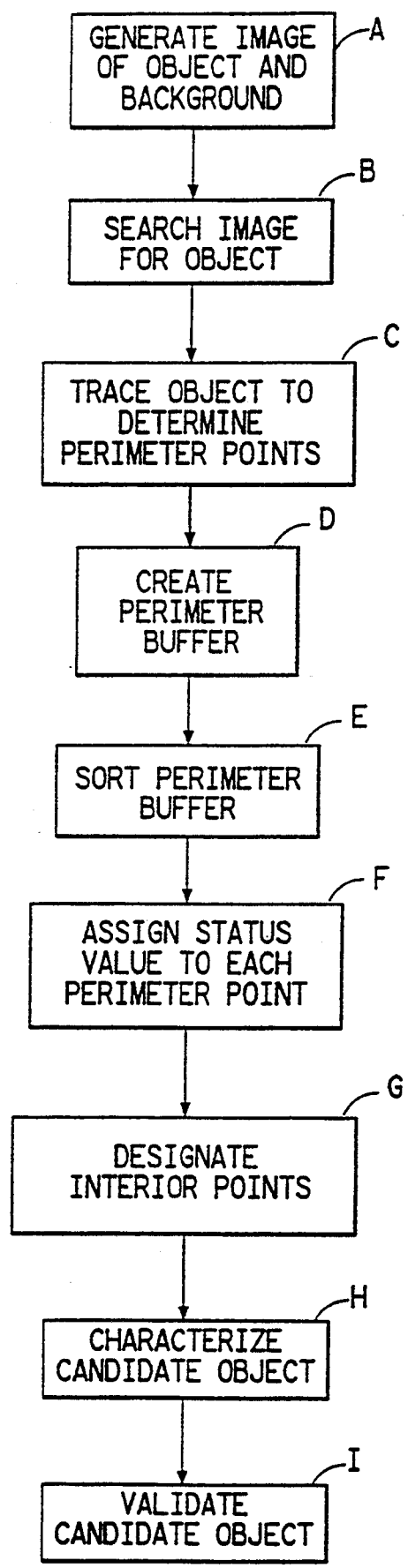
FIG. 17 is a block diagram showing the overall method of a second embodiment of the present invention.

In accordance with a second embodiment of the present invention, there is provided a method of identifying at least one valid object having at least one predetermined attribute value in a background. The method comprises generating an image of the object and the background. FIG. 17 is a block diagram showing the overall method of the second embodiment of the present invention. An image is generated as shown in block A of FIG. 17. As in the previous embodiment, the hardware used to implement the method of the second embodiment of the present invention must first be initialized when the image is generated. The image of the object and the background may be generated by a camera. As with the previous embodiment, a CCD camera is used, although any type of camera may be used without departing from the general principles of the present invention. The image is then digitized and stored by a frame grabber or a video digitizer.

The method of identifying at least one valid object of the present invention also includes the step of searching the image for at least one candidate object using at least one automatically calculated threshold, wherein the candidate object has at least one candidate object attribute value. This step is shown in block B of FIG. 17. In the second embodiment of the present invention, the entire object may be searched. However, in instances where it is known that an identifying feature of an object in question lies in a particular portion of an object, the searching step may comprise searching only a portion of the object. The automatically calculated threshold may be determined in a variety of ways. For instance, the automatically calculated threshold is determined using a histogram as described above in the first embodiment, or a co-occurrence matrix as described in Pal and Pal in an article entitled "Entropic Thresholding", Signal Processing, Vol. 16, 1989, pp. 97–108.

The ability to automatically threshold an image in order to identify and validate candidate objects makes it possible to perform "on-line" image analysis for monitoring and controlling manufacturing and industrial processes. This capability would not be possible in general if a manual thresholding scheme is used, since the threshold (or thresholds) would have to be adjusted on an image-by-image basis. Performing unsupervised automatic object identification enables the use of image analysis techniques for a wide range of industrial applications. In environments where the background varies unpredictably, where many methods which do not use an automatically calculated threshold fail, the recursive calculation of an automatic threshold, as described below, is particularly powerful.

The method of identifying at least one valid object of the present invention further comprises the step of determining the perimeter points of the candidate object. This step is done by tracing the object as shown in block C of FIG. 17. The coordinates of each perimeter point of the object are determined by the module GET PERIM as described above with respect to FIG. 3. As in the first embodiment, the step of determining the perimeter points may comprise tracing the object sequentially in the clockwise direction, or tracing the object sequentially in the counterclockwise direction.

The method of identifying at least one valid object of the present invention further comprises the step of creating a perimeter buffer. This step is shown generally by block D of FIG. 17 and is performed in the module, LOAD BUFFER, as shown and described above with respect to FIGS. 6A and 6B.

The method of identifying at least one valid object of the present invention also comprises the step of sorting the perimeter points in the perimeter buffer in a predetermined order to create a sorted perimeter buffer. This step is shown in block E of FIG. 17. The sorting step is performed as described above with respect to the first embodiment for tracing the object in either the clockwise or the counterclockwise direction.

The method of identifying valid objects of the present invention also comprises the step of assigning to each perimeter point a status variable having one of a first and a second value. This step is shown generally in block F of FIG. 17 and is performed in the module READ COLOR as shown and described above with respect to FIGS. 7 and 10.

The method of identifying at least one valid object in accordance with the second embodiment of the present invention further comprises the step of designating as the interior points of the object each point on the same line segment as the perimeter point being examined and lying between the examined perimeter point and the next perimeter point in the sorted perimeter buffer, where the examined perimeter point is assigned the first value, FILL, of the status variable. This step is shown generally in block G of FIG. 17 and is performed in the module READ COLOR as described above with respect to FIGS. 7 and 10 for any of the implementations of the first embodiment.

The method of identifying at least one valid object in accordance with the second embodiment of the present invention further comprises the step of labeling the object by assigning a predetermined gray-level value to each designated interior point. This labeling is done in the module READ COLOR, as shown and described above with respect to block L in FIG. 10B.

The method of identifying at least one valid object of the present invention further comprises the step of checking for redundant perimeter points. This step is illustrated in the flow chart of FIG. 10A by decision diamond E and block F, as described above. When this redundant interior point checking is performed, the step of designating all points lying between each redundant perimeter point and the next perimeter point on the same line segment as the interior points of the object occurs only when all instances of each redundant perimeter point are assigned the first value of the status variable (FILL), as described above with respect to the first embodiment.

The method of the second embodiment of the present invention further includes the steps of determining the gray level value of each interior point and characterizing the object by using the gray level values of the interior points. The characterizing step may comprise determining the texture of the object. Alternatively, or in addition, the characterizing step may comprise determining the color of the object. Alternatively, or in addition, the characterizing step may comprise determining any patterns which are present in the object.

The method for identifying at least one valid object of the present invention also comprises the step of characterizing the candidate object by the candidate object attribute value. This step could be the same as the step of characterizing the object by using the gray level values of the interior points, such as when the object attribute values use the interior point information. In one instance, the candidate object attribute value may be color. Alternatively, or in addition, the candidate object attribute value may be the texture of the object, or in another instance, a pattern in the object.

The method of identifying at least one valid object of the present invention also comprises the step of validating the candidate object having the valid object predetermined attribute value to identify the valid object. This step is shown in block I of FIG. 17. The validating step includes the sub-steps of calculating the candidate object attribute values and comparing the candidate object attribute values to the valid object predetermined attribute values to validate candidate objects. The calculating sub-step may further include the sub-step of storing the candidate object attribute values. The validating step is performed by a module, COL FILT, as shown and described with respect to FIG. 18. In this embodiment of the present invention, COL FILT uses only size and color as valid object predetermined attribute values. In general, other attribute values may be used for the valid object predetermined attribute values.

The method of the second embodiment of the present invention further includes the step of filtering the image. The filtering step is performed by the module COLFILT for either inhomogeneous or inhomogeneous objects. The filter in step for filtering inhomogenous objects comprises three conditions under which objects should be deleted. The first condition deletes objects when an object has an area less than a predetermined minimum area. The second condition deletes objects when objects when the object has a mean hue angle less than a predetermined minimum and a hue magnitude greater than a predetermined minimum. The third condition deletes objects when an object has a mean hue angle greater than a predetermined maximum and has a hue magnitude greater than a predetermined minimum. Hue angle and hue magnitude are calculated as described above in equations (1) and (2) above.

Figure 18:
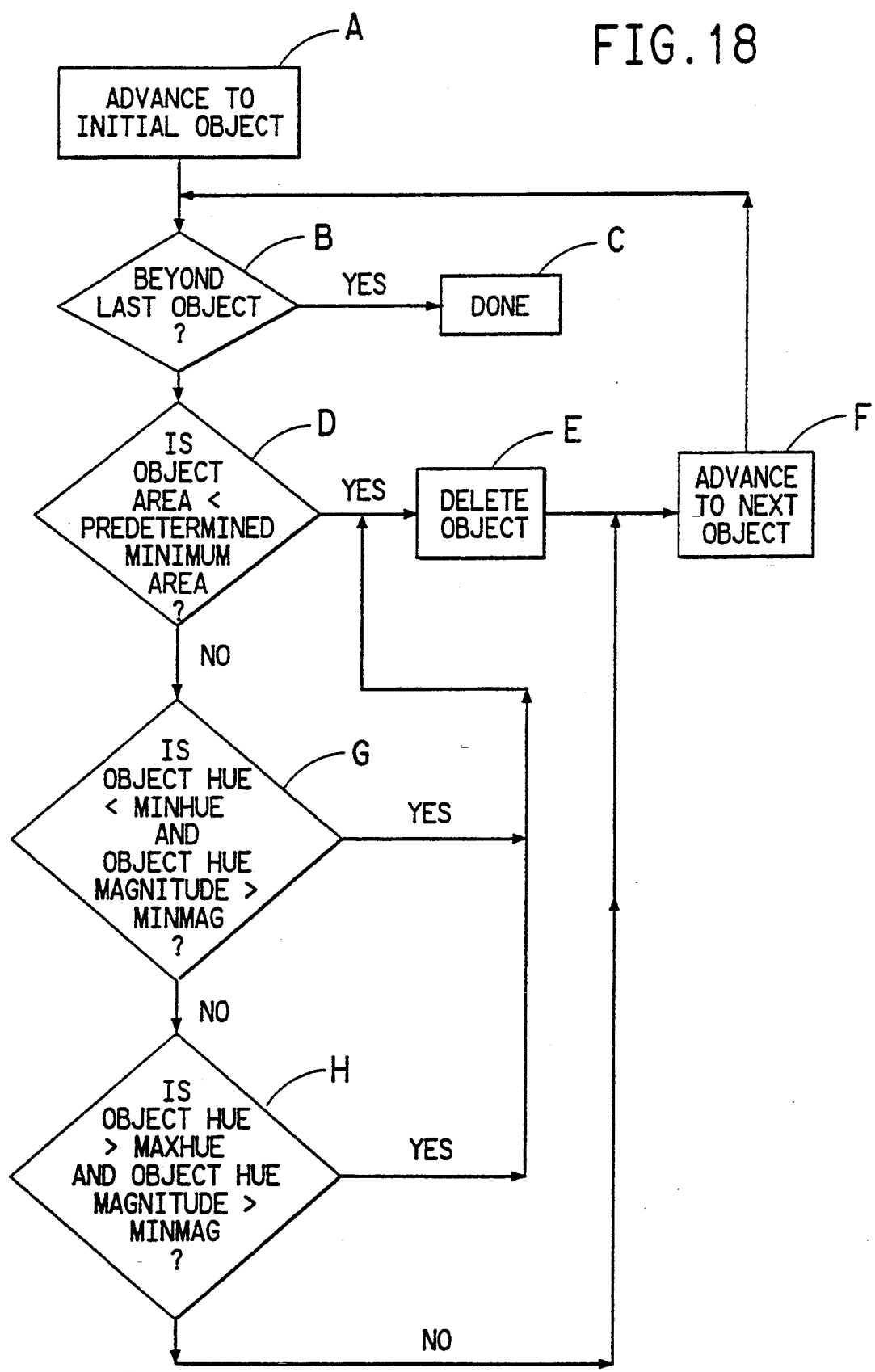
FIG. 18 is a flow chart showing the steps of a module, COL FILT, which is used to filter objects.

As shown in block A of FIG. 18, the first step of COL FILT for filtering objects is to advance to the initial object. Decision diamond B then asks whether COL FILT is beyond the last object. If it is, then the module is done as shown in block C. If it is not, then decision diamond D asks whether the object has an area greater than a predetermined minimum area. If the answer is yes, then the object is deleted as shown in block E, and the module advances to the next object as shown in block F. Decision diamond B then asks whether COL FILT is beyond the last object, and the loop through B-F continues until the object area is not less than the predetermined minimum area. At this point, decision diamond G asks whether the mean hue angle of the object is less than a predetermined minimum value, MINHUE, and whether the hue magnitude of the object is greater than a predetermined minimum value, MINMAG. If the answer to both these questions is yes, the object is deleted as shown in block E, and the module is advanced to the next object as shown in block F. The loope through A and B continues until COL FILT is beyond the last object, at which point it is done as shown in block C. If COL FILT is not beyond the last object, the loop through A-G continues until the object hue is greater than or equal to MINHUE, or the object hue magnitude is less than or equal to MINMAG. Then decision diamond H asks whether the mean hue angle of the object is greater than a predetermined maximum value, MAXHUE and whether the hue magnitude of the object is greater than the predetermined minimum value, MINMAG. If the answer to both these questions is yes, the object is deleted as shown in block E, and the module is advanced to the next object as shown in block F. The loop through A and B continues until COL FILT is beyond the last object, at which point it is done as shown in block C. If COL FILT is not beyond the last object, the loop through A-H continues until the object hue magnitude is less than or equal to the predetermined maximum value, MAXHUE or the object hue magnitude is less than or equal to the predetermined minimum value, MINMAG. If the answer to either of these questions is no, the object is retained, and the module advances to the next object as shown in block F. The loop through B–H continues until the module is beyond the last object. The module is then done as shown in block C.

The method of the second embodiment of the present invention employs a driver and a kernel for validating candidate objects. The driver stores the attribute values of the valid object, where each value represents the definition of a valid object, e.g., color, edge contrast, area, shape, etc. The driver of the present invention is specific to a given application. In an object-oriented environment, it is straight-forward in many instances to describe an object via a list of attributes such as size, shape, color, etc. For more complex objects, where a simple parametric description might not be possible, one could use a neural network in the driver to identify the object. Parameters derived from the candidate object can be fed into the neural network, which has been trained to recognize specific objects. At this point, the architecture of the present invention begins to resemble a neural vision architecture where there is a feedback loop between the brain and the eye. In the present invention, a high-order driver is intertwined with a lower-order kernel. In this case, a more complex description of the object is used to drive the searching process, which in turn identifies further candidate objects.

The driver drives the kernel. The kernel performs several functions. It automatically calculates an entropically selected threshold gray level value, searches the image and calculates the attribute values for a candidate object. In addition, it performs a validity check on candidate objects by comparing the attribute values of the candidate objects with the predetermined attribute values for the valid objects, which, as noted above, are contained in the driver. It also performs a redundancy check to prevent multiple identification of a valid object.

According to a first, specific application of the second embodiment of the present invention, entropic thresholding is employed for searching the image. In this first, specific application, the step of searching the image includes the sub-step of generating a gray level histogram of the image. The gray level histogram has an entropy function. The module, HISTOGRAM as described above with respect to FIG. 12, is used to generate the gray level histogram of the region of interest of the image. The step of searching the image also includes the sub-step of entropically selecting a threshold gray level value such that the entropy function of the histogram is maximized. This step is performed by the ENTROPY module as described above with respect to FIG. 13.

According to the entropic thresholding application of the second embodiment, the searching step further includes the sub-step of scanning a portion of the image for at least one candidate object using the entropically selected threshold gray level value. The searching step further includes the sub-step of tracing the candidate object having boundary gray levels determined by the entropically selected threshold gray level. In this implementation, the searching step is performed by the module SEARCH IMAGE as described above with respect to FIG. 15, the module FIND OBJECT as described above with respect to FIG. 16, and a module TRACE OBJECT as described in FIGS. 19A and 19B. The basic principles of the TRACE OBJECT module are similar to those described in "Digital Image Processing" by Rafael C. Gonzalez and Paul Wintz, Second Ed., Addison-Wesley Publishing Company, Reading, Mass. (1987).

As shown in block A of FIG. 19A, the first step in the TRACE OBJECT module is to initialize the candidate object attribute values. The TRACE OBJECT module then asks in decision diamond B whether a neighboring perimeter point has been found. If not, the traced object is invalid as illustrated by block C. If the neighboring perimeter point has been found, then decision diamond D asks whether the TRACE OBJECT module is at the first perimeter point of the candidate object. If not, then the candidate object attribute values are updated as illustrated in block E of FIG. 19A. The loop through B–E is then repeated, using the updated candidate object attribute values, until the TRACE OBJECT module is at the first perimeter point of the candidate object. The center of mass coordinate is then calculated as shown in block F of FIG. 19A. Decision diamond G then asks if the candidate object area is too large. If it is, the traced object is invalid as indicated by block H of FIG. 19A.

Figure 19B:
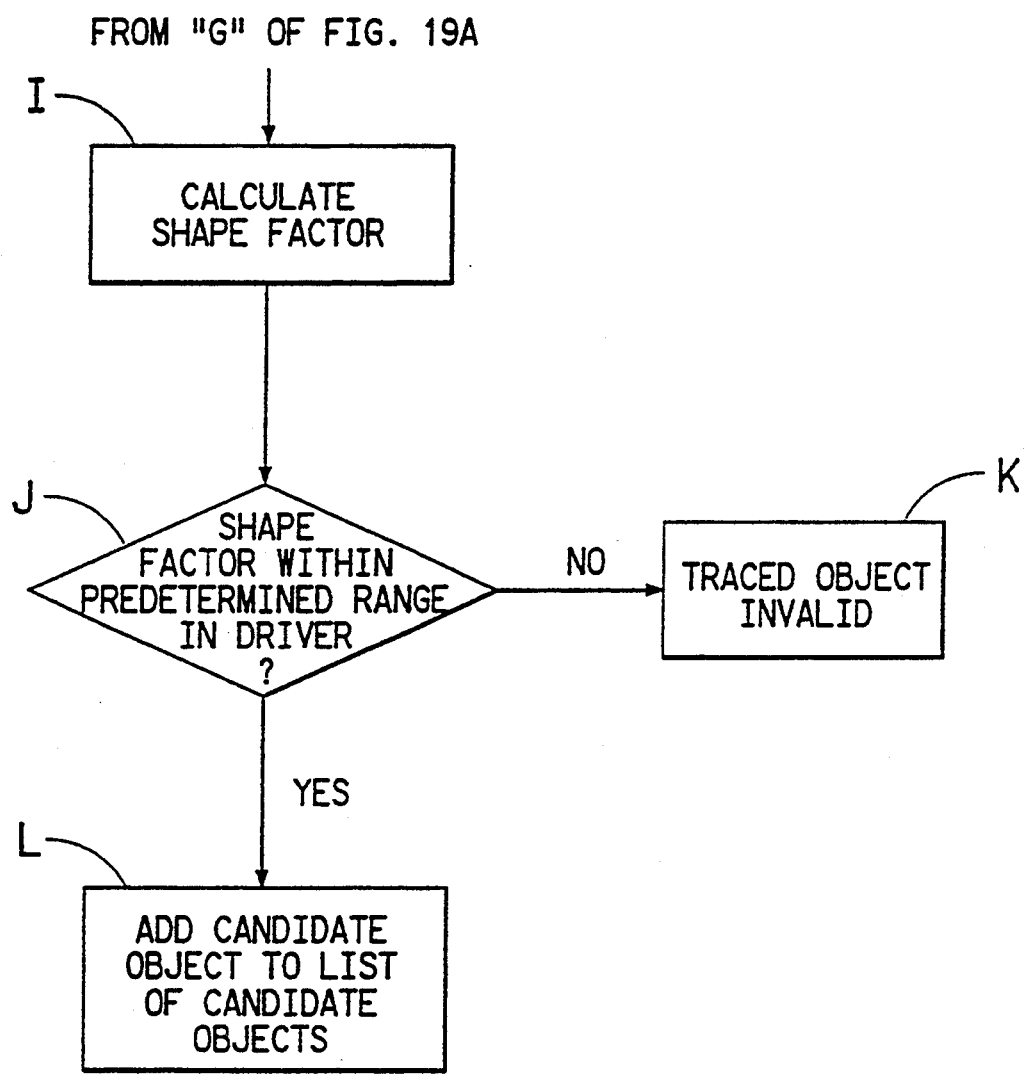

If the candidate object area is not too large, then a shape factor is calculated as shown in block I in FIG. 19B. The definition of the shape factor may vary, depending on the geometry of the object being identified. For instance, the definition of the shape factor for circular objects is:

$$\text{Shape Factor} = 1 - \frac{P^2}{4\pi A} \tag{15}$$

where:
P is the perimeter of a candidate object; and
A is the area of the candidate object.

TRACE OBJECT then checks if the shape factor is within a predetermined range as contained in the driver as shown in decision diamond J in FIG. 19B. If the shape factor does not fall within the predetermined range, then the traced object is invalid as illustrated by block K of FIG. 19B. If the shape factor falls within the predetermined range, then the candidate object is added to the list of valid objects maintained by the kernel as shown in block L.

Figure 20:
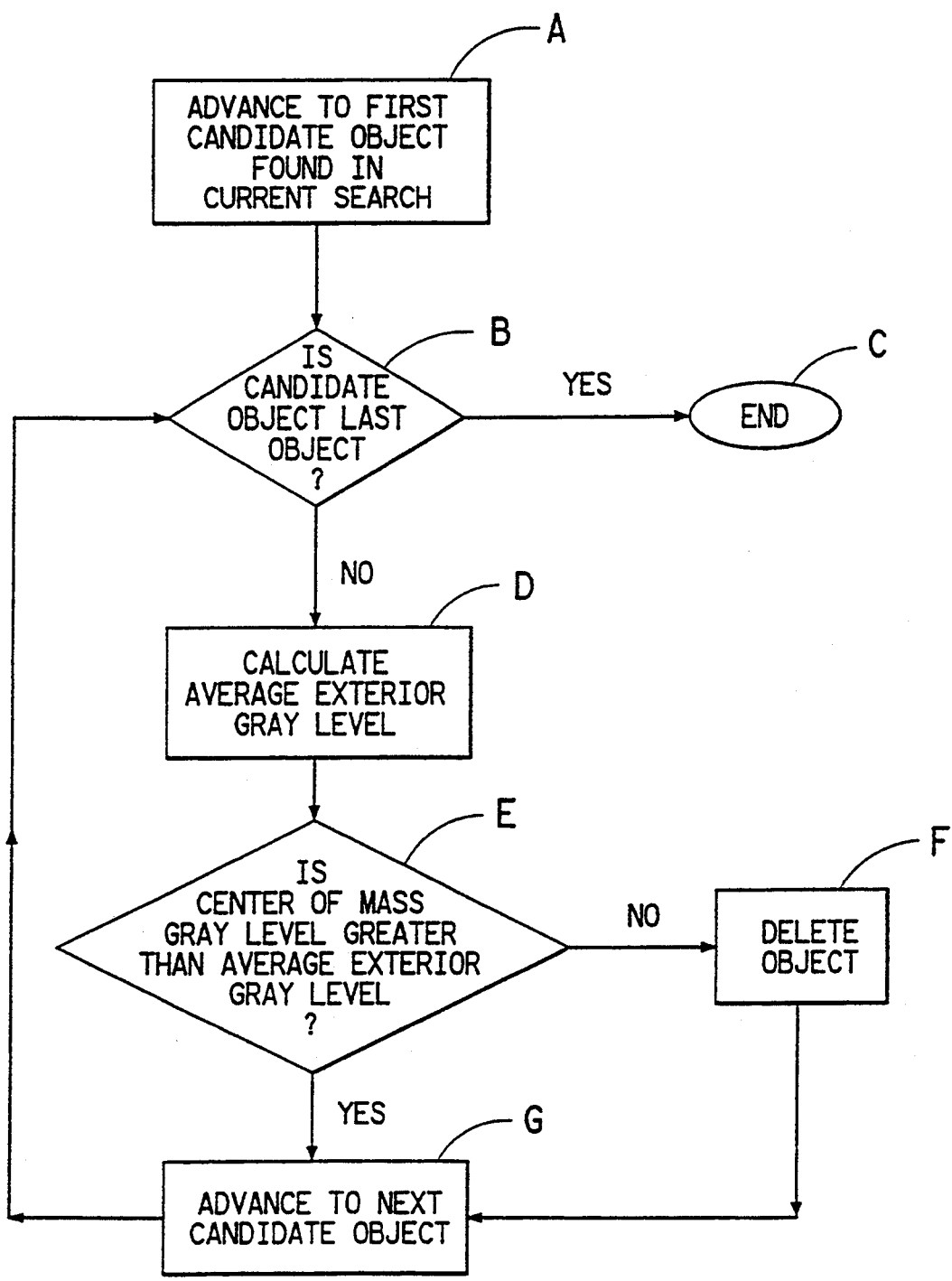
FIG. 20 is a flow chart illustrating the steps of a module, CHK GRAY, which is used to detect whether a candidate object is relatively lighter or darker than the background.

After all the candidate object have been traced in the current search, the module CHK GRAY as shown in FIG. 20 is called to check whether the candidate objects are relatively lighter than the background. CHK GRAY is run after decision diamond C of FIG. 15, when the search position is at the end of the scan. As shown in block A of FIG. 20, the first step in the CHK GRAY module is to advance to the first candidate object found in the current search. Decision diamond B of FIG. 20 asks whether the candidate object is the last object in the list of candidate objects. If it is, the module stops running as shown by oval C. If the candidate object is not the last object in the list of candidate objects, then the average exterior gray level is calculated as illustrated in block D. Decision diamond E then asks whether the gray level of the center of mass is greater than the average exterior gray level of the four exterior points (i.e., the top, bottom, left and right points) surrounding the extreme points of the object. The exterior points are those points in the background which are immediate neighbors to the extremum points of the object. If not, the object is deleted as shown in block F of FIG. 20. If the gray level center of mass is greater than the average exterior gray level, then the candidate object is retained, and the CHK GRAY module advances to the next candidate object as shown in block G. The CHK GRAY module then returns to decision diamond B to ask whether the candidate object is the last object. The loop as shown in B-G is repeated for the next candidate object until the next candidate object is the last candidate object, at which point CHK GRAY stops running. As noted above, the module CHK GRAY may be run to detect objects darker than the background. In this case, the image is initially inverted prior to performing the step of generating the image of the object and the background.

The method as described thus far can be referred to as a screening process. For example, it can be used to screen for the presence of pathological bacteria in food or in blood or soil samples. A screening process results in a yes—no answer; absolute quantitation is not necessary. For a more stringent identification process, it is necessary to apply the method of the entropic thresholding application of the second embodiment of the present invention recursively as described below.

The recursive version of the first, specific application of the second embodiment may further comprise the steps of subdividing the gray level histogram into an upper histogram and a lower histogram using the entropic threshold gray level which was selected to maximize the entropy function of the histogram as an upper delimiter and a lower delimiter. The selection, searching, validating and subdividing steps are recursively repeated for each of the upper and lower histograms. The repetition of the selection step selects a next successive entropic threshold gray level, thereby recursively partitioning the gray level histogram to identify the valid objects until a predetermined minimum number of new valid objects is identified. In the preferred implementation of this application, the predetermined minimum number is zero. However, there may be cases where the predetermined number is greater than zero, such as when a complete identification is not required.

Figure 21A:
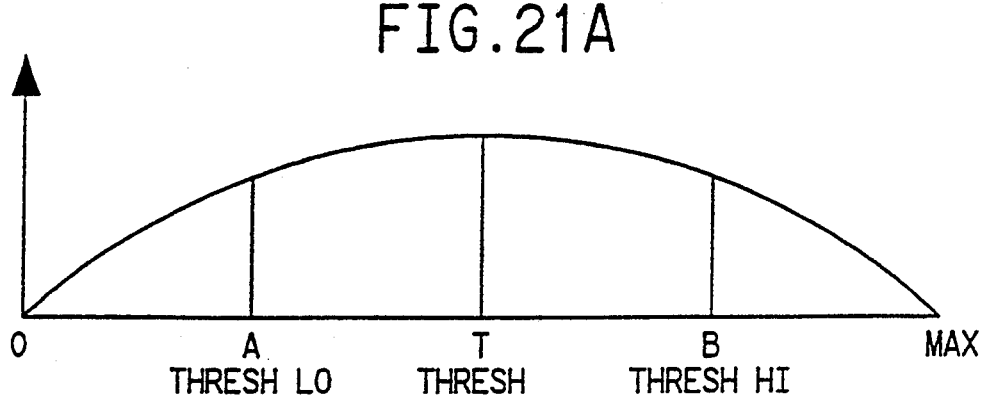
FIGS. 21A-21C are original, upper and lower gray level histograms, respectively, of an image for a first, specific implementation of the second embodiment of the present invention.
Figure 21B:
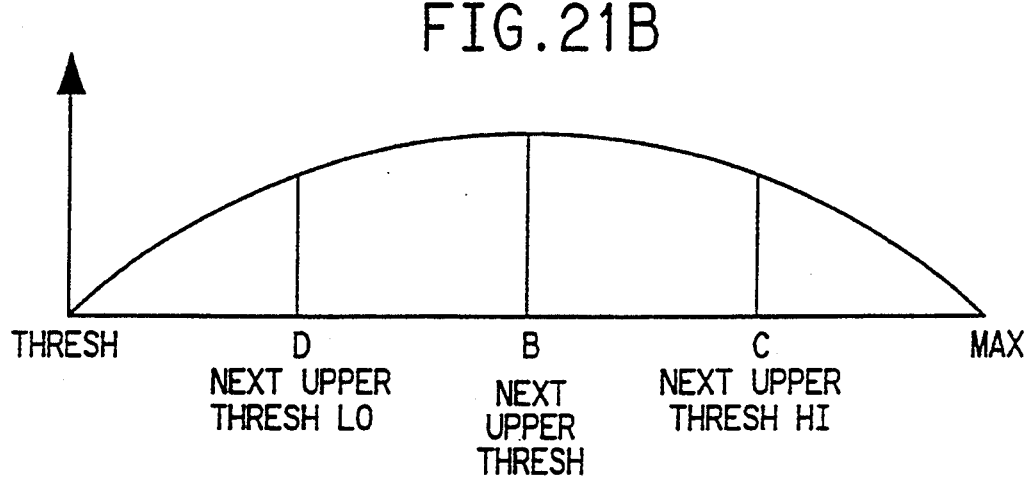
Figure 21C:
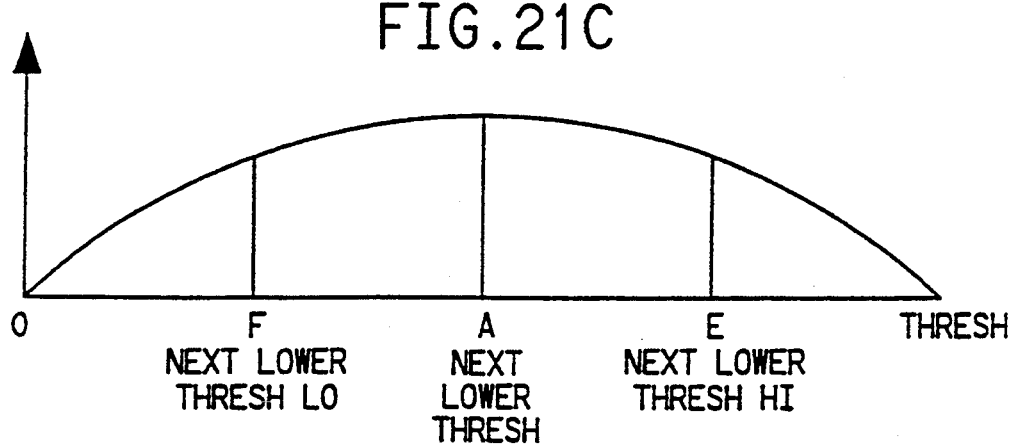

FIGS. 21A-21C illustrate the concept of subdividing a histogram into an upper histogram and a lower histogram. An original histogram is shown in FIG. 21A. THRESH, as shown at T in FIG. 21A, is the entropically selected threshold gray level for the gray level histogram corresponding to the gray level region between the minimum gray level being searched and the maximum gray level being searched. For the original histogram as shown in FIG. 21A, the minimum gray level being searched is zero and the maximum gray level being searched is MAX. THRESH HI, as shown at B, is the entropically selected threshold gray level for the gray level histogram corresponding to the gray level region between THRESH and MAX. THRESH LO, as shown at A, is the entropically selected threshold gray level for the gray level histogram corresponding to the gray level region between zero and THRESH.

According to the recursive version of the first specific application, the subdividing, selection, searching and validating steps are then recursively repeated. By recursion is meant the process of continuously dividing a histogram into upper and lower histograms, searching each upper histogram, which upper histogram is itself continuously divided into upper and lower histograms, for new valid objects until the number of new valid objects found in an upper histogram is less than or equal to a predetermined minimum number, and subsequently searching each lower histogram corresponding to the most recently searched upper histogram, which lower histogram is itself continuously divided into upper and lower histograms, until the number of new valid objects found in a lower histogram is less than or equal to the predetermined minimum number.

The upper histogram is shown in FIG. 21B. The repetition of the subdividing step subdivides the upper histogram into a next successive upper and lower histogram as shown in FIG. 21B. The repetition of the selection step for the upper histogram selects a next upper successive entropic threshold gray level value, as shown at B in FIG. 21B. Thus, point B, which was THRESH HI in the original histogram, becomes the threshold for the upper histogram, or NEXT UPPER THRESH. In FIG. 21B, the minimum gray level value being searched is now THRESH and the maximum gray level value being searched is now MAX. The NEXT UPPER THRESH HI, shown at C, is the entropically selected threshold gray level value for the gray level histogram corresponding to the gray level region between B and MAX. The NEXT UPPER THRESH LO, shown at D, is the entropically selected threshold gray level value for the gray level histogram corresponding to the gray level region between THRESH and B. The selection, searching and validating steps are then repeated recursively using the next upper successive entropic threshold gray level value, B, as the entropic threshold gray level value.

FIG. 21C shows the lower histogram. The repetition of the subdividing step subdivides the lower histogram into a next successive upper and lower histogram as shown in FIG. 21C. The repetition of the selection step for the lower histogram selects a next lower successive entropic threshold gray level value, as shown at A in FIG. 21C. Thus, point A, which was THRESH LO in the original histogram, becomes the threshold for the partitioned lower histogram, or NEXT LOWER THRESH. In FIG. 21C, the minimum gray level value being searched is now zero and the maximum gray level value being searched is now THRESH. The NEXT LOWER THRESH HI, shown at E, is the entropically selected threshold gray level value for the gray level histogram corresponding to the gray level region between A and THRESH. The NEXT LOWER THRESH LO, shown at F, is the entropically selected threshold gray level value for the gray level histogram corresponding to the gray level region between zero and A. The selection, searching and validating steps are then repeated recursively for the lower histogram using the next lower successive entropic threshold gray level value, A, as the entropic threshold gray level value.

Figure 22:
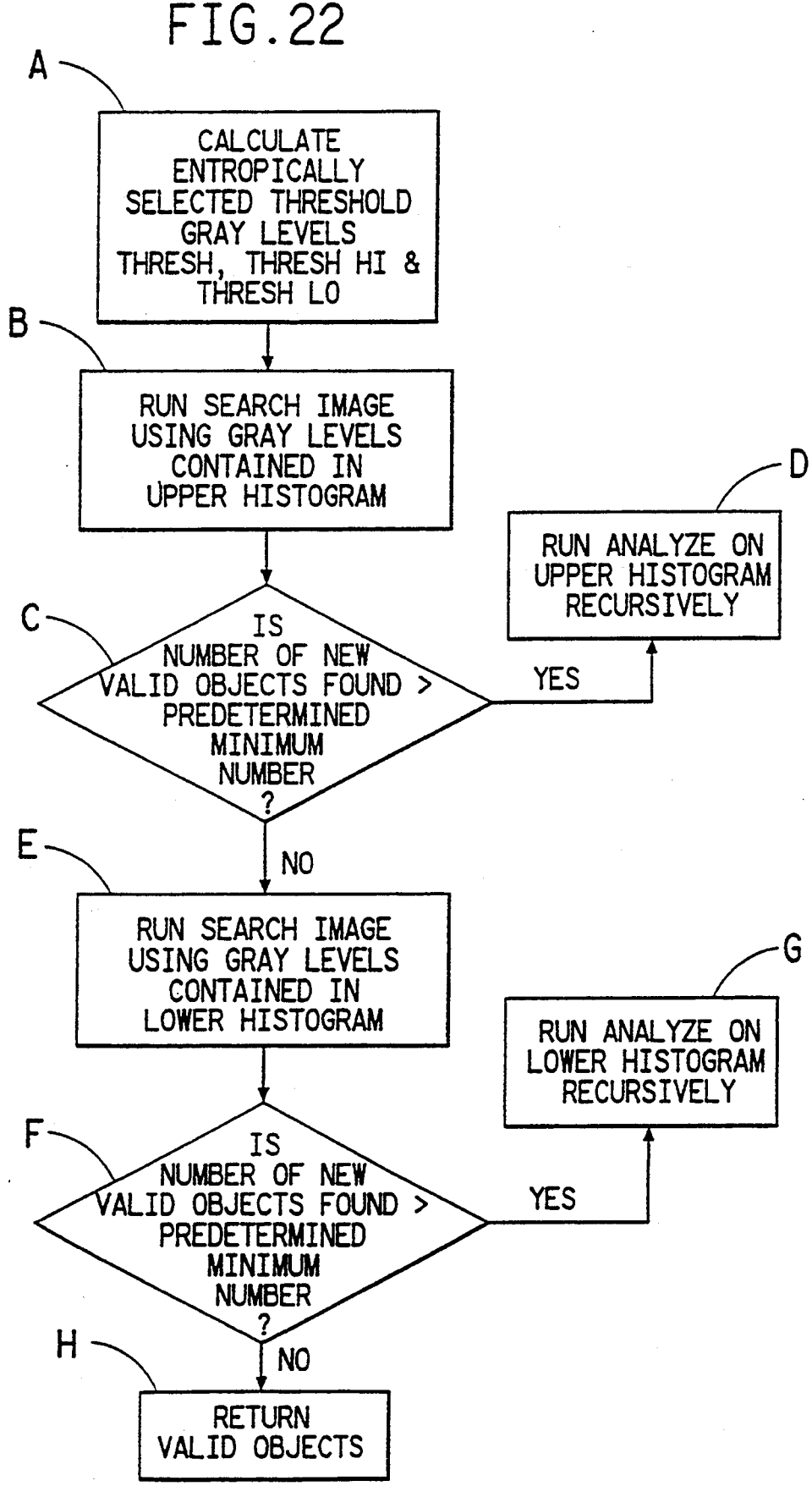
FIG. 22 is a flow chart showing the steps of a module, ANALYZE, which is used to recursively search the image for candidate objects according to the first, specific implementation of the second embodiment.

The ANALYZE module as shown in FIG. 22 constitutes the core recursive kernel of the recursive version of the second embodiment. The ANALYZE module effectively zooms in on a specific region in gray level space to search for instances of the candidate object and recursively partitions the histogram. The first step in the ANALYZE module as shown in FIG. 22 is to calculate the entropically selected threshold gray level values THRESH, THRESH HI AND THRESH LO as described above and as shown in block A of FIG. 22. As shown in block B, the module SEARCH IMAGE is run using the gray level values contained in the upper histogram. Decision diamond C then asks whether the number of new valid objects found is greater than the predetermined minimum number. If it is, then the module ANALYZE is run on the upper histogram recursively. If the number of valid objects found is not greater than the predetermined minimum number, then the module SEARCH IMAGE is run again using the gray level values contained in the lower histogram as shown in block E. Decision diamond F then asks whether the number of new valid objects found is greater than the predetermined minimum number. If it is, then ANALYZE is run on the lower histogram recursively as shown in block G. If it is not, then ANALYZE stops running, and the valid objects are returned as shown in block H of FIG. 22. With the present invention, there is some latitude in selecting the range of values of the number of attributes to be checked for in the validation step during the recursive process.

According to the method of the first specific application of the second embodiment of the present invention, the validating step further includes the sub-step of checking for redundancies to prevent multiple identification of the valid object. Such redundancy checking is necessary since an object which has been recognized as valid after the current search may have been recognized as a valid object in an earlier search. In order to perform the redundancy checking sub-step, valid objects are classified as either homogeneous or inhomogeneous. Inhomogenous objects are described in the example given below, where color colonies are identified. Valid objects are also further classified as either a relatively large valid object or a small valid object. In addition, valid objects are classified as either contained in another valid object (interior valid objects), or never contained in another valid object (exterior valid objects).

According to the method of the first specific application of the second embodiment of the present invention, the redundancy checking sub-step may be performed to delete inhomogeneous valid objects. When it is, the method of the present invention further includes the sub-step of deleting the large object when the large object contains more than one small object. Also, when the redundancy checking sub-step is performed to delete inhomogeneous valid objects, the method of the present invention also includes the sub-steps of calculating the average edge contrast of the large and the small valid objects and deleting the object having the smaller edge contrast when the large object contains only one small object. These sub-steps are performed by a module, CHK LIST, as shown in FIGS. 23A-D for inhomogeneous valid objects.

As shown in block A of FIG. 23A, the first step of the CHK LIST module for deleting inhomogeneous objects is to define the previous count as the number of valid objects found prior to the current search. Then the tail object is defined as the initial candidate object found in the current search as shown in block B. The object count is initialized to one as shown in block C, and the head object is defined as the initial object in the total object list (i.e., the list of all objects found to date) as shown in block D. Decision diamond E asks whether the object count is greater than the previous count.

Figure 23B:
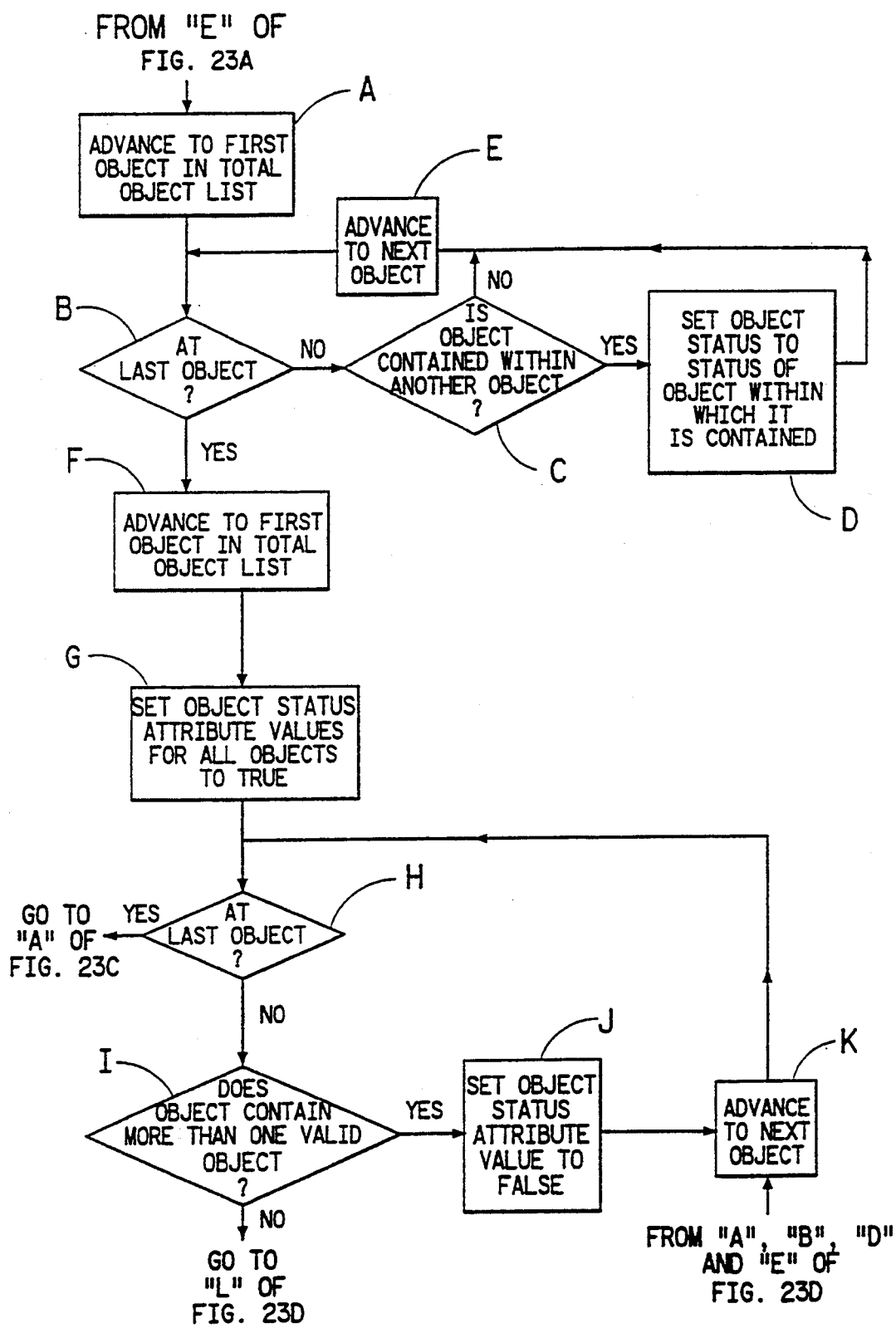

If the object count is greater than the previous count, CHK LIST advances to the first object in the total object list as shown in block A of FIG. 23B. Decision diamond B of FIG. 23B asks if CHK LIST is at the last object. If not, then decision diamond C asks whether the valid object is contained within another valid object. If so, the object status is set to the status of the object within which it is contained as shown in block D, and CHK LIST advances to the next object as shown in block E. Also, if the object is not contained within another object, then CHK LIST advances to the next object as shown in block E. The loop through B-E continues until the next object of block E is the last object, at which point CHK LIST advances to the first object in the total object list as shown in block F. The object status attribute values for all the objects is set to "true" as shown in block G. "True" in this context means valid, and "false" means invalid. Decision diamond H then asks if CHK LIST is at the last object.

Figure 23C:
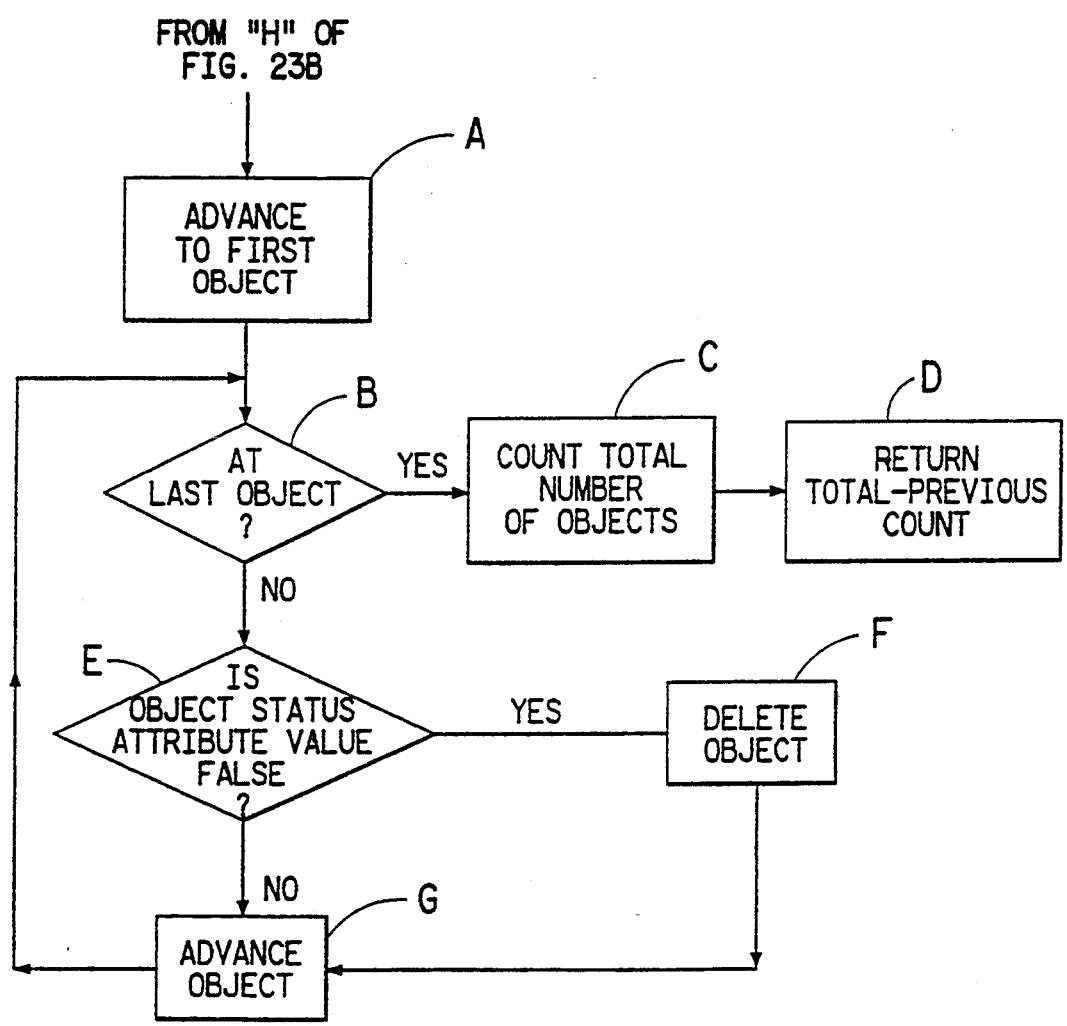

If it is, CHK LIST advances to the first object as shown in block A of FIG. 23C. Decision diamond B then asks again whether CHK LIST is at the last object. If it is, then the total number of objects is counted as shown in block C, and the difference between the total number of objects and the previous count is returned as shown in block D. If CHK LIST is not at the last object, decision diamond E asks whether the object status attribute value is false. If so, the object is deleted as shown in block F. If not, then CHK LIST advances the object as shown in block G, and CHK LIST asks again whether it is at the last object as shown in decision diamond B. The loop through B, E, F, and G continues until the advanced object of block G is the last object. At this point, the total number of objects is counted as shown in block C, and the difference between the total number of objects and the previous count is returned as shown in block D.

Figure 23D:
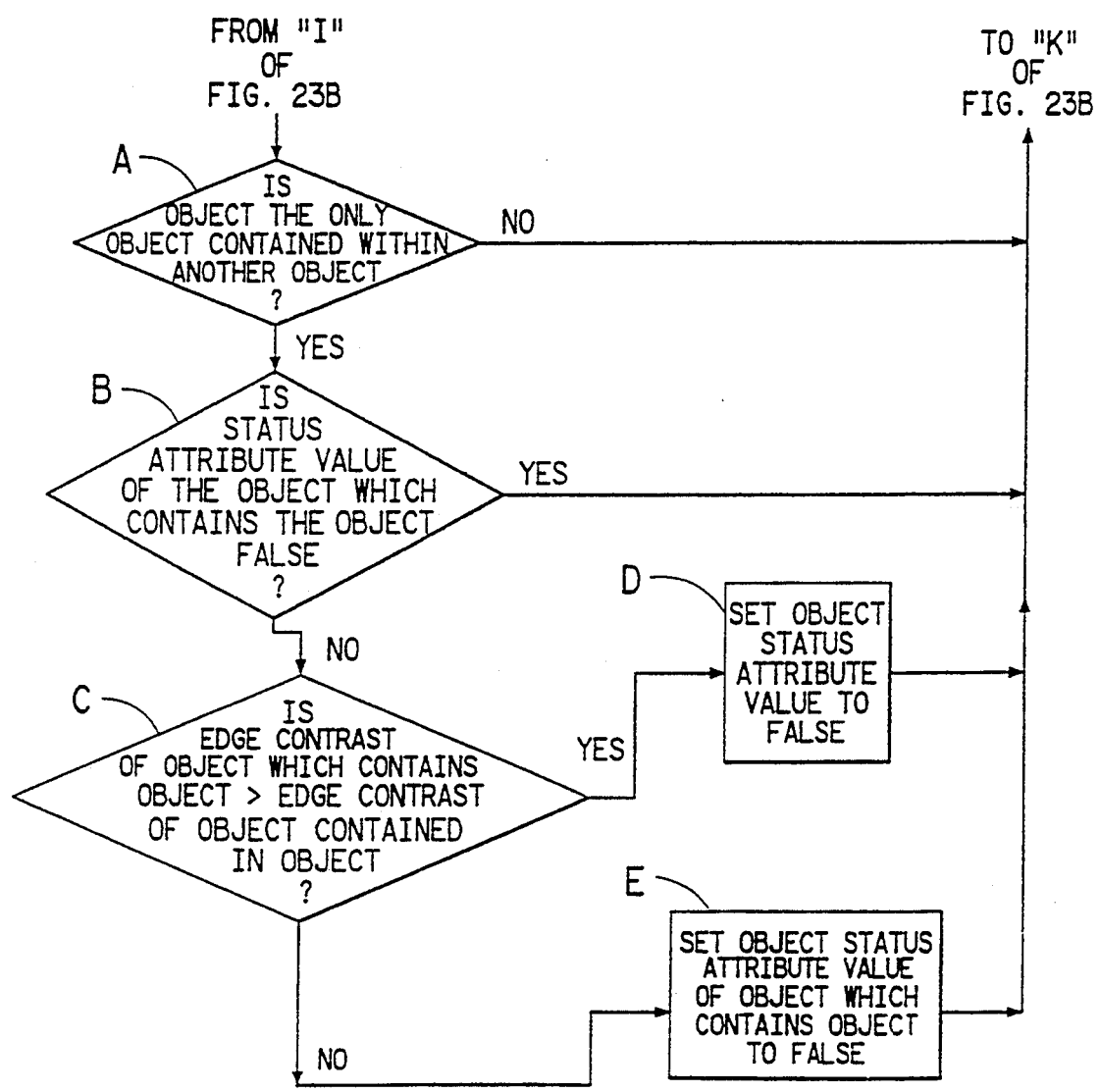

Returning to decision diamond H in FIG. 23B, if CHK LIST is not at the last object at this point, then it goes to decision diamond I, which asks whether the object contains more than one valid object. If so, then the object status attribute value is set to false as shown in block J, and CHK LIST advances to the next object as shown in block K. CHK LIST then returns to decision diamond H, asks whether it is at the last object and continues this process until the object does not contain more than one valid object. Then decision diamond A of FIG. 23D asks if the object is the only object contained within another object. If not, then CHK LIST advances to the next object as shown in block K of FIG. 23B, and the loop through H-K of FIG. 23B and A of FIG. 23D is repeated until the object is the only object contained within another object. If the object is the only object contained within another object, then decision diamond B asks whether the status attribute value of the object which contains the object is false. If so, then CHK LIST advances to the next object as shown in block K of FIG. 23B, and the loop through H-K of FIG. 23B and A-B of FIG. 23D is repeated until the status attribute value of the object which contains the object is not false. At this point, decision diamond N asks whether the edge contrast of the object which contains another object is greater than the edge contrast of the object. If so, then CHK LIST sets the object status attribute value to false as shown in block D, it advances to the next object as shown in block K in FIG. 3B, and the loop through H-K of FIG. 23B and A-C of FIG. 23D is repeated until the edge contrast of the object which contains another object is not greater than the edge contrast of the object contained in another object. Then CHK LIST sets the status of the object which contains the object to false as shown in block E of FIG. 23D, and it advances to the next object as shown in block K of FIG. 23D until it is at the last object.

Figure 24:
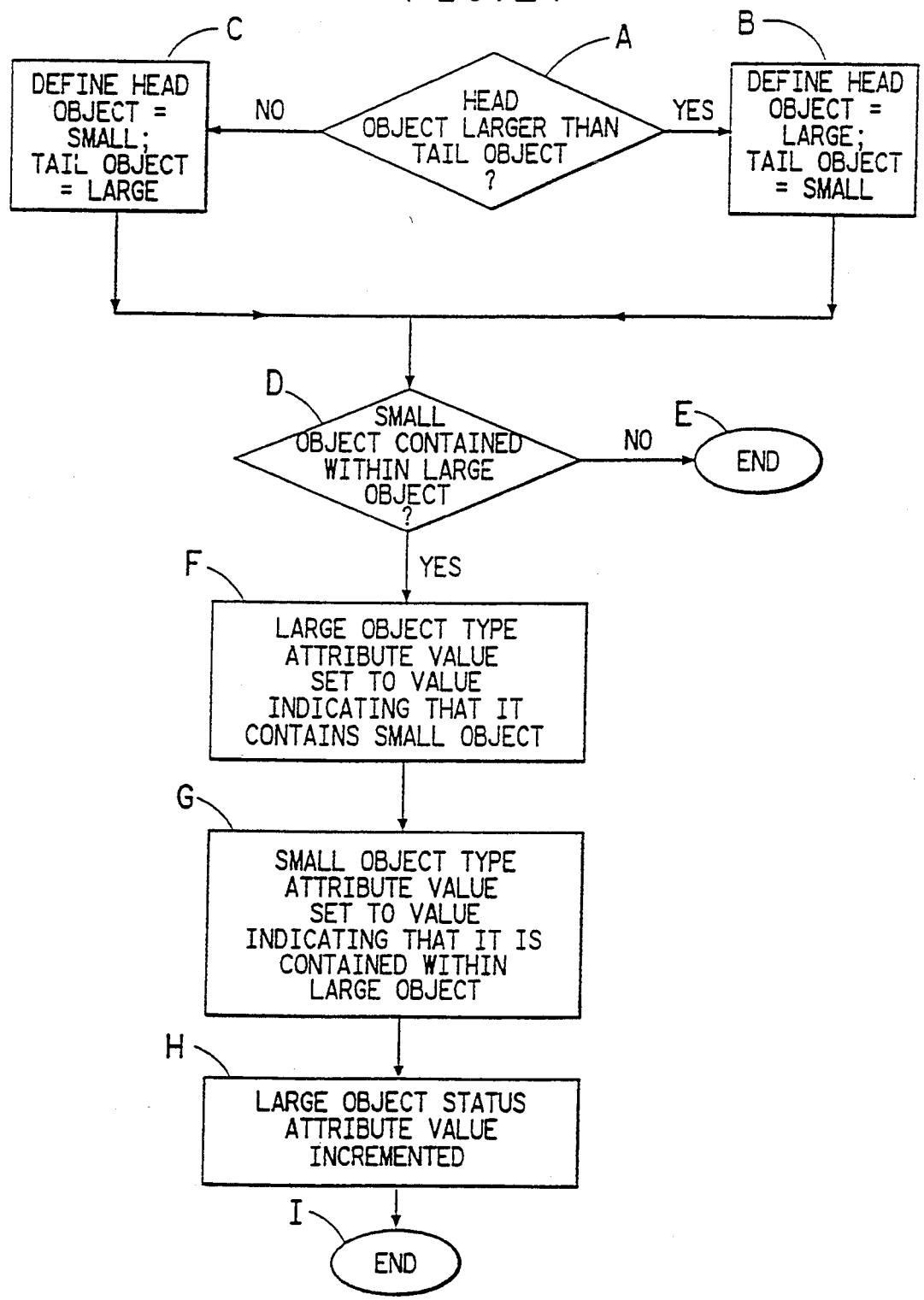
FIG. 24 is a flow chart showing the steps of a module, SET STAT, which is used with the module CHK LIST as shown in FIGS. 22A-22D.

Returning to decision diamond E in FIG. 23A, if the object count is not greater than the previous count, then decision diamond F asks if the head object is contained within another object. If so, then the head object is advanced as shown in block G, and the object count is incremented as shown in block H. Decision diamond E again asks if the incremented object count is greater than the previous count. If so, CHK LIST advances to block A of FIG. 23B as explained above. If the incremented count is not greater than the previous count, the loop through F, G, H and E in FIG. 23A is repeated until the head object is not contained within another object. Then CHK LIST advances to decision diamond I of FIG. 23A, which asks if the tail object is the last object, or if the head object is contained within another object. If the tail object is the last object, or if the head object is contained within another object, then CHK LIST advances the head object as shown in block G, and the count is incremented as shown in block H. The loop through E, F, I, G and H is repeated until the tail object is not the last object or the head object is not contained within another object. Decision diamond J then asks whether the tail object is contained within another object. If it is, then the tail object is advanced as shown in block K of FIG. 23A, and the loop through I, J and K is repeated until the tail object is not contained within another object. Then CHK LIST goes to the module SET STAT as shown in FIG. 24 to set the status of the head and tail objects as shown in block L of FIG. 23A.

The redundancy checking sub-step further includes the sub-steps of comparing the areas of a plurality of valid objects and designating one of the valid objects as a large valid object and the other of the first and second valid objects as a small valid object and determining whether the small valid object is contained in the large valid object as defined by the four extreme points of the larger object for inhomogeneous objects. The module SET STAT as shown in FIG. 24 performs these sub-steps for inhomogeneous objects. The first step of SET STAT as shown in decision diamond A of FIG. 24 is to ask whether the head object is larger than the tail object. If so, then the head object is defined as the large valid object, and the tail object is defined as the small valid object as shown in block B. If the head object is not larger than the tail object, then the head object is defined as the small valid object, and the tail object is defined as the large valid object as shown in block C. Then decision diamond D asks whether the small object is contained within the large object. If not, then SET STAT is finished, as indicated by END oval E. If the small object is contained within the large object, then the large object type attribute value is set to a value indicating that it contains a small object as shown in block F. The type attribute value tells SET STAT whether an object is contained within another objector whether the object contains another object. Also, the small object type attribute value is set to a value indicating that it is contained within a large object as shown in block G. Finally, the large object status attribute value is incremented as shown in block H. SET STAT is then finished, as indicated by the END oval I and returns to block L of FIG. 23A.

According to the first, specific application of the second embodiment, the redundancy checking sub-step may be performed to resolve redundancies in the homogeneous objects. When it is, the method of the present invention further includes the sub-steps of calculating the edge contrast of the large and small valid objects and deleting the large object where the average edge contrast of the large object is less than the average edge contrast of the small object and is less than a predetermined minimum edge contrast. The redundancy checking sub-step for resolving redundancies also includes the sub-steps of calculating the edge contrast of the large and small valid objects and deleting the small object where the average edge contrast of the large object is greater than the average edge contrast of the small object and is greater than the predetermined minimum contrast. These sub-steps are performed using the module CHK LIST for homogeneous objects as illustrated by the flow charts of FIGS. 25A and 25B.

Figure 25A:
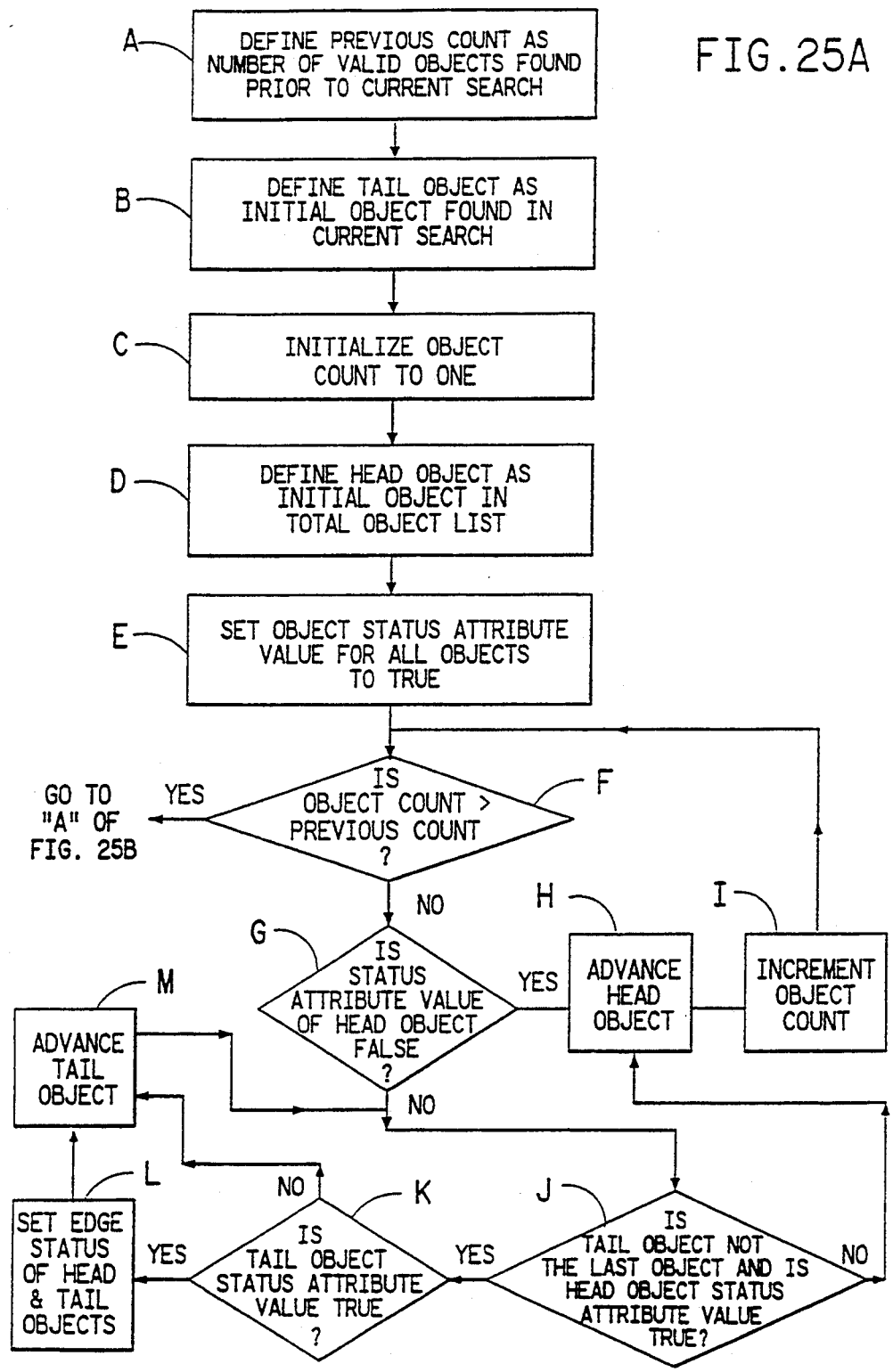
FIGS. 25A-25B are a flow chart showing the steps of a module, CHK LIST, which is used to resolve redundancies in homogeneous objects.

As shown in block A of FIG. 25A, the first step of the CHK LIST module, when run to delete homogenous objects, is to define the previous count as the number of valid objects found prior to the current search. Then the tail object is defined as the initial candidate object found in the current search as shown in block B. The object count is initialized to one as shown in block C, and the head object is defined as the initial object in the total object list as shown in block D. The object status attribute value is then set to true for all objects as shown in block E. Decision diamond F asks whether the object count is greater than the previous count.

Figure 25B:
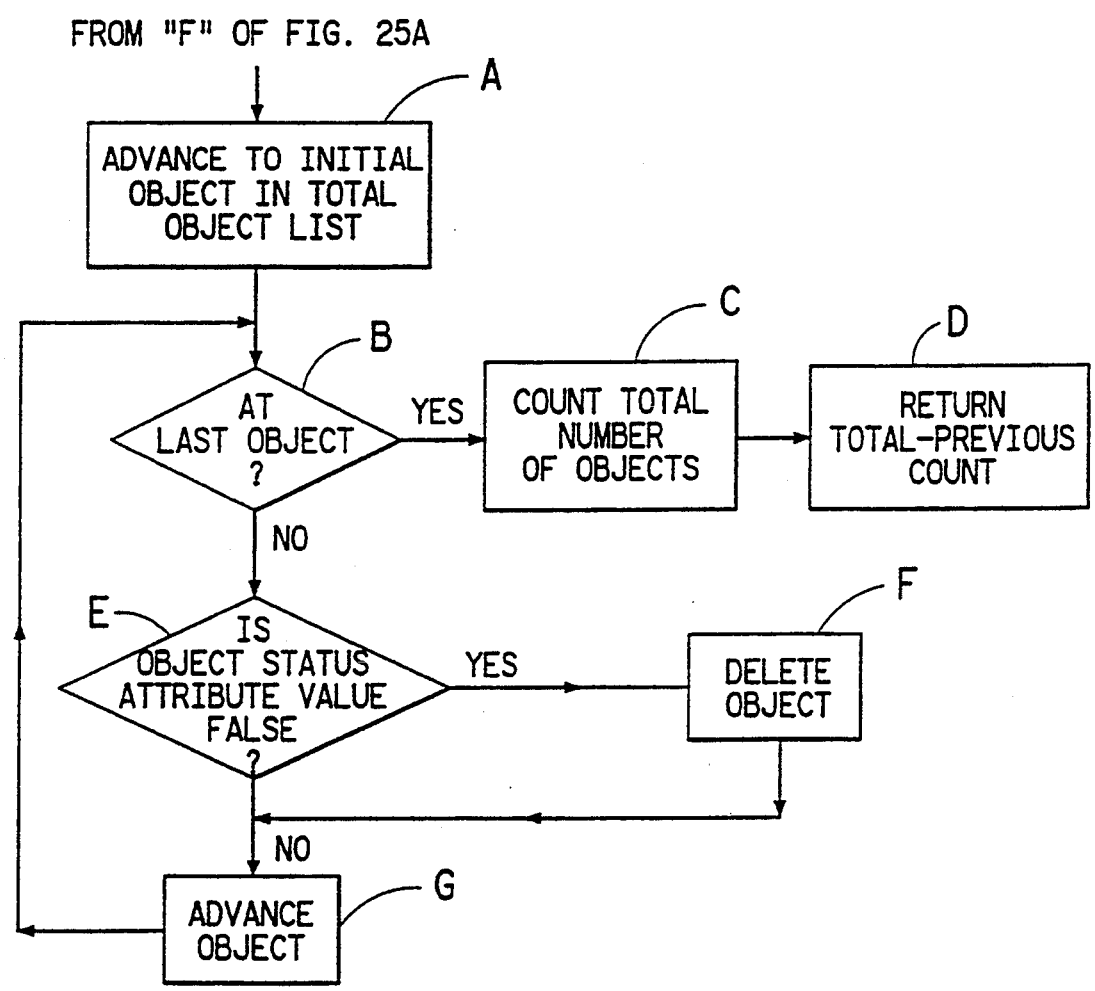

If the object count is greater than the previous count, CHK LIST advances to the initial object in the total object list as shown in block A of FIG. 25B. Decision diamond B of FIG. 25B asks if CHK LIST is at the last object. If so, the total number of objects is counted as shown in block C, and the difference between the total number of objects and the previous count is returned as shown in block D. If CHK LIST is not at the last object, then decision diamond E asks whether the object status attribute value is false. If so, the object is deleted as shown in block F. If the object status is not false, then object is advanced as shown in block G, and the CHK LIST module asks again whether it is at the last object as shown in decision diamond B. This process continues until CHK LIST reaches the last object, at which point the total number of objects is counted as shown in block C, and the difference between the total number of objects and the previous count is returned as shown in block D.

Returning to decision diamond F in FIG. 25A, if the object count is not greater than the previous count, then decision diamond G of FIG. 25A asks if the status attribute value of the head object is false. If it is, then the head object is advanced as shown in block H, and the count is incremented as shown in block I. Decision diamond F then asks if the incremented object count is greater than the previous count. If so, CHK LIST advances to block A of FIG. 23B as explained above. The loop through G, H and I in FIG. 25A is repeated until the status of the object is not false. Then CHK LIST advances to decision diamond J of FIG. 25A, which asks if the tail object is not the last object and if the had object status attribute value is true. The answer to both these questions must be yes. If not, then CHK LIST advances the head object as shown in block H, and the count is incremented as shown in block I. The loop through F, G, H, I and J is repeated until the tail object is the last object and the head object status attribute value is true. Decision diamond K then asks whether the tail object status attribute value is true. If it is, then the edge status of the head and tail object is set as shown in block L of FIG. 25A and as shown in detail in FIG. 26 by a module SET STAT. CHK LIST then advances the tail object as shown in block M, and the loop through J, K, L and M is repeated. If the tail object status is not true, then CHK LIST advances the tail object as shown in block M, and the loop through J, K and M is repeated.

Figure 26:
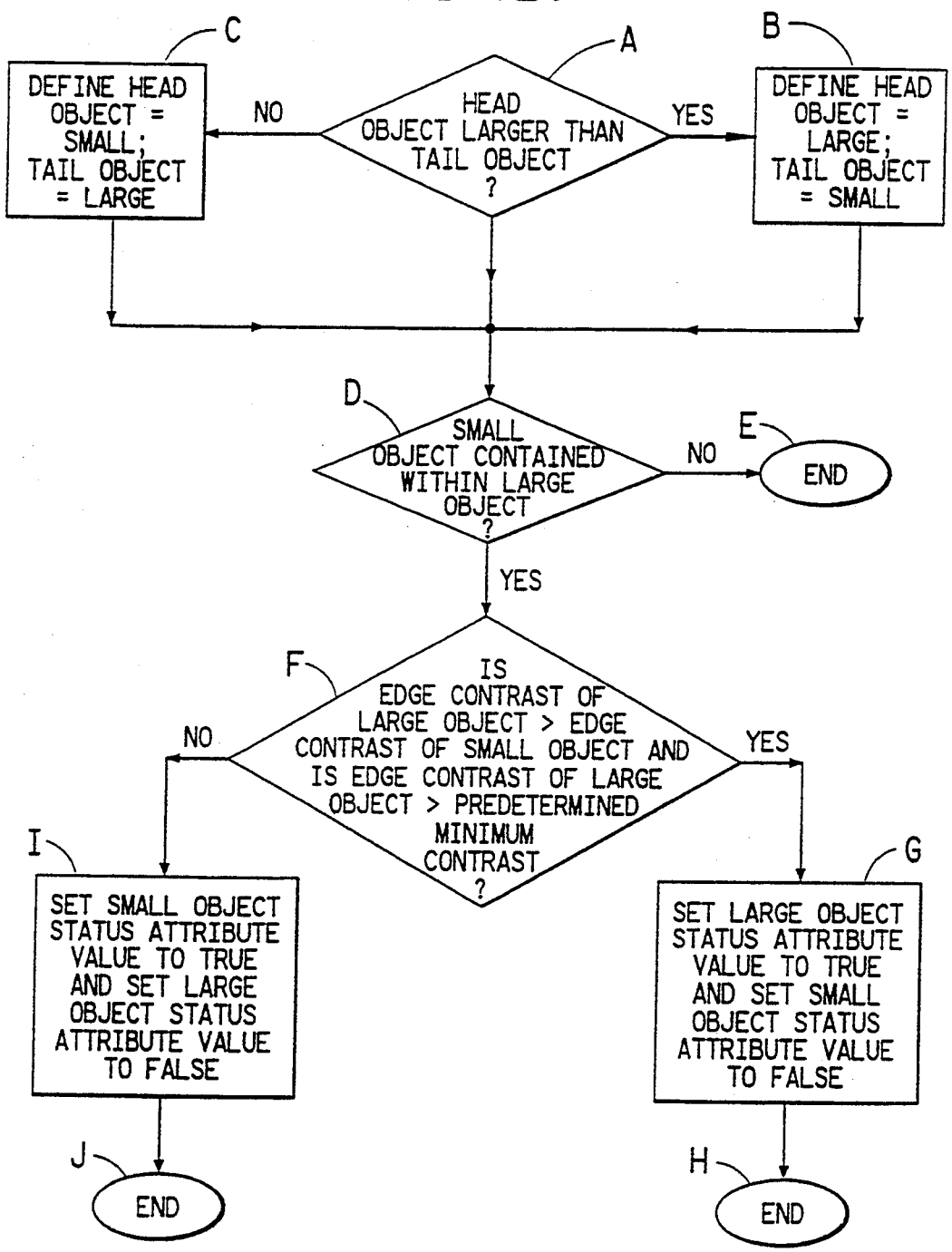
FIG. 26 is a flow chart showing the steps of a module, SET STAT, which is used with the module CHK LIST as shown in FIGS. 25A-25B.

The module SET STAT as shown in FIG. 26 performs the sub-steps of comparing the areas of a plurality of valid objects and designating one of the valid objects as a large valid object and the other of the first and second valid objects as a small valid object and determining whether the small valid object is contained in the large valid object as defined by the four extreme points of the large object for homogeneous objects. As shown in decision diamond A of FIG. 26, the first step of SET STAT is to ask whether the head object is larger than the tail object. If so, the head object is defined as a large valid object, and the tail object is defined as the small valid object as shown in block B. If the head object is not larger than the tail object, then the head object is defined as the small valid object, and the tail object is defined as the large valid object. Decision diamond D of SET STAT then asks whether the small object is contained within the large object. If not, SET STAT stops running as shown by oval E. If the small object is contained within the large object, then decision diamond F asks whether the edge contrast of the large object is greater than the edge contrast of the small object, and whether the edge contrast of the large object is greater than the predetermined minimum edge contrast. If the answer to both of these questions is yes, then the large object status attribute value is set to true, and the small object status attribute value is set to false as indicated by block G, and the module stops running as indicated by oval H. If the answer to at least one of the questions in decision diamond F is no, then the small object status attribute value is set to true, the large object status attribute value is set to false as indicated by block I, and the module stops running as indicated by oval J.

The method of the first, specific application of the second embodiment further includes the step of performing a final check for redundancies of the valid object and resolving the redundancies to prevent multiple identification of the valid object. The final redundancy checking step further includes the sub-steps of comparing the areas of a plurality of valid objects and designating one of the valid objects as a large valid object and the other of the first and second valid objects as a small valid object and removing the large valid object when the small valid object and the large valid object overlap. The final redundancy checking step is performed by a module, FINAL CHK, as illustrated by the flow chart of FIGS. 27A and 27B and a module INT STAT, as illustrated by the flow chart of FIG. 28. The modules FINAL CHK and INT STAT are the same for both homogeneous and inhomogeneous objects, and are thus only illustrated once.

Figure 27A:
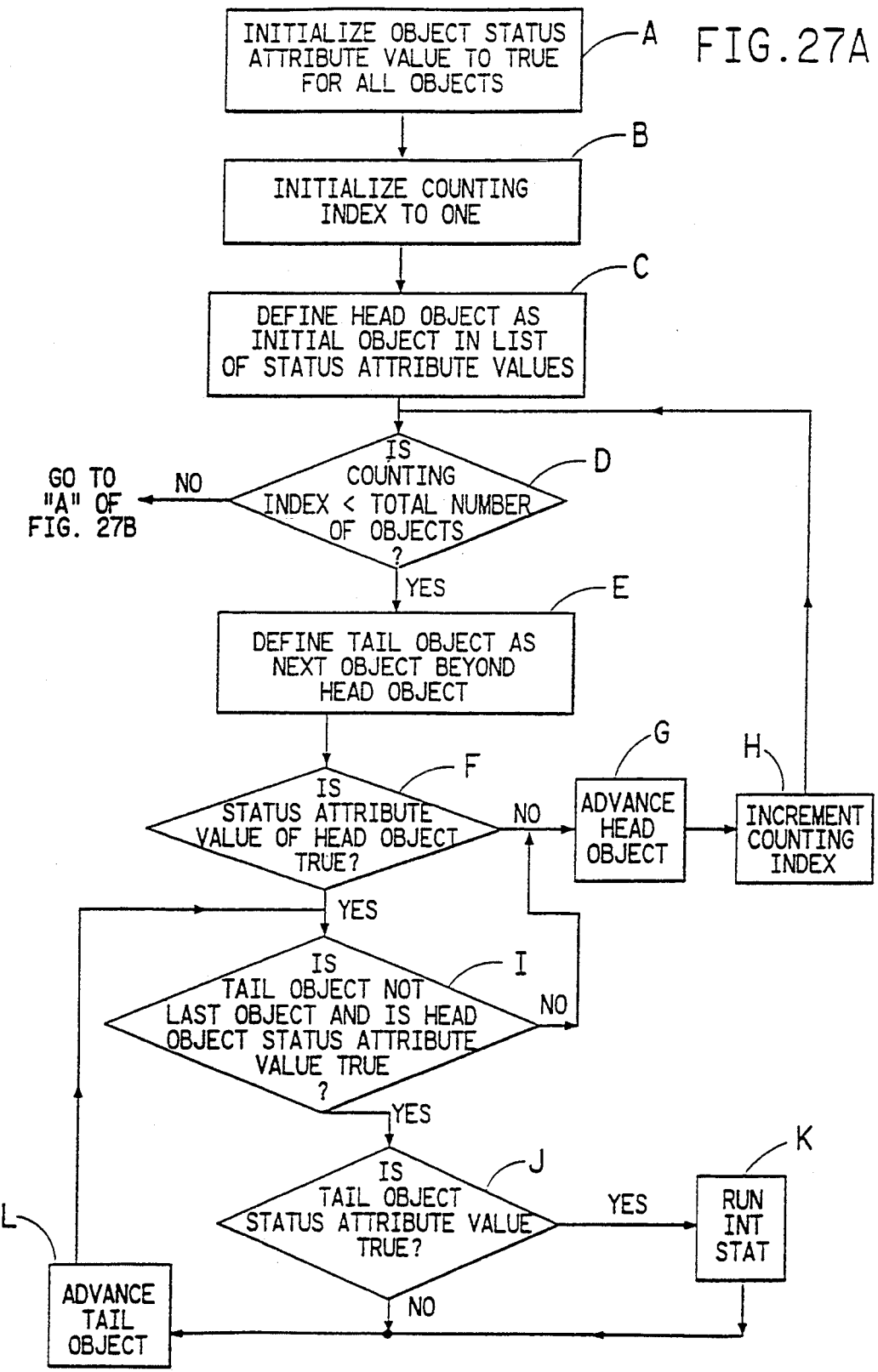
FIGS. 27A-27B are a flow chart showing the steps of a module, FINAL CHK, which is used to perform a final check to resolve redundancies in inhomogeneous and homogeneous objects.

The first step of FINAL CHK is to initialize the object attribute value to true for all objects as shown in block A of FIG. 27A. The counting index for counting valid objects is the initialized to one as shown in block B. The head object is defined as the initial object in a list of status attribute values as illustrated in block C. Decision diamond D then asks whether the counting index is less than the total number of objects. If not, the module FINAL CHK goes to block A of FIG. 27B.

Figure 27B:
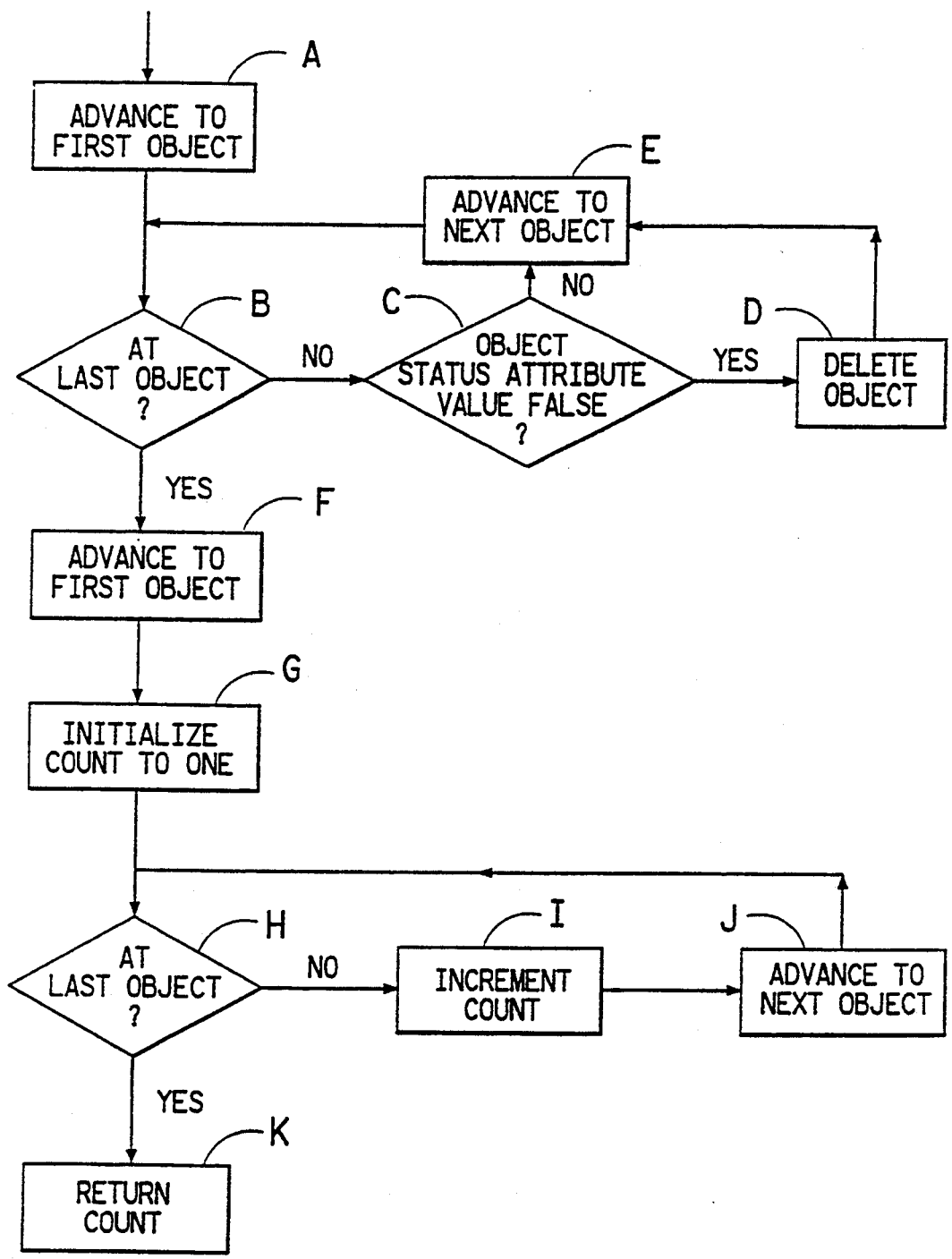

As shown in block A of FIG. 27B, FINAL CHK advances to the first object. Decision diamond B asks whether FINAL CHK is at the last object. If it is not, then decision diamond C asks whether the object status attribute value is false. If not, then FINAL CHK advances to the next object as shown in block E, and decision diamond B again asks whether FINAL CHK is at the last object. The loop through B, C and E continues until FINAL CHK is at the next object. If the object status attribute value is false, then the object is deleted as shown in block D. FINAL CHK then advances to the next object as shown in block E, and decision diamond B asks whether the FINAL CHK at the last object. The loop through B-E continues until the next object is the last object, at which point FINAL CHK advances to the first object as shown in block F. The count is then initialized to one as shown in block G. Decision diamond H then asks whether FINAL CHK is at the last object. If it is not, then the count is incremented as shown in block I, and FINAL CHK advances to the next object is shown in block J. Decision diamond H again asks whether FINAL CHK is the last object, and the loop through H, I and J continues until FINAL CHK is at the last object. Then the total number of valid objects as contained in count is returned as shown by block K of FIG. 27B.

Returning to decision diamond D of FIG. 27A, if the counting index is less than the total number of objects, then the tail object is defined as the next object beyond the head object as shown in block E. Decision diamond F then asks if the status attribute value of the head object is true. If not, the FINAL CHK advances the head object as shown in block G and increments the counting index as shown in block H. FINAL CHK then returns to decision diamond D, and the loop through D-I continues until the status attribute value of the head object is true. Then decision diamond I asks whether the tail object is not the last object and whether the head object status attribute value is true. If at least one of these conditions is not met, then FINAL CHK advances the head object as shown in block G and increments the index as shown in block H. FINAL CHK then returns to decision diamond D, and the loop through D-I continues until the answer to both questions in decision diamond I is yes. Then decision diamond J asks whether the tail object status attribute value is true. If not, FINAL CHK advances the tail object as shown in block L of FIG. 27A, and the loop through I, J and L is repeated until the tail object status attribute value is true. Then FINAL CHK runs a module INT STAT, as shown in block K of FIG. 27A and advances the tail object as shown in block L.

Figure 28:
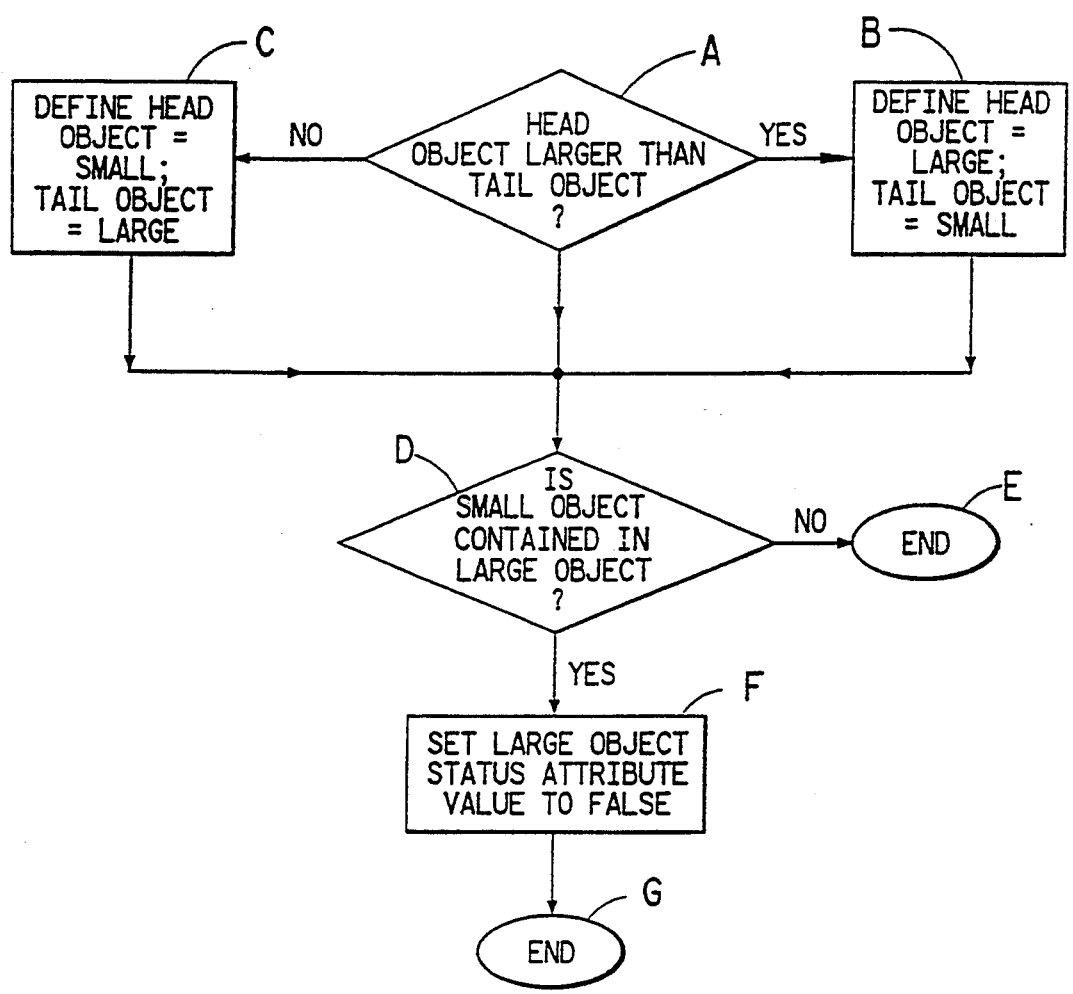
FIG. 28 is a flow chart showing the steps of a module, INT STAT, which is used with the module FINAL CHK as shown in FIGS. 27A-27B.

The steps of the module INT STAT as illustrated in block K of FIG. 27A are shown in detail in FIG. 28. Decision diamond A of FIG. 28 asks whether the head object is larger than the tail object. If so, the head object is defined as the large valid object, and the tail object is defined as the small valid object as shown in block B. If the head object is not larger than the tail object, then the head object is defined as the small valid object, and the tail object is defined as the large valid object as shown in block C. Decision diamond D then asks whether the small valid object is contained in the large valid object. If not, then INT STAT is at its end, as shown by oval E. If the small valid object is contained in the large valid object, then the large object status attribute value is set to false as shown in block F, and INT STAT is at its end as shown by oval G.

Further in accordance with the present invention, there is provided a second, specific application of the method of the second embodiment for identifying at least one valid object. This application comprises a method for effectively removing previously identified objects from an image, thus creating a remainder image for further searching. The method employs an iterative methodology for identifying new objects in a remainder image. The remainder image is that part of the image where objects have not been identified after a previous search of the image. This method includes the steps of the second embodiment, employing entropic thresholding, and in addition, the steps shown generally in the flow chart of FIGS. 29A and 29B. As shown in block A of FIG. 29A, the first step in the method for removing previously identified or valid objects from an image in order to search for new objects in a remainder image is to search for all previously identified valid objects. The next step in the method is to select a predetermined gray level values as shown in block B and then to scan the image to determine all points having the predetermined gray level values as shown in block C of FIG. 29A.

Figure 29A:
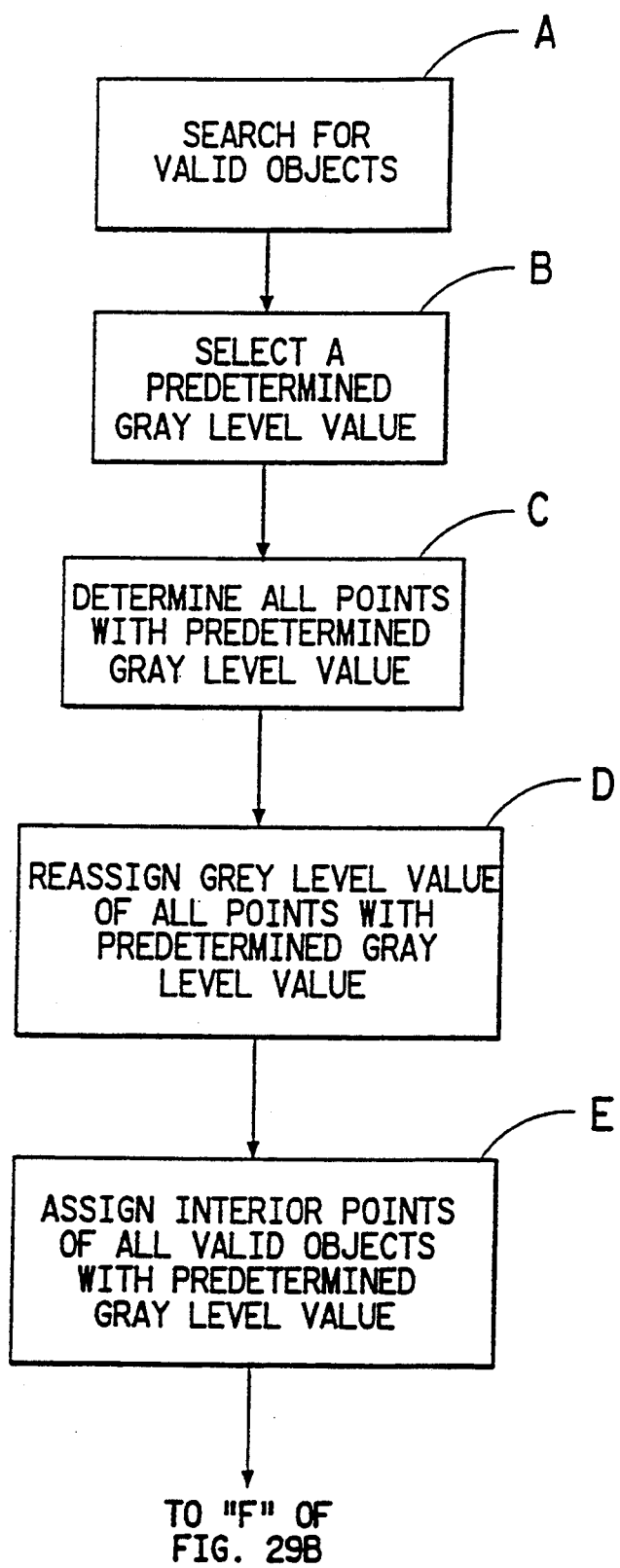

The method of removing previously identified objects from an image of the present invention further includes the step of reassigning the gray level value of each point having the predetermined gray level value, a new predetermined gray level value as shown in block D of FIG. 29A. The next step of the method is to assign the predetermined gray level value to all interior points of all previously identified valid objects as shown in block E.

The method of removing previously identified objects from an image of the present invention further comprises the step of generating a gray level histogram of a remainder image as shown in block F of FIG. 29A. The remainder image comprises all the points having a gray level value other than the predetermined gray level value.

Figure 30:
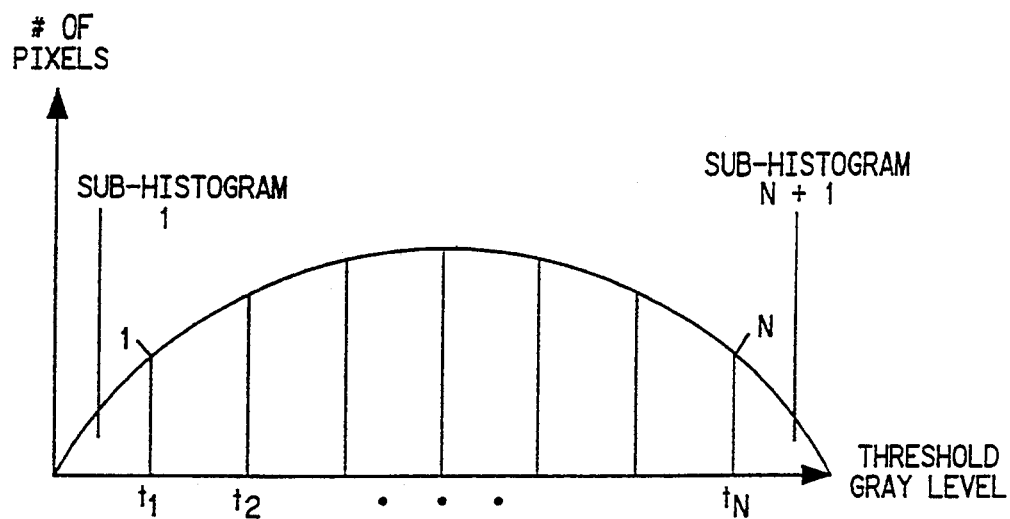
FIG. 30 is a gray level histogram which has been divided into N+1 sub-histograms in accordance with the second, specific application of the second embodiment.

The method of removing previously identified objects from an image of the present invention further also includes the step of selecting N global entropic threshold gray levels as shown in block G of FIG. 29B and subdividing the gray level histogram of the remainder image into N+1 sub-histograms using each of the entropically selected threshold gray levels as shown in block H of FIG. 29B. The method is iterative in that the process includes dividing a histogram into upper and lower histograms for a predetermined number of N divisions or iterations so as to create N+1 sub-histograms. To illustrate these steps, FIG. 30 shows a gray level histogram having N global entropic threshold gray level values, $t_1-t_N$. The gray level histogram of the remainder image is divided into N+1 sub-histograms using each of the global entropic threshold gray levels. The steps for selecting N global entropic threshold gray levels are performed by the module ENTROPY and are the same as those shown in the flow chart of FIG. 13.

The selecting step includes the sub-steps of sequentially partitioning the histogram of the remainder image at each gray level into a first and a second partition. The entropy function is then computed for each partition. The entropy function of the histogram is defined as the sum of the entropy functions of the first and second partitions. A global entropic threshold gray level is then selected such that the entropy function of the histogram is maximized. The gray level histogram is then subdivided using the global entropically selected threshold gray level as defined above which maximizes the entropy function of the histogram as an upper delimiter and a lower delimiter to create an upper histogram and a lower histogram. The partitioning, computing and selecting steps are then repeated, where the repetition of the selecting step selects a next successive global entropic threshold gray level. The subdividing step is then repeated using the next successive global entropic threshold gray level as the global entropic threshold gray level as defined in the selecting step to iteratively calculate the N global entropic threshold gray levels.

The method of removing previously identified objects from an image of the present invention further includes the step of searching portions of the remainder image corresponding to each sub-histogram using each entropically selected threshold gray level value for at least one new candidate object. If the gray level value of the center of mass of the candidate object is different than the predetermined gray level, then the candidate object is still considered as a candidate object for being a new valid object. If it is not, then the candidate object is not a new valid object. The candidate object has at least one candidate object attribute value. The step of searching portions of the image is shown in block I of FIG. 29B. The searching step includes the sub-steps of scanning the image for at least one candidate object using each global entropically selected threshold gray level value and tracing the candidate object having boundary gray level values determined by each global entropically selected threshold gray level value. The step of searching portions of the image is performed by the modules SEARCH IMAGE, FIND OBJECT and TRACE OBJECT as described above for the first and second embodiments and as shown in FIGS. 14, 15 and 19A and 19B, respectively. In addition, the module CHK GRAY as shown in FIG. 20 may be run for the iterative method in order to retain the candidate objects which are relatively lighter than the background. To identify objects darker than the background, the image is inverted immediately after it has been generated.

The method of removing previously identified objects from an image of the present invention further of the present invention also comprises the step of validating the new candidate object having the valid object predetermined attribute value for each of the sub-histograms, thereby identifying the valid object. This step is shown in block J of FIG. 29B. The validating step includes the sub-steps of calculating the candidate object attribute value and comparing the candidate object attribute value to the valid object predetermined attribute values to identify valid candidate objects. The validating step further includes the sub-step of checking for redundancies of the validate object to prevent multiple identification of the valid object. The redundancy checking sub-step is performed by the module CHK LIST as described above for the first embodiment with respect to FIGS. 23A–23D, 25A and 25B, and the module SET STAT as described above with respect to FIGS. 24 and 26.

The validation step of the method of removing previously identified objects from an image of the present invention may comprise the step of filtering the image. The filtering step for inhomogeneous objects is performed by the module COL FILT as shown in FIG. 18 as described above.

The method of removing previously identified objects from an image of the present invention further includes the step of performing a final check for redundancies of the valid object and resolving the redundancies to prevent multiple identification of the valid object. The final redundancy checking sub-step is performed by the module FINAL CHK as described above for the first embodiment with respect to FIGS. 24A–B and the module INT STAT as illustrated in FIG. 25.

Figure 31:
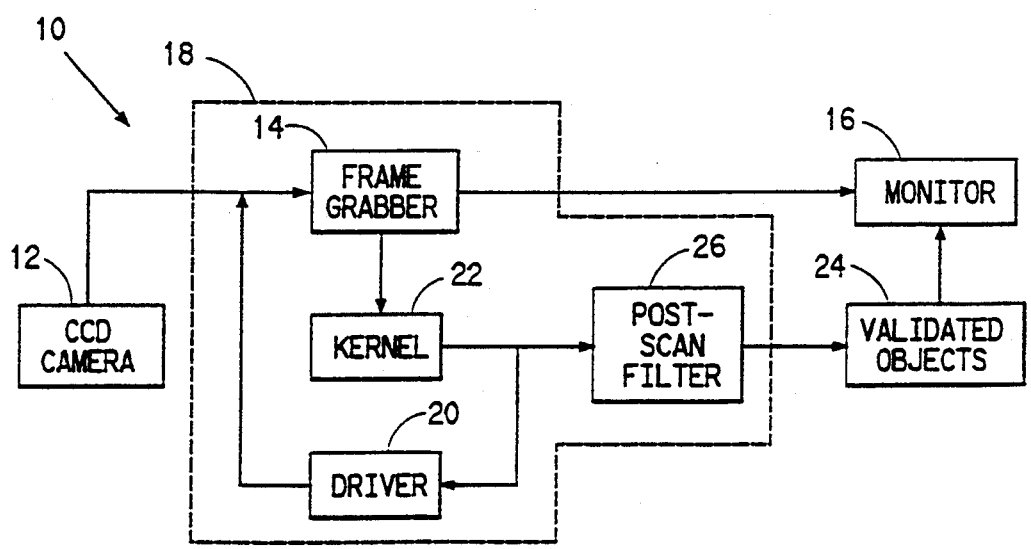
FIG. 31 is a schematic diagram showing the components of a system used with the first and second embodiments of the present invention.

In accordance with the first and second embodiments of the present invention, there is provided an image analysis system for identifying at least one valid object in a background. The valid object has at least one predetermined attribute value which represents the definition of a valid object of an object to be identified. A block diagram of the system of the present invention is shown in FIG. 31. A system for identifying at least one valid object in a background is shown generally at 10 in FIG. 31.

The system of the present invention comprises means for generating an image of the object and the background. As shown in FIG. 31, the means for generating an image of the object and the background comprises a camera 12. Although a CCD camera is generally used with the present invention, any type of camera may be used without departing from the general principles of the present invention.

The system of the present invention also comprises means for digitizing and storing the image. The means for digitizing and storing the image comprises a frame grabber 14 as shown in FIG. 31. The frame grabber digitizes and stores the video image in one frame, as known to one skilled in the image processing art. Alternatively, the means for digitizing and storing the image comprises a video digitizer, which also digitizes and stores the image, although not necessarily in one frame. The system of the present invention further comprises means for displaying the image. The means for displaying the image comprises a monitor 16 as shown in FIG. 31.

The system of the present invention also comprises computer means. The computer means comprises a computer system 18 as shown in FIG. 31. The computer system comprises a central processing unit (CPU) and a memory. The computer means also includes a driver 20, a kernel 22 and a post-scan filter 26 as shown in FIG. 31. Driver 20 stores the definition of the valid object. The entropic kernel 22 generates a gray level histogram of the image and entropically selects a threshold gray level such that the entropy function of the histogram is maximized. Entropic kernel 22 also searches the image for at least one candidate object and validates the candidate object having the valid object predetermined attribute value to identify the valid object. The validated objects are represented by box 24 in FIG. 31. The driver and the kernel may comprise software incorporated in the memory. Alternatively, the driver and the kernel may be programmed into a programmable, read-only memory (PROM) from which the software may be retrieved. The post-scan filter is shown at 26 in FIG. 31 and provides a final check to remove redundancies in overlapping objects as described above.

It will be apparent to those skilled in the art that various modifications and variations can be made in the methods of the present invention without departing from the scope or spirit of the invention. For example, any type of entropic thresholding may be employed, such as entropic thresholding of a co-occurrence matrix as disclosed by Pal and Pal, supra.

The invention will be further clarified by the following examples, which are intended to be purely exemplary of the invention.

EXAMPLE

In this Example, a colony counting system is described. Colony counting is a task routinely performed in microbiology laboratories for quantifying the amount of bacteria in a sample. The sample can be one of a number of different types such as blood, food, cosmetics, soil etc. This system identified colonies in varying backgrounds and was also able to unclump highly clumped colonies.

In addition to accurate colony counting, it is important to be able to classify colonies by type in cases where there is more than one species of bacteria on the same plate. In this Example, both typical and atypical strains of Salmonella were present. In addition, background (non-pathogenic) bacteria were also present. It is also important to be able to differentiate both strains of Salmonella from the background bacteria. In this Example, the agar plate was Hektoen Enteric agar where the typical Salmonella colonies were black, the atypical Salmonella colonies were light green and the background colonies were yellow. The system of this Example was able to classify the colonies by hue and thus perform classification of species on the plate.

In this Example, an additional complexity was presented by the number of colonies in the plate. There were 875 colonies in the plate, which would make the visual classification of the colonies extremely tedious. The large number of colonies resulted in significant clumping, which posed another major difficulty. The system described in this Example was able to unclump the colonies and then perform hue classification to classify the different species on the plate.

The apparatus used in this Example to count colonies comprised a Petri dish holder to hold the plate, an optical system for illuminating the plate and an image acquisition system to generate an image of the sample on the plate as described above with respect to FIG. 31. A video signal from a camera was fed into a frame grabber, which occupied a slot in a PC. The frame grabber digitized the image.

The Petri dish holder comprised a movable, machined member which could accept standard Petri dishes. The member had a countersunk circular indent capable of accepting the dishes and was slid into place via a bearing-based support. Below the holder, there was room to insert an appropriate background sheet to enhance image contrast.

The illumination source used comprised a Philips FC 8T9/CW circular fluorescent lamp (8" (20.3 cm.) diameter) which surrounded the Petri dish. The lamp was mounted approximately 1" (2.54 cm.) above the dish and illuminated the dish uniformly from all sides. The distance between the lamp and the dish was important. If the lamp was too high, the resulting image would have revealed significant "glaring" and "haloing" from the curved surfaces of the colonies. The colonies can be considered small 3D lenses, and oblique, grazing angle illumination was necessary so that light scattering from the lens-like surfaces did not enter the camera. The lamp was actively stabilized using a Mercron FL0416-2 controller, which kept the light level constant, to prevent fluctuations in output. In addition, the controller was remotely programmable to adjust the brightness of the lamp. This feature was especially useful for colony plates, where the inherent contrast was variable. For low-contrast plates, the light level can be increased to improve the contrast.

The optical system comprised a Sony XC-77 monochrome CCD video camera with a 16 mm. F2.8 Nikkon lens. The camera was centered above the Petri dish at a distance of approximately 1.5 feet (0.05 m.). The distance from the camera to the dish was such that the disk just filled the surface of the CCD sensor in order to maximize spatial resolution.

A filter wheel was placed between the lens and the camera sensor. The filter wheel had four positions. The filter combination in each position are described below:

TABLE 1

| Position | Filter COMBINATION |
|---|---|
| 1 (BW) | 1.2 ND filter (ND = neutral density) |
| 2 (RED) | Kodak filter #25 (catalog #149 5605) + 0.5 ND filter |
| 3 (GREEN) | Kodak filter #58 (cat #149 5860) + 0.3 ND filter |
| 4 (BLUE) | Kodak filter #47B (Cat. #149 5795) |

A black light shield made of a crystalline homopolymer of formaldehyde, sold under the trademark "DELRIN" by E. I. du Pont de Nemours and Company of Wilmington, Delware, extended from the camera to the plate to prevent stray light from entering the camera. The video signal from the camera went directly to the frame grabber on the PC.

The image acquisition system comprised a Data Translation DT2851 frame grabber board which occupied an expansion slot on the PC. A Dell 33 MHZ 386AT system was used to store images and execute the method of the present invention, using color as an attribute value. The frame grabber board had a 512×512 pixel video buffer in which the digitized image was stored. In order to minimize "shot" noise from the camera, several image frames were averaged, and the resulting averaged image was stored and used for further analysis. The output of the frame grabber was connected to a Sony TRINITRON monitor to display the image.

The following (1)–(4) were computer specifications:
(1) Driver:

The attributes and their ranges for valid colonies are shown in Table 2 below.

TABLE 2

| Attribute | Valid Range |
|---|---|
| Range of Attribute values for screening | |
| (1) xcm = x coordinate of object center of mass DESCRIPTOR | |
| (2) ycm = y coordinate of object center of mass DESCRIPTOR | |
| (3) perim = total length of perimeter of object DESCRIPTOR | |
| (4) npts = number of perimeter points in object | npts > 3 |
| (5) obj_type = type of object (Exterior or Interior) DESCRIPTOR Exterior = object never contained within another object Interior = object previously contained within another object | |
| (6) area = area of object | area > 0.0 |
| (7) shape = shape factor of object | shape > −0.8 |
| (8) status = status value of object which is used in artifact removal and redundancy checking in several different ways DESCRIPTOR | |
| (9) contrast = edge contrast of object | contrast > 100 |
| (10) edge = data structure containing coordinates of extremum points of object DESCRIPTOR | |
| (11) thresh = threshold at which object was detected DESCRIPTOR | |
| (12) max = maximum gray level of histogram partition in which object was detected DESCRIPTOR | |
| (13) clump_shape = maximum shape factor for a | |

TABLE 2-continued

| Attribute | Valid Range |
|---|---|
| Range of Attribute values for screening | |
| UNUSED clump of candidate objects | |
| (14) clump_size = minimum area for a clump of candidate objects | UNUSED |
| (15) worst_shape = minimum shape factor for a clump of candidate objects | UNUSED |
| (16) hue_mean = mean hue of object | huemean > 1.90 and huemean <3.40 (if huemag >200) |
| (17) hue_mag = magnitude of hue vector of object | subject to classification Rules |
| (18) hue_cm = hue vector of cm DESCRIPTOR | |

Note: Only some of the attribute values required valid ranges. Others were "descriptors" which did not influence object validity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of determining the interior points of an object in a background, comprising the steps of:
    (a) generating an image of the object and the background;
    (b) searching the image for the object;
    (c) determining the perimeter points of the object;
    (d) creating a perimeter buffer, the perimeter buffer comprising the perimeter points, each perimeter point having a row-position coordinate value, a column-position coordinate value and a direction code vector, the direction code vector comprising a first and a second direction code value for each perimeter point, the first direction code value describing the relationship of each respective perimeter point to the next perimeter point and the second direction code value describing the relationship of each respective perimeter point to the previous perimeter point;
    (e) sorting the perimeter points in the perimeter buffer in a predetermined order to create a sorted perimeter buffer;
    (f) assigning to each perimeter point in the sorted perimeter buffer a status variable having one of a first and a second value, the value of the status variable being determined by the first and second direction code values; and
    (g) if the examined perimeter point has been assigned the first value of the status variable, designating as the interior points of the object each point on the same line segment as the perimeter point being examined and lying between the examined perimeter point and the next perimeter point in the sorted perimeter buffer.

2. The method of claim 1, wherein the step of searching the image comprises searching only a portion of the object.

3. The method of claim 1, wherein the step of determining the perimeter points comprises tracing the object sequentially in the clockwise direction.

4. The method of claim 1, wherein the step of determining the perimeter points of the object comprises tracing the object sequentially in the counterclockwise direction.

5. The method of claim 3, wherein the sorting step comprises the sub-step of sorting the perimeter points in the perimeter buffer by row in a predetermined order to create a row-sorted perimeter buffer comprising at least one row-sorted perimeter point.

6. The method of claim 5, wherein the sorting step comprises the additional sub-step of sorting the perimeter points in the row-sorted perimeter buffer by column in a further predetermined order to create a row-column sorted perimeter buffer comprising at least one row-column sorted perimeter point.

7. The method of claim 6, wherein the sub-step of sorting the perimeter points by row comprises sorting the perimeter points in ascending order such that the points with the lowest row-position coordinate values are placed at the start of the buffer.

8. The method of claim 6, wherein the sub-step of sorting the perimeter points by row comprises sorting the perimeter points in descending order such that the points with the highest row-position coordinate values are placed at the start of the buffer.

9. The method of claim 7, wherein the additional sub-step of sorting the perimeter points by column comprises sorting the row-sorted perimeter points in ascending order such that the point with the lowest row-position coordinate value and the lowest column-position coordinate value is placed at the start of the buffer.

10. The method of claim 8, wherein the additional sub-step of sorting the perimeter points by column comprises sorting the row-sorted perimeter points in ascending order such that the point with the highest row-position coordinate value and the lowest column-position coordinate value is placed at the start of the buffer.

11. The method of claim 3, wherein the sorting step comprises the sub-step of sorting the perimeter points in the perimeter buffer by column in a predetermined order to create a column-sorted perimeter buffer comprising at least one column-sorted perimeter point.

12. The method of claim 11, wherein the sorting step comprises the additional sub-step of sorting the perimeter points in the column-sorted perimeter buffer by row in a further predetermined order to create a column-row sorted perimeter buffer comprising at least one column-row sorted perimeter point.

13. The method of claim 12, wherein the sub-step of sorting the perimeter points by column comprises sorting the perimeter points in descending order such that the points with the highest column-position coordinate values are placed at the start of the buffer.

14. The method of claim 12, wherein the sub-step of sorting the perimeter points by column comprises sorting the perimeter points in ascending order such that the points with the lowest column-position coordinate values are placed at the start of the buffer.

15. The method of claim 13, wherein the additional sub-step of sorting the perimeter points by row comprises sorting the column-sorted perimeter points in descending order such that the point with the highest row-position coordinate value and the highest column-position coordinate value is placed at the start of the buffer.

16. The method of claim 14, wherein the additional sub-step of sorting the perimeter points by row comprises sorting the column-sorted perimeter points in descending order such that the point with the lowest column-position coordinate value and the highest row-position coordinate value is placed at the start of the buffer.

17. The method of claim 4, wherein the sorting step comprises the sub-step of sorting the perimeter points in the perimeter buffer by row in a predetermined order to create a row-sorted perimeter buffer comprising at least one row-sorted perimeter point.

18. The method of claim 17, wherein the sorting step comprises the additional sub-step of sorting the perimeter points in the row-sorted perimeter buffer by column in a further predetermined order to create a row-column sorted perimeter buffer comprising at least one row-column sorted perimeter point.

19. The method of claim 18, wherein the sub-step of sorting the perimeter points by row comprises sorting the perimeter points in ascending order such that the points with the lowest row-position coordinate values are placed at the start of the buffer.

20. The method of claim 18, wherein the sub-step of sorting the perimeter points by row comprises sorting the perimeter points in descending order such that the points with the highest row-position coordinate values are placed at the start of the buffer.

21. The method of claim 19, wherein the additional sub-step of sorting the perimeter points by column comprises sorting the row-sorted perimeter points in descending order such that the point with the lowest row-position coordinate value and the highest column position coordinate value is placed at the start of the buffer.

22. The method of claim 20, wherein the additional sub-step of sorting the perimeter points by column comprises sorting the row-sorted perimeter points in descending order such that the point with the highest row-position coordinate value and the highest column-position coordinate value is placed at the start of the buffer.

23. The method of claim 4, wherein the sorting step comprises the sub-step of sorting the perimeter points in the perimeter buffer by column in a predetermined order to create a column-sorted perimeter buffer comprising at least one column-sorted perimeter point.

24. The method of claim 23, wherein the sorting step comprises the additional sub-step of sorting the perimeter points in the column-sorted perimeter buffer by row in a further predetermined order to create a column-row sorted perimeter buffer comprising at least one column-row sorted perimeter point.

25. The method of claim 24, wherein the sub-step of sorting the perimeter points by column comprises sorting the perimeter points in descending order such that the points with the highest column-position coordinate values are placed at the start of the buffer.

26. The method of claim 24, wherein the sub-step of sorting the perimeter points by column comprises sorting the perimeter points in ascending order such that the points with the lowest column-position coordinate values are placed at the start of the buffer.

27. The method of claim 25, wherein the additional sub-step of sorting the perimeter points by row comprises sorting the column-sorted perimeter points in ascending order such that the point with the lowest row-position coordinate value and the highest column-position coordinate value is placed at the start of the buffer.

28. The method of claim 26, wherein the additional sub-step of sorting the perimeter points by row comprises sorting the column-sorted perimeter points in ascending order such that the point with the lowest column-position coordinate value and the lowest row-position coordinate value is placed at the start of the buffer.

29. The method of claim 6, wherein the designating step comprises the sub-step of designating as the interior points of the object each point on the same row as the perimeter point being examined and lying between the examined perimeter point and the next perimeter point in the row-column sorted perimeter buffer.

30. The method of claim 12, wherein the designating step comprises the sub-step of designating as the interior points of the object each point on the same row as the perimeter point being examined and lying between the examined perimeter point and the next perimeter point in the column-row sorted perimeter buffer.

31. The method of claim 18, wherein the designating step comprises the sub-step of designating as the interior points of the object each point on the same column as the perimeter point being examined and lying between the examined perimeter point and the next perimeter point in the row-column sorted perimeter buffer.

32. The method of claim 24, wherein the designating step comprises the sub-step of designating as the interior points of the object each point on the same column as the perimeter point being examined and lying between the examined perimeter point and the next perimeter point in the column-row sorted perimeter buffer.

33. The method of claim 1, further including the steps of:
   (h) determining the gray level value of each interior point, and
   (i) characterizing the object by using the gray level values of the interior points.

34. The method of claim 33, wherein the characterizing step comprises determining the texture of the object.

35. The method of claim 33, wherein the characterizing step comprises determining the color of the object.

36. The method of claim 33, wherein the characterizing step comprises determining the patterns in the object.

37. The method of claim 1, further comprising the step of labeling the object by assigning a predetermined gray level value to each interior point designated in step (g).

38. The method of claim 1, further comprising the step of checking each perimeter point to determine whether the perimeter point has been traced more than once during the sequential tracing of the object.

39. The method of claim 38, further comprising the step of designating all points lying between each redundant perimeter point and the next perimeter point on the line segment as the interior points of the object only when all instances of each redundant perimeter point are assigned the first value of the status variable.

40. The method of claim 1, wherein the step of searching the image includes the sub-steps of:
   (i) generating a gray level histogram of the image, the gray level histogram having an entropy function,
   (ii) entropically selecting a threshold gray level value such that the entropy function of the histogram is maximized,
   (iii) scanning the image for at least one object using the entropically selected threshold gray level value, and
   (iv) tracing the candidate object having boundary gray level values determined by the entropically selected threshold gray level value.

41. A method of identifying at least one valid object having at least one valid object predetermined attribute value in a background, comprising the steps of:
   (a) generating an image of the object and the background;
   (b) searching the image for at least one candidate object using at least one automatically calculated threshold, wherein the candidate object has at least one candidate object attribute value;
   (c) determining the perimeter points of the candidate object;
   (d) creating a perimeter buffer, the perimeter buffer comprising the perimeter points, each perimeter point having a row-position coordinate value, a column-position coordinate value and a direction code vector, the direction code vector comprising a first and a second direction code value for each perimeter point, the first direction code value describing the relationship of each respective perimeter point to the next perimeter point and the second direction code value describing the relationship of each respective perimeter point to the previous perimeter point;
   (e) sorting the perimeter points in the perimeter buffer in a predetermined order to create a sorted perimeter buffer;
   (f) assigning to each perimeter point in the sorted perimeter buffer a status variable having one of a first and a second value, the value of the status variable being determined by the first and second direction code values;
   (g) if the examined perimeter point has been assigned the first value of the status variable, designating as the interior points of the object each point on the same line segment as the perimeter point being examined and lying between the examined perimeter point and the next perimeter point in the sorted perimeter buffer;
   (h) characterizing the candidate object by the candidate object attribute value; and
   (g) validating the candidate object having the valid object predetermined attribute value to identifying the valid object.

42. The method of claim 41, wherein the step of searching the image comprises searching only a portion of the object.

43. The method of claim 41, wherein the step of searching the image includes the sub-steps of:
   (i) generating a gray level histogram of the image, the gray level histogram having an entropy function,
   (ii) automatically calculating the threshold by entropically selecting a threshold gray level value such that the entropy function of the histogram is maximized,
   (iii) scanning the image for at least one object using the entropically selected threshold gray level value, and
   (iv) tracing the candidate object having boundary gray level values determined by the entropically selected threshold gray level value.

44. The method of claim 41, wherein the step of determining the perimeter points of the object comprises tracing the object sequentially in the clockwise direction.

45. The method of claim 41, wherein the step of determining the perimeter points of the object comprises tracing the object sequentially in the counterclockwise direction.

46. The method of claim 44, wherein the sorting step comprises the sub-step of sorting the perimeter points in the perimeter buffer by row in a predetermined order to create a row-sorted perimeter buffer comprising at least one row-sorted perimeter point.

47. The method of claim 46, wherein the sorting step comprises the additional sub-step of sorting the perimeter points in the row-sorted perimeter buffer by column in a further predetermined order to create a row-column sorted perimeter buffer comprising at least one row-column sorted perimeter point.

48. The method of claim 47, wherein the sub-step of sorting the perimeter points by row comprises sorting the perimeter points in ascending order such that the points with the lowest row-position coordinate values are placed at the start of the buffer.

49. The method of claim 47, wherein the sub-step of sorting the perimeter points by row comprises sorting the perimeter points in descending order such that the points with the highest row-position coordinate values are placed at the start of the buffer.

50. The method of claim 48, wherein the additional sub-step of sorting the perimeter points by column comprises sorting the row-sorted perimeter points in ascending order such that the point with the lowest row-position coordinate value and the lowest column-position coordinate value is placed at the start of the buffer.

51. The method of claim 49, wherein the additional sub-step of sorting the perimeter points by column comprises sorting the row-sorted perimeter points in ascending order such that the point with the highest row-position coordinate value and the lowest column-position coordinate value is placed at the start of the buffer.

52. The method of claim 44, wherein the sorting step comprises the sub-step of sorting the perimeter points in the perimeter buffer by column in a predetermined order to create a column-sorted perimeter buffer comprising at least one column-sorted perimeter point.

53. The method of claim 52, wherein the sorting step comprises the additional sub-step of sorting the perimeter points in the column-sorted perimeter buffer by row in a further predetermined order to create a column-row sorted perimeter buffer comprising at least one column-row sorted perimeter point.

54. The method of claim 53, wherein the sub-step of sorting the perimeter points by column comprises sorting the perimeter points in descending order such that the points with the highest column-position coordinate values are placed at the start of the buffer.

55. The method of claim 53, wherein the sub-step of sorting the perimeter points by column comprises sorting the perimeter points in ascending order such that the points with the lowest column-position coordinate values are placed at the start of the buffer.

56. The method of claim 54, wherein the additional sub-step of sorting the perimeter points by row comprises sorting the column-sorted perimeter points in descending order such that the point with the highest row-position coordinate value and the highest column-position coordinate value is placed at the start of the buffer.

57. The method of claim 55, wherein the additional sub-step of sorting the perimeter points by row comprises sorting the column-sorted perimeter points in descending order such that the point with the lowest column-position coordinate value and the highest row-position coordinate value is placed at the start of the buffer.

58. The method of claim 45, wherein the sorting step comprises the sub-step of sorting the perimeter points in the perimeter buffer by row in a predetermined order to create a row-sorted perimeter buffer comprising at least one row-sorted perimeter point.

59. The method of claim 58, wherein the sorting step comprises the additional sub-step of sorting the perimeter points in the row-sorted perimeter buffer by column in a further predetermined order to create a row-column sorted perimeter buffer comprising at least one row-column sorted perimeter point.

60. The method of claim 59, wherein the sub-step of sorting the perimeter points by row comprises sorting the perimeter points in ascending order such that the points with the lowest row-position coordinate values are placed at the start of the buffer.

61. The method of claim 59, wherein the sub-step of sorting the perimeter points by row comprises sorting the perimeter points in descending order such that the points with the highest row-position coordinate values are placed at the start of the buffer.

62. The method of claim 60, wherein the additional sub-step of sorting the perimeter points by column comprises sorting the row-sorted perimeter points in descending order such that the point with the lowest row-position coordinate value and the highest column-position coordinate value is placed at the start of the buffer.

63. The method of claim 61, wherein the additional sub-step of sorting the perimeter points by column comprises sorting the row-sorted perimeter points in descending order such that the point with the highest row-position coordinate value and the highest column-position coordinate value is placed at the start of the buffer.

64. The method of claim 45, wherein the sorting step comprises the sub-step of sorting the perimeter points in the perimeter buffer by column in a predetermined order to create a column-sorted perimeter buffer comprising at least one column-sorted perimeter point.

65. The method of claim 64, wherein the sorting step comprises the additional sub-step of sorting the perimeter points in the column-sorted perimeter buffer by row in a further predetermined order to create a column-row sorted perimeter buffer comprising at least one column-row sorted perimeter point.

66. The method of claim 65, wherein the sub-step of sorting the perimeter points by column comprises sorting the perimeter points in descending order such that the points with the highest column-position coordinate values are placed at the start of the buffer.

67. The method of claim 65, wherein the sub-step of sorting the perimeter points by column comprises sorting the perimeter points in ascending order such that the points with the lowest column-position coordinate values are placed at the start of the buffer.

68. The method of claim 66, wherein the additional sub-step of sorting the perimeter points by row comprises sorting the column-sorted perimeter points in ascending order such that the point with the lowest row-position coordinate value and the highest column-position coordinate value is placed at the start of the buffer.

69. The method of claim 67, wherein the additional sub-step of sorting the perimeter points by row comprises sorting the column-sorted perimeter points in ascending order such that the point with the lowest column-position coordinate value and the lowest row-position coordinate value is placed at the start of the buffer.

70. The method of claim 48, wherein the designating step comprises the sub-step of designating as the interior points of the object each point on the same row as the perimeter point being examined and lying between the examined perimeter point and the next perimeter point in the row-column sorted perimeter buffer.

71. The method of claim 53, wherein the designating step comprises the sub-step of designating as the interior points of the object each point on the same row as the perimeter point being examined and lying between the examined perimeter point and the next perimeter point in the column-row sorted perimeter buffer.

72. The method of claim 59, wherein the designating step comprises the sub-step of designating as the interior points of the object each point on the same column as the perimeter point being examined and lying between the examined perimeter point and the next perimeter point in the row-column sorted perimeter buffer.

73. The method of claim 65, wherein the designating step comprises the sub-step of designating as the interior points of the object each point on the same column as the perimeter point being examined and lying between the examined perimeter point and the next perimeter point in the column-row sorted perimeter buffer.

74. The method of claim 43, further comprising the steps of:
(j) subdividing the gray level histogram into an upper histogram and a lower histogram using the entropic threshold gray level value as defined by step (b)(ii) as an upper delimiter and a lower delimiter, and
(k) recursively repeating steps (b)(ii), (b)(iii), (i) and (j) for each of the upper and lower histograms, wherein the repetition of step (b)(ii) selects a next successive entropic threshold gray level value, thereby recursively partitioning the gray level histogram until a predetermined minimum number of new valid objects is identified.

75. The method of claim 74, wherein the characterizing step includes the sub-steps of:
(i) determining the gray level value of each interior point, and
(ii) characterizing the object by using the gray level values of the interior points after designating step (g).

76. The method of claim 75, wherein the characterizing sub step comprises determining the texture of the object.

77. The method of claim 75, wherein the characterizing sub step comprises determining the color of the object.

78. The method of claim 75, wherein the characterizing sub step comprises determining the patterns in the object.

79. The method of claim 75, further comprising the step of labeling the object by assigning a predetermined gray level value to each interior point designated in step (g).

80. The method of claim 41, further comprising the steps of:
(j) selecting a predetermined gray level value;
(k) scanning the image to determine all points having the predetermined gray level value;
(l) re-assigning the gray level value of each point having the predetermined gray level value a new predetermined gray level value;
(m) assigning the predetermined gray level value of step (j) to all interior points of all valid objects;
(n) generating a gray level histogram of a remainder image, the remainder image comprising all the points having a gray level value other than the predetermined gray level value;
(o) selecting N global entropic threshold gray level values;
(p) subdividing the gray level histogram into N+1 sub-histograms using each of the entropically selected threshold gray level values;
(q) searching portions of the image corresponding to each sub-histogram using each global entropically selected threshold gray level value for at least one new candidate object, wherein the new candidate object has at least one candidate object attribute value; and
(r) validating the new candidate object having the valid object predetermined attribute value for each of the new sub-histograms to identify the valid object.

81. The method of claim 80, further including the step of determining whether the gray level value of the center of mass of the candidate object is different than the predetermined gray level value.

82. The method of claim 81, further including the step of applying a post-scan filter based on the attribute value of the valid object validated in step (i).

83. The method of claim 81, further including the step of merging the list of non-redundant, valid, newly identified objects with the valid object validated in step (i).

* * * * *